United States Patent [19]

Dwyer et al.

[11] 3,995,990
[45] Dec. 7, 1976

[54] PRE-FORM REHEAT OVEN FOR STRETCH BLOW MOLDING MACHINES

[75] Inventors: Gregory J. Dwyer, Livonia; George H. Pirman, Brighton Township, Livingston County, both of Mich.

[73] Assignee: Monsanto Company, St. Louis, Mo.

[22] Filed: Mar. 11, 1974

[21] Appl. No.: 450,271

[52] U.S. Cl. .............................. 432/121; 432/124
[51] Int. Cl.² ..................... F27B 9/00; F27B 9/14
[58] Field of Search ................. 432/121, 123, 124

[56] References Cited
UNITED STATES PATENTS

| | | | |
|---|---|---|---|
| 2,539,135 | 1/1951 | Hess | 432/123 |
| 3,445,096 | 5/1969 | Seefluth | 432/124 |
| 3,477,700 | 11/1969 | Kinslow, Jr. | 432/124 |
| 3,740,868 | 6/1973 | Moore et al. | 432/124 |
| 3,787,170 | 1/1974 | Gilbert | 432/5 |
| 3,801,263 | 4/1974 | Moore | 432/19 |
| 3,850,573 | 11/1974 | Yoshikawa et al. | 432/124 |
| 3,894,835 | 7/1975 | Berggren et al. | 432/124 |

*Primary Examiner*—John J. Camby
*Attorney, Agent, or Firm*—Eugene Zagarella, Jr.

[57] ABSTRACT

A continuous motion pre-form reheat oven for use with a continuous motion stretch blow molding apparatus. The pre-form reheat oven receives pre-forms, reheats the pre-forms, and then discharges the pre-forms onto a moving stretch pin means operatively mounted on a continuous motion stretch blow molding apparatus, as a rotary type stretch blow molding machine. The oven has a pre-form heating zone and a pre-form conditioning zone, and it is adapted to be mounted adjacent a continuous motion stretch blow molding apparatus. The oven includes a plurality of longitudinal tunnels with heater means along each side of each of the tunnels in the pre-form heating zone. The heater means each includes a plurality of heater rods which are separated by heat reflectors and which are each individually temperature controlled. The oven pre-form conditioning zone includes cooling means for cooling the bodies of pre-forms, and heating means for controlling the heat in the neck areas of the pre-forms. Hoist means is provided for raising the oven to an inoperative position. A continuous linear and rotational motion pre-form conveying means is provided for conveying pre-forms from a loading station and through the oven and to a discharge station for discharging the pre-forms onto the stretch pin means.

46 Claims, 69 Drawing Figures

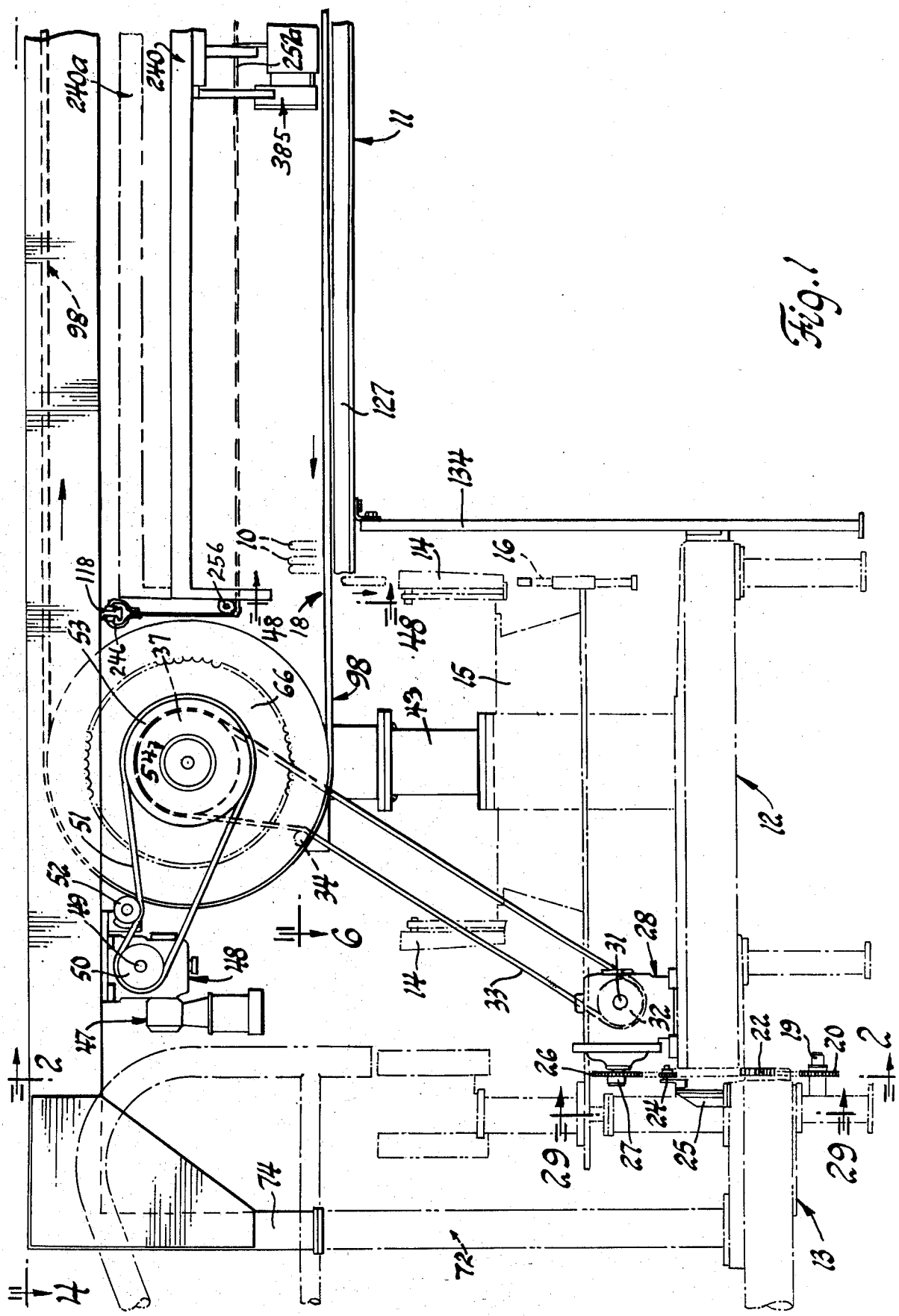

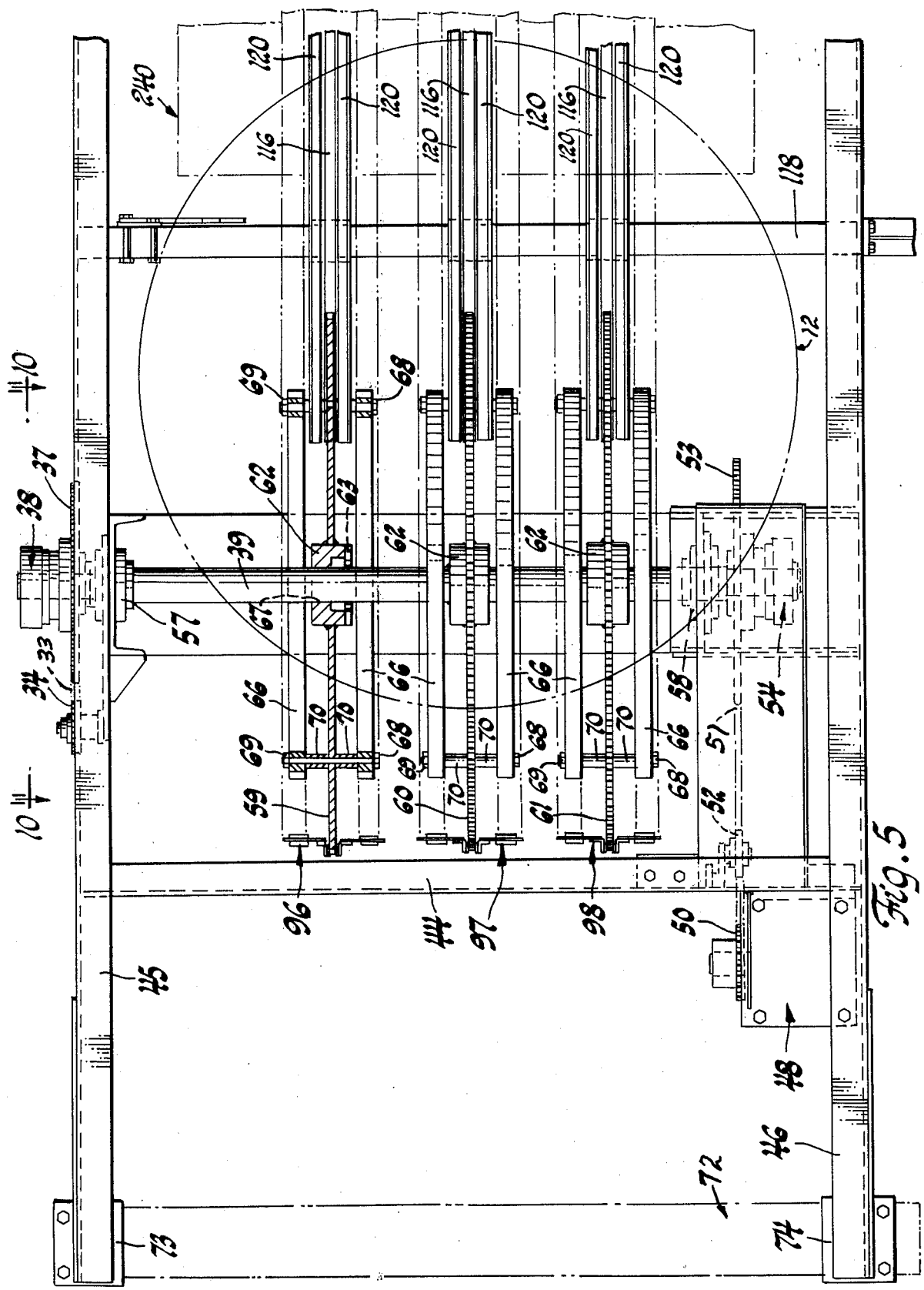

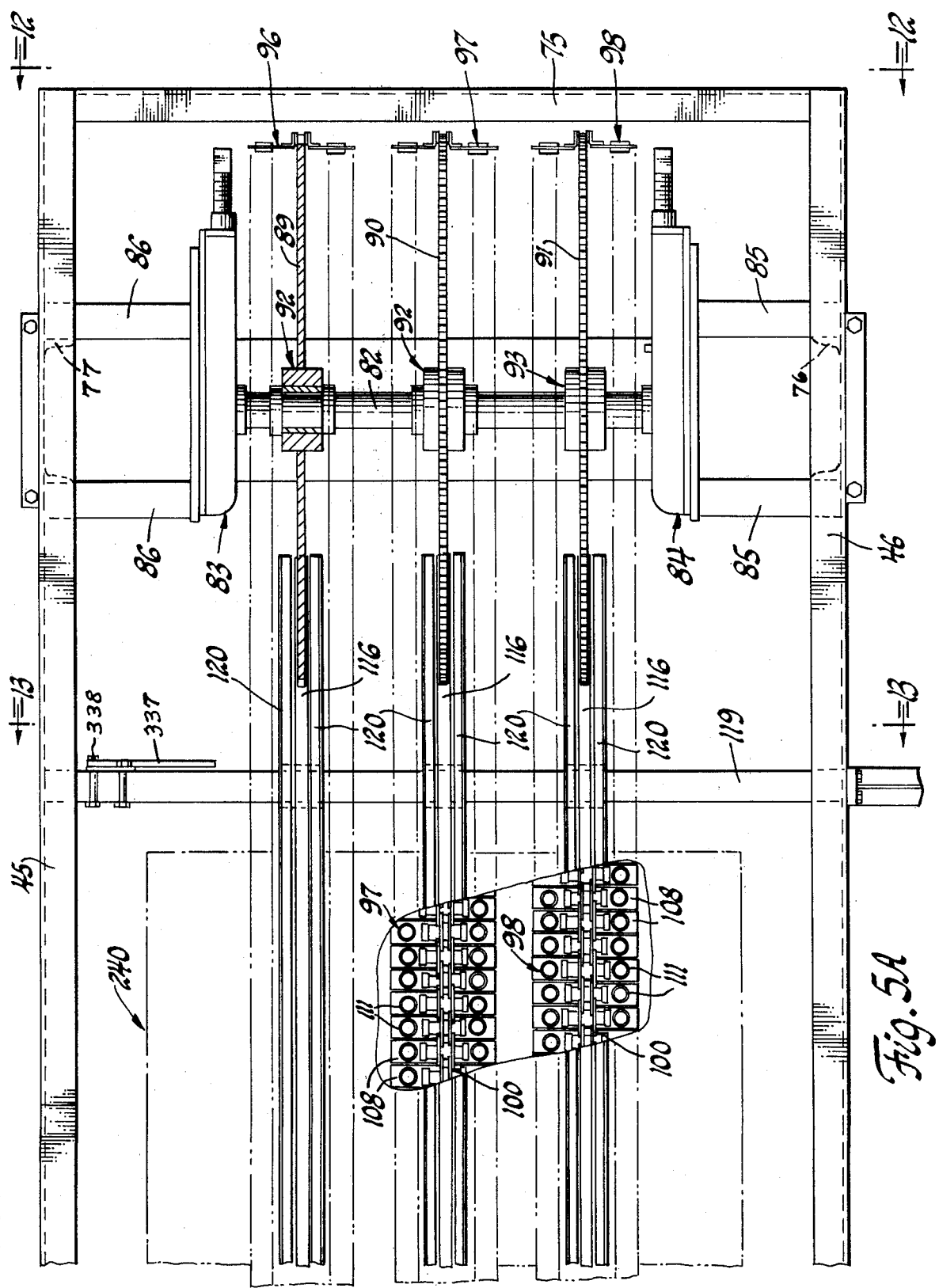

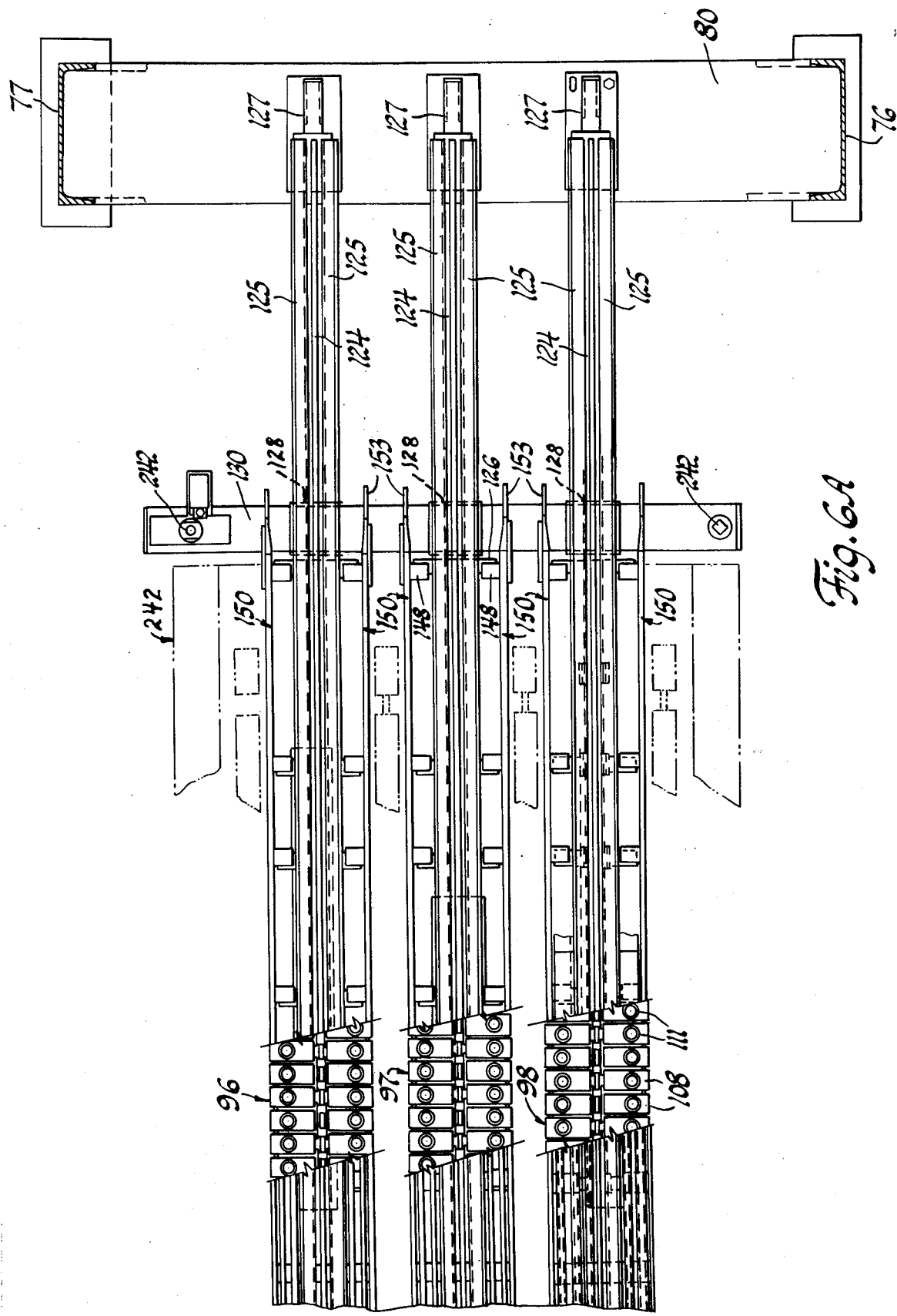

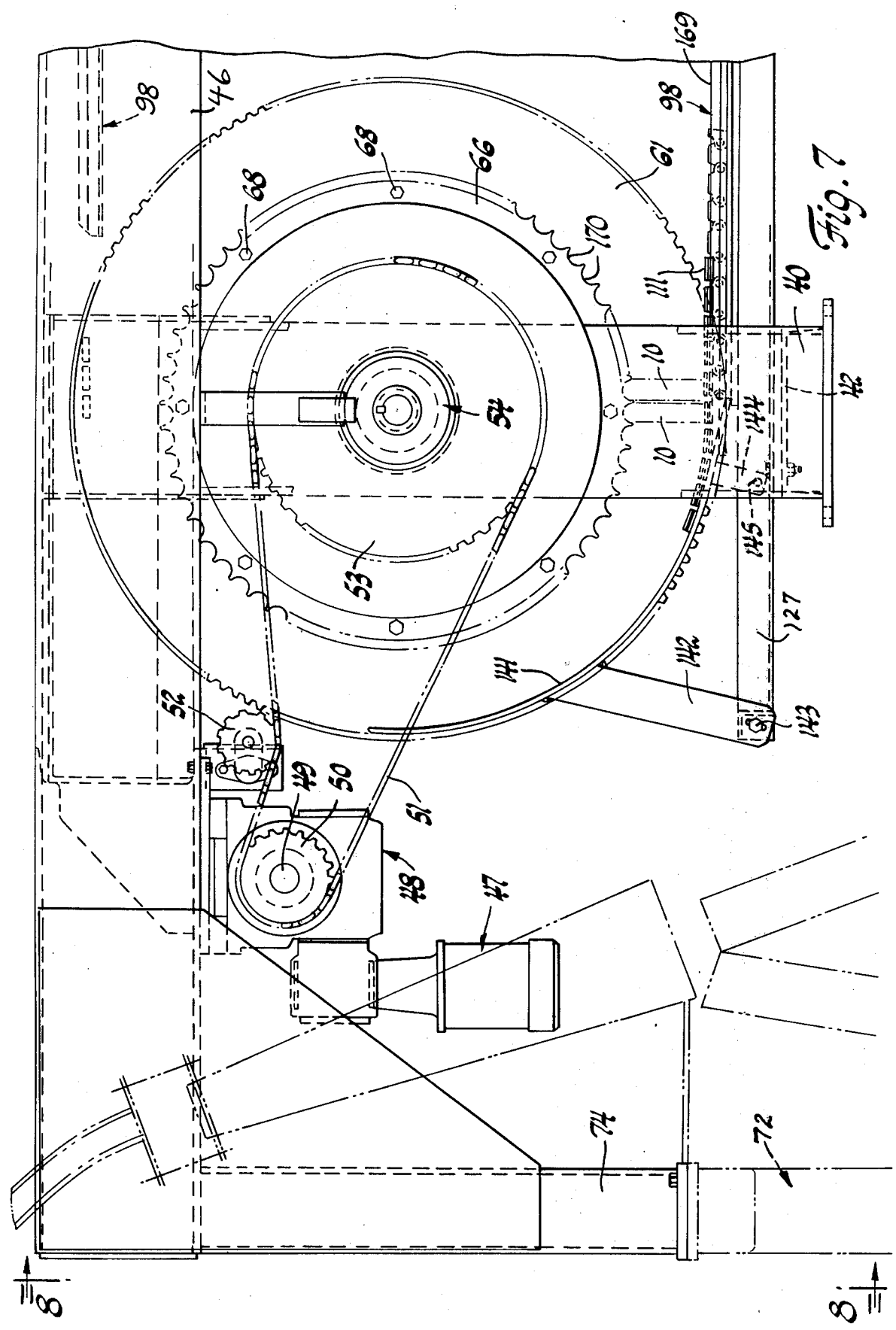

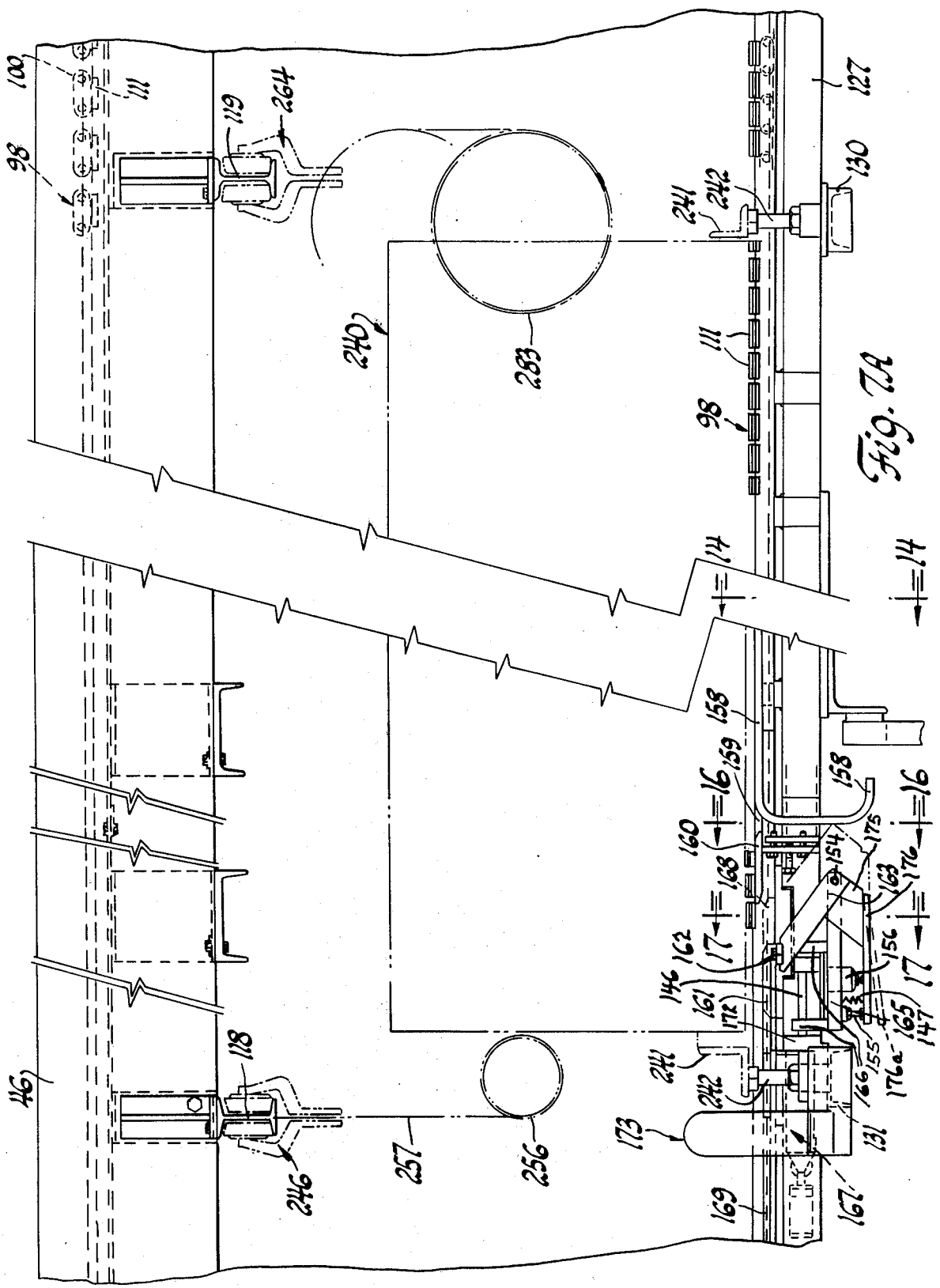

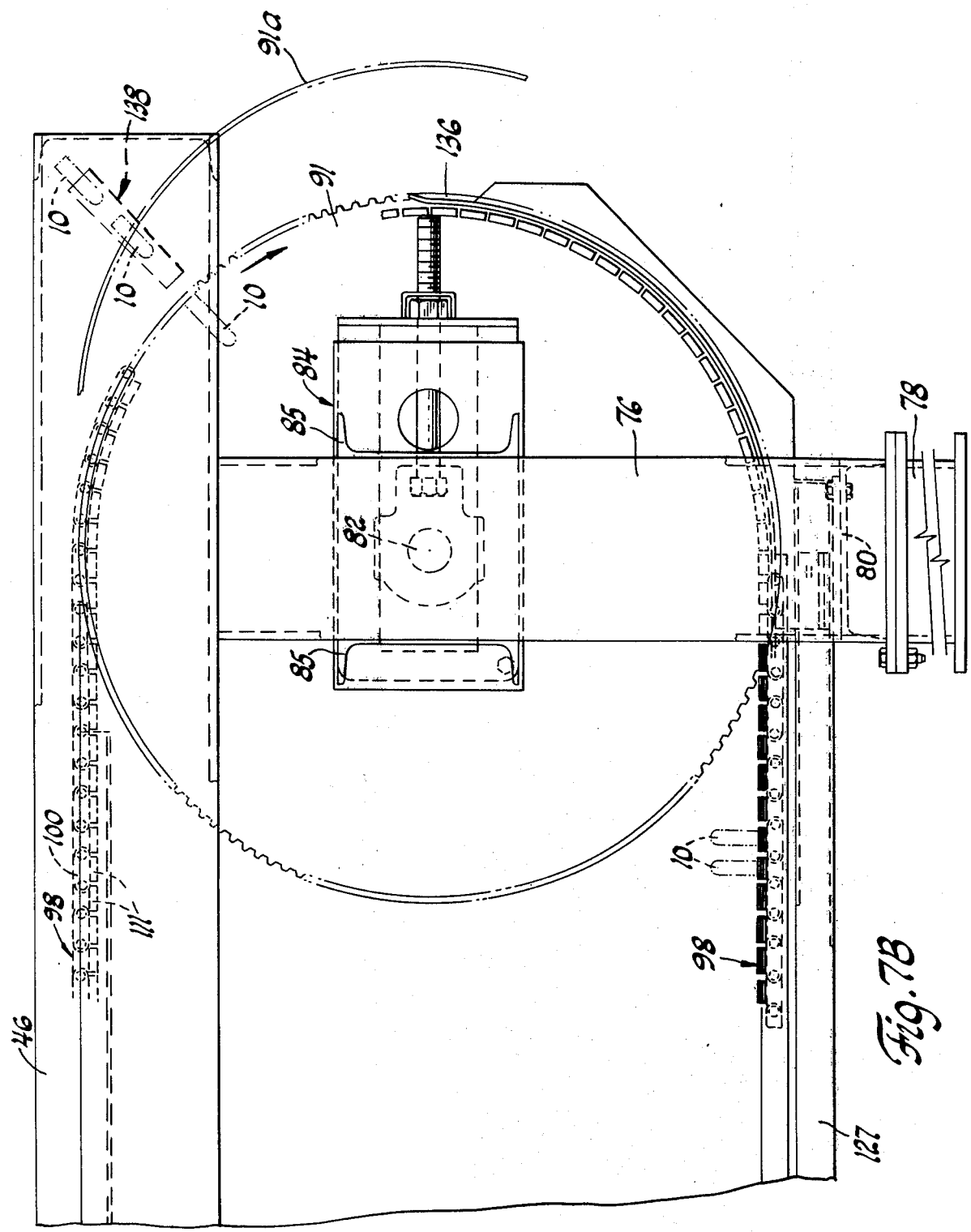

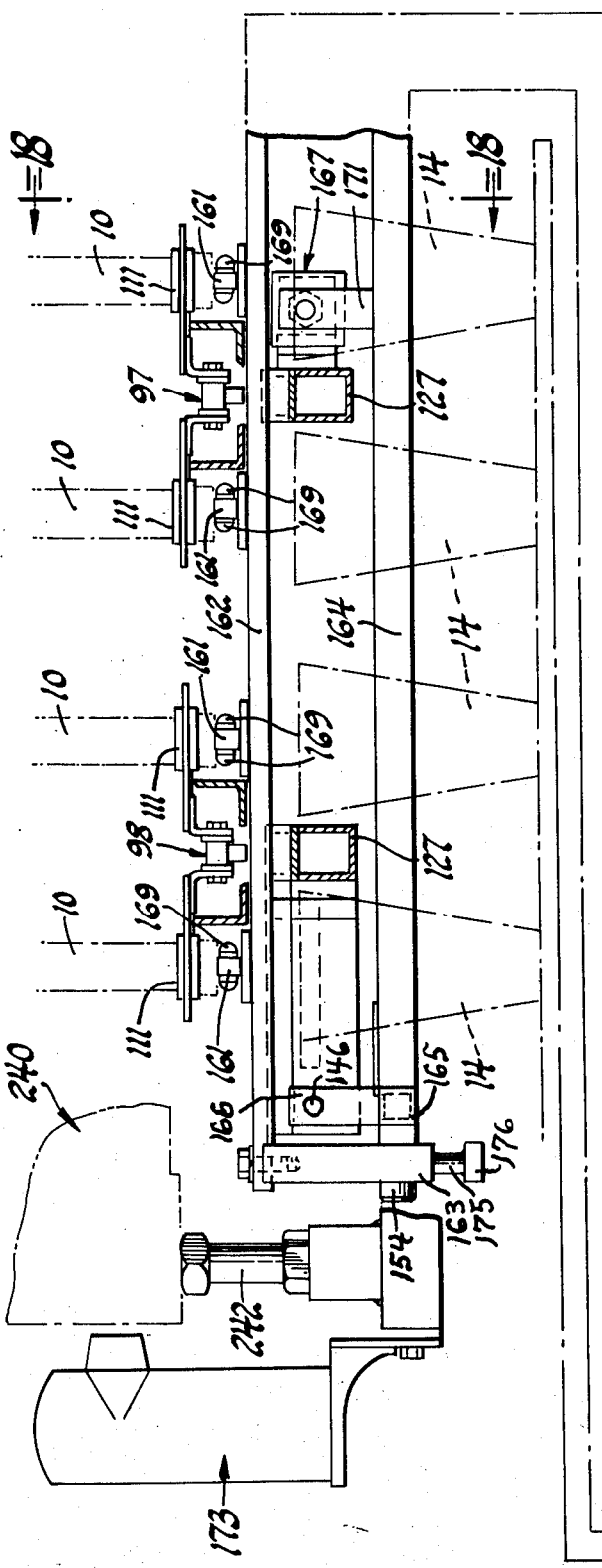
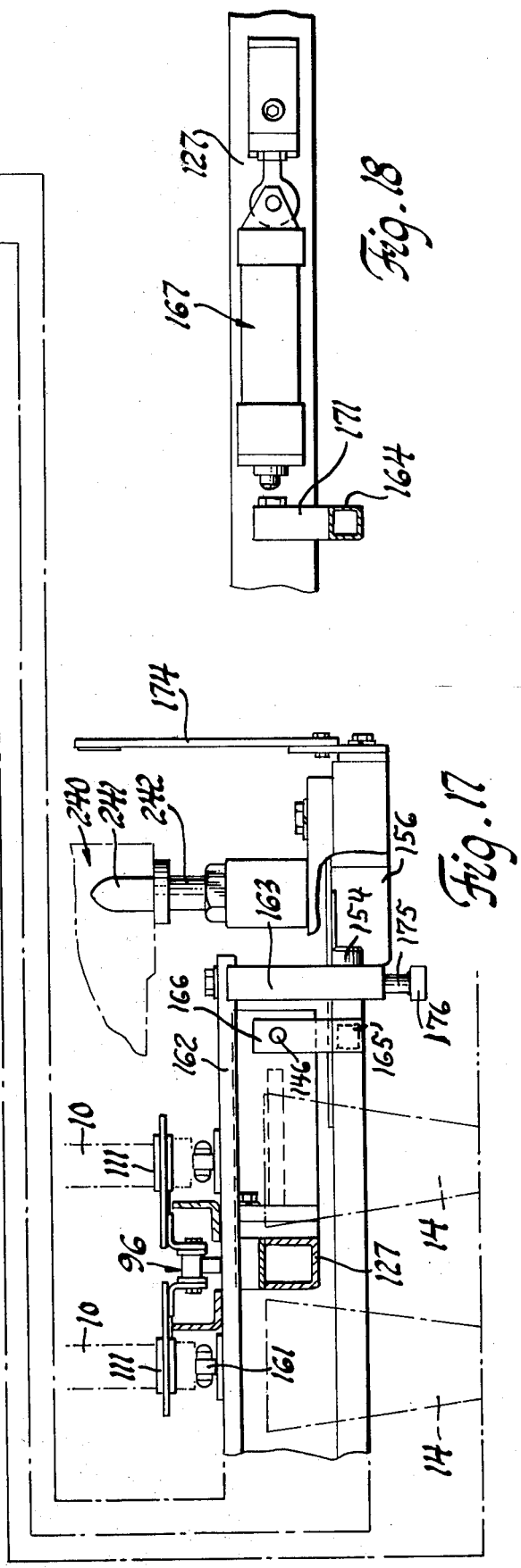

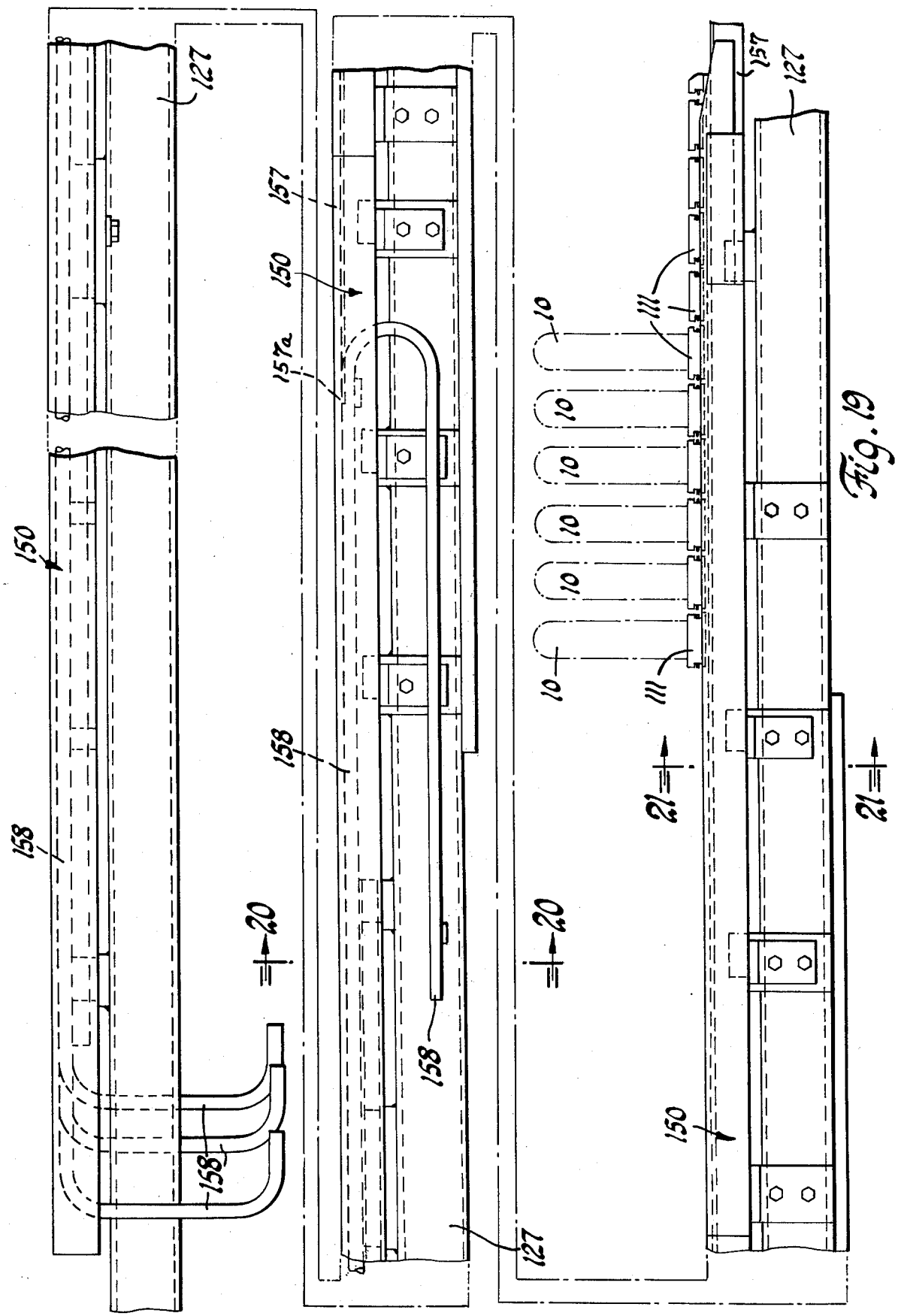

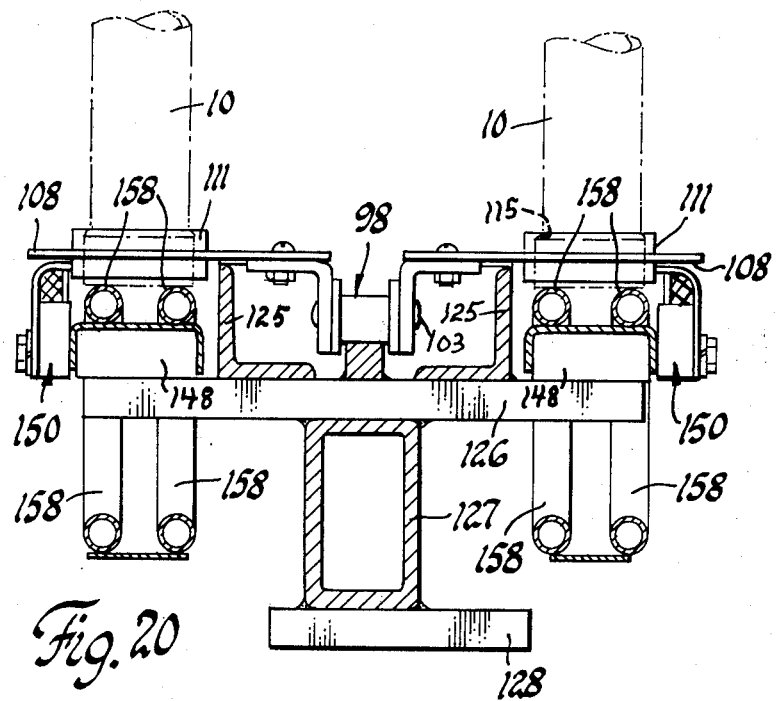
Fig. 20
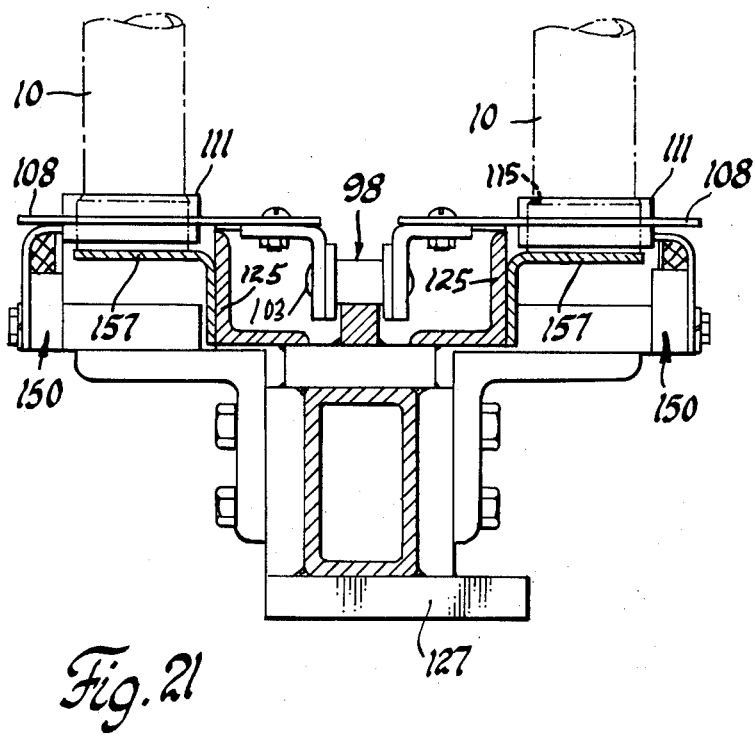
Fig. 21
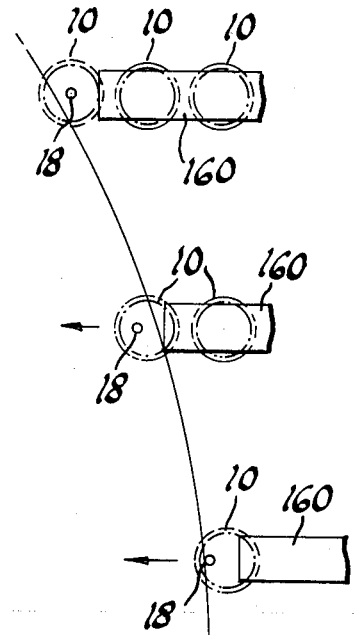
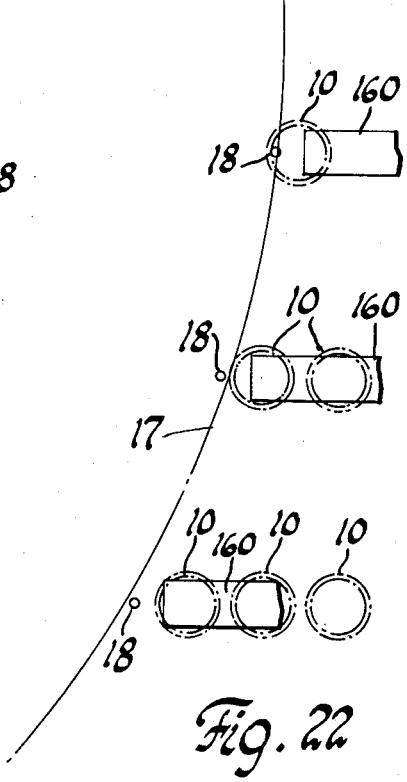
Fig. 22

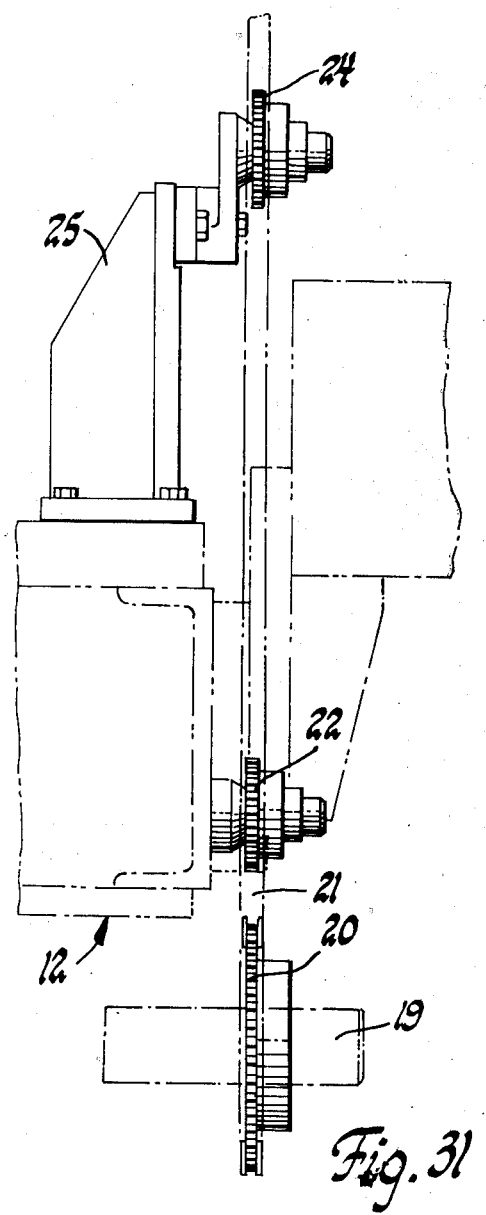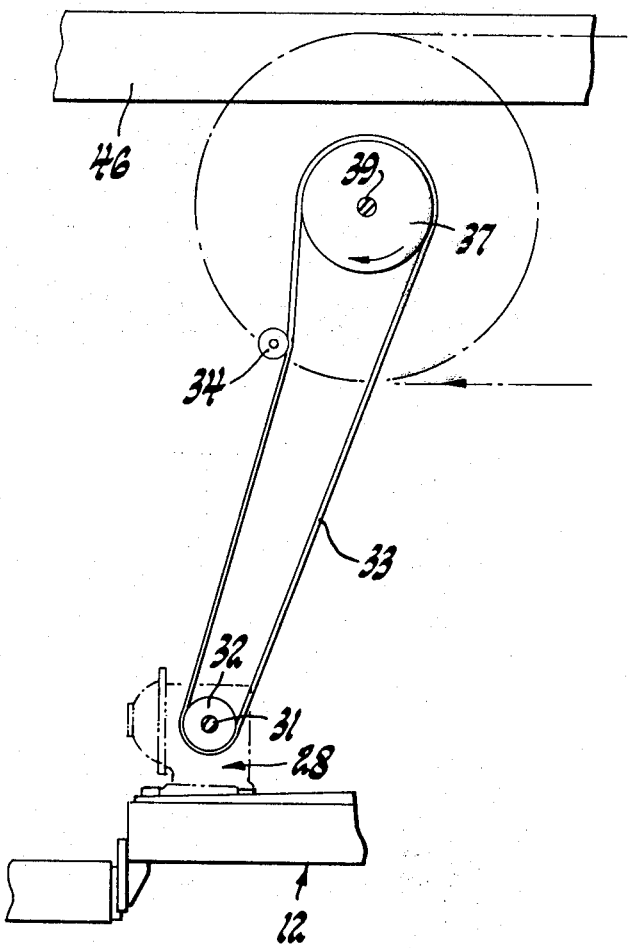
Fig. 31
Fig. 32

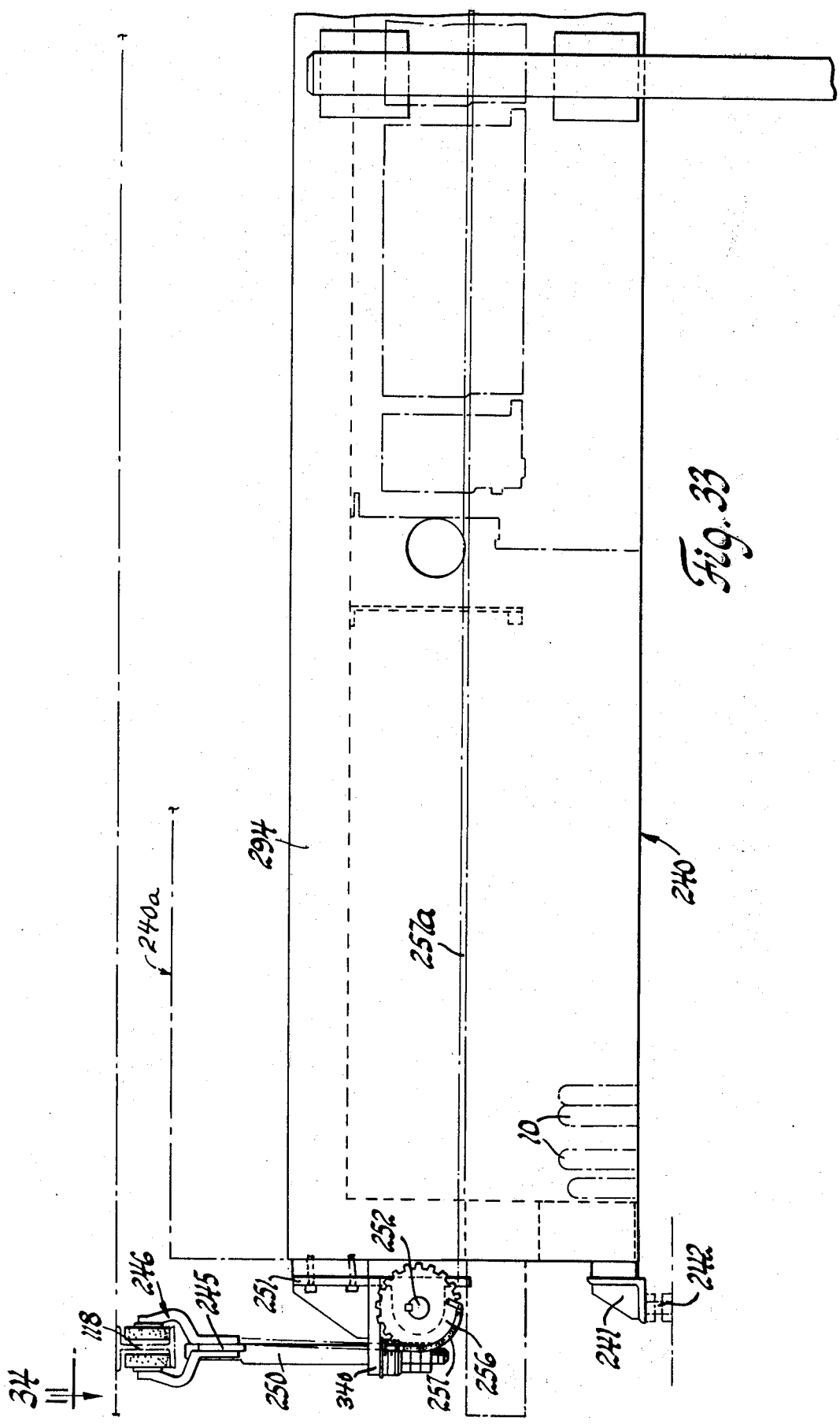

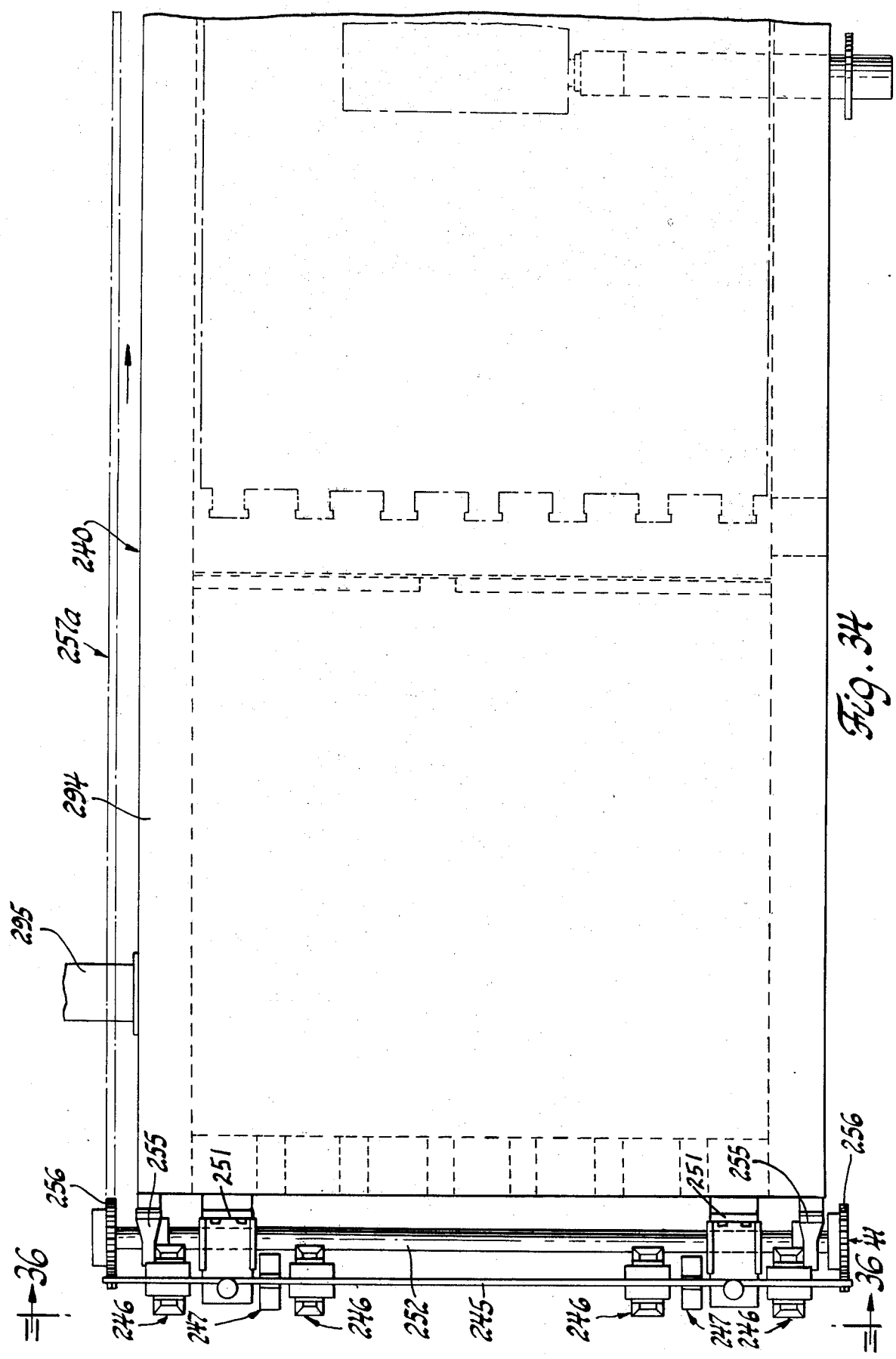

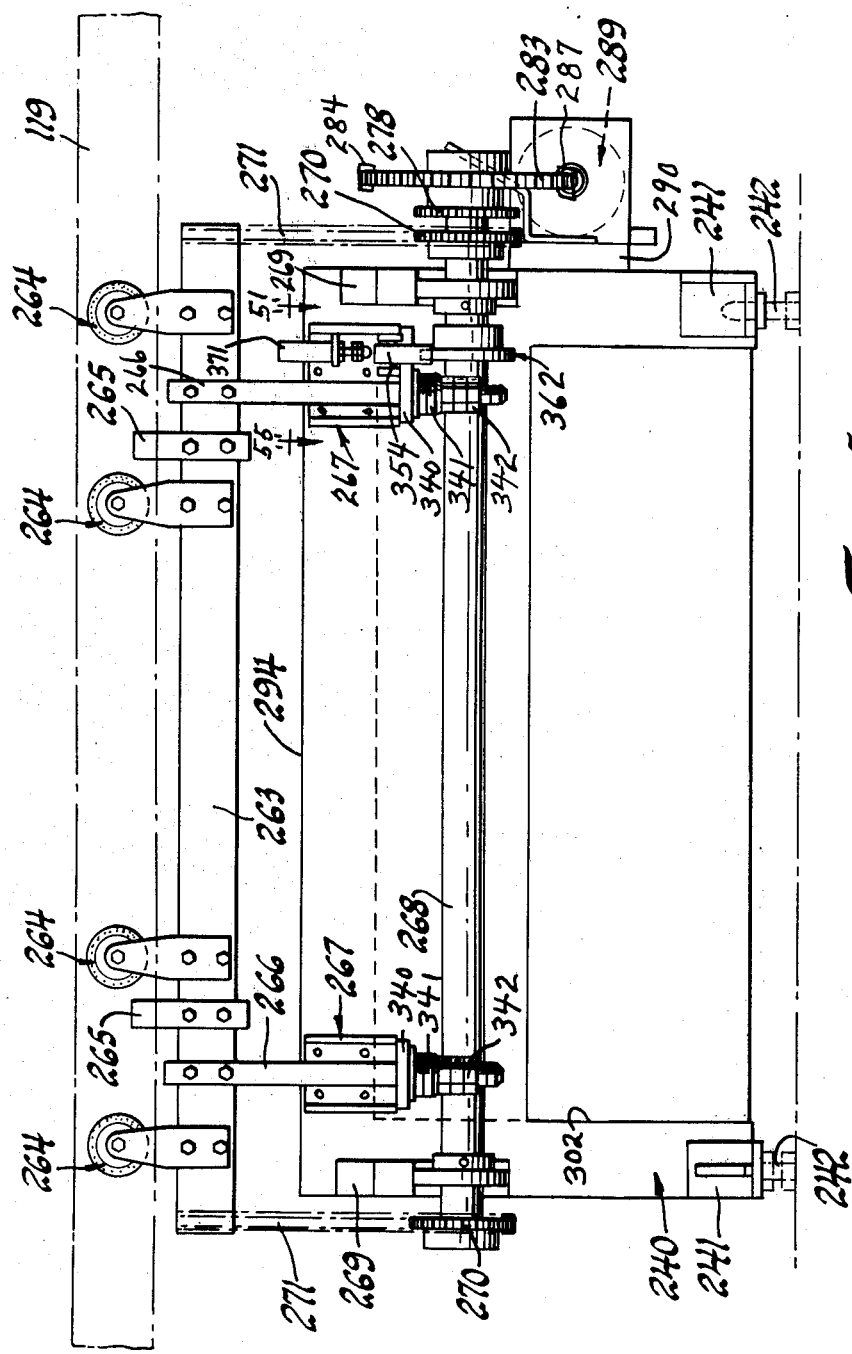

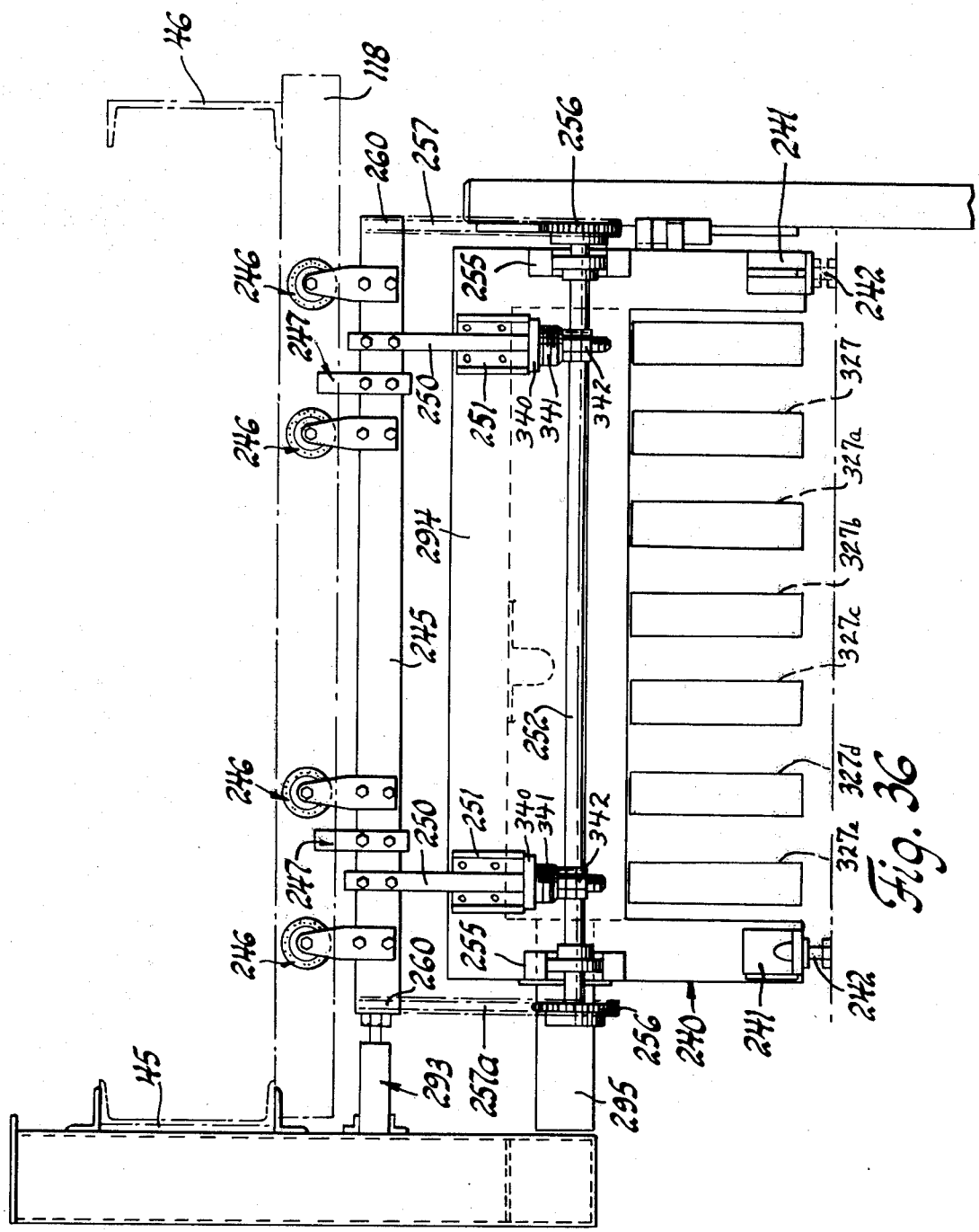

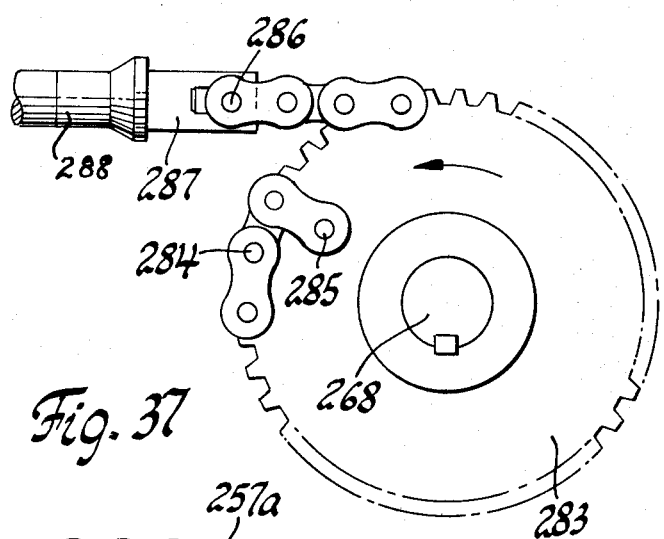
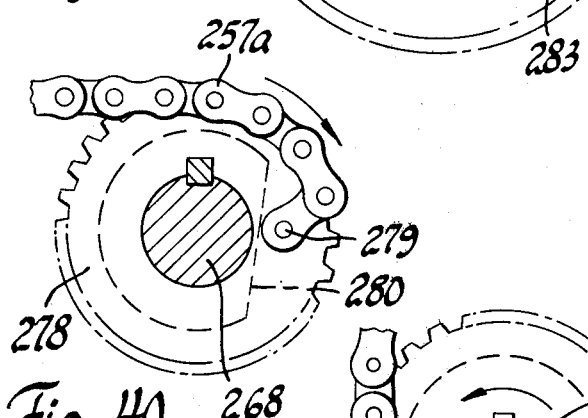
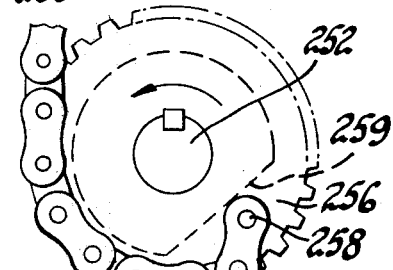
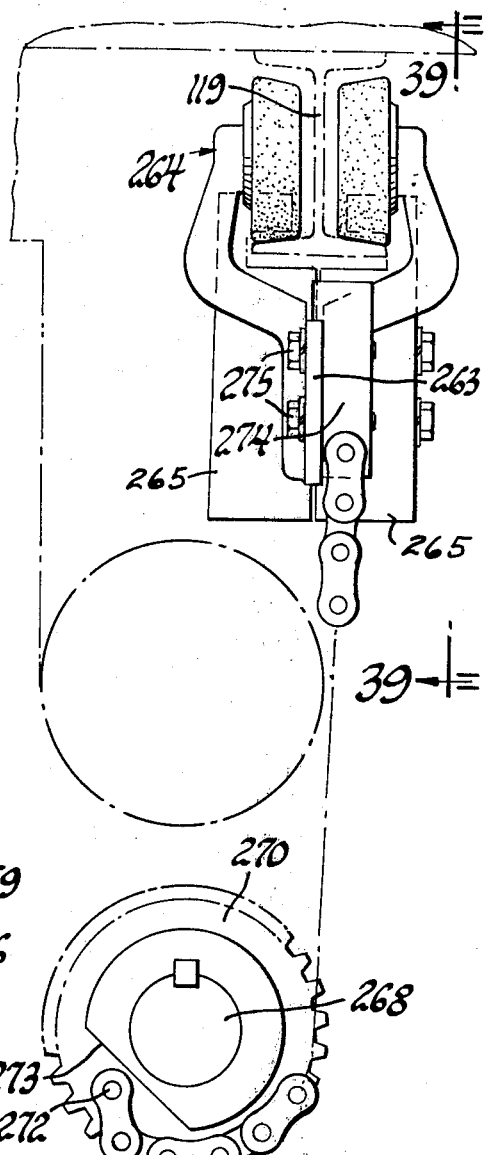
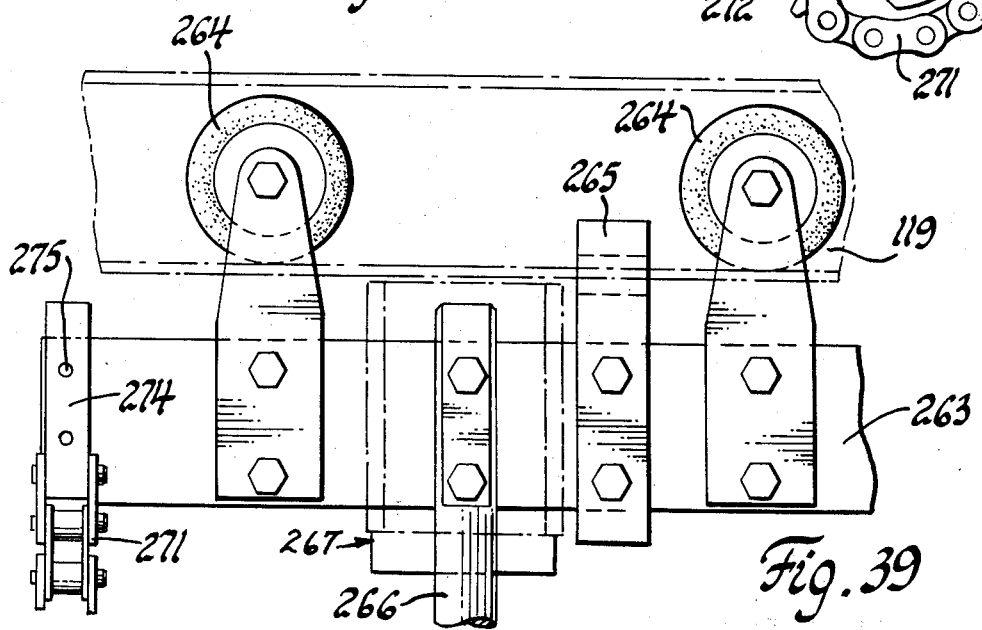

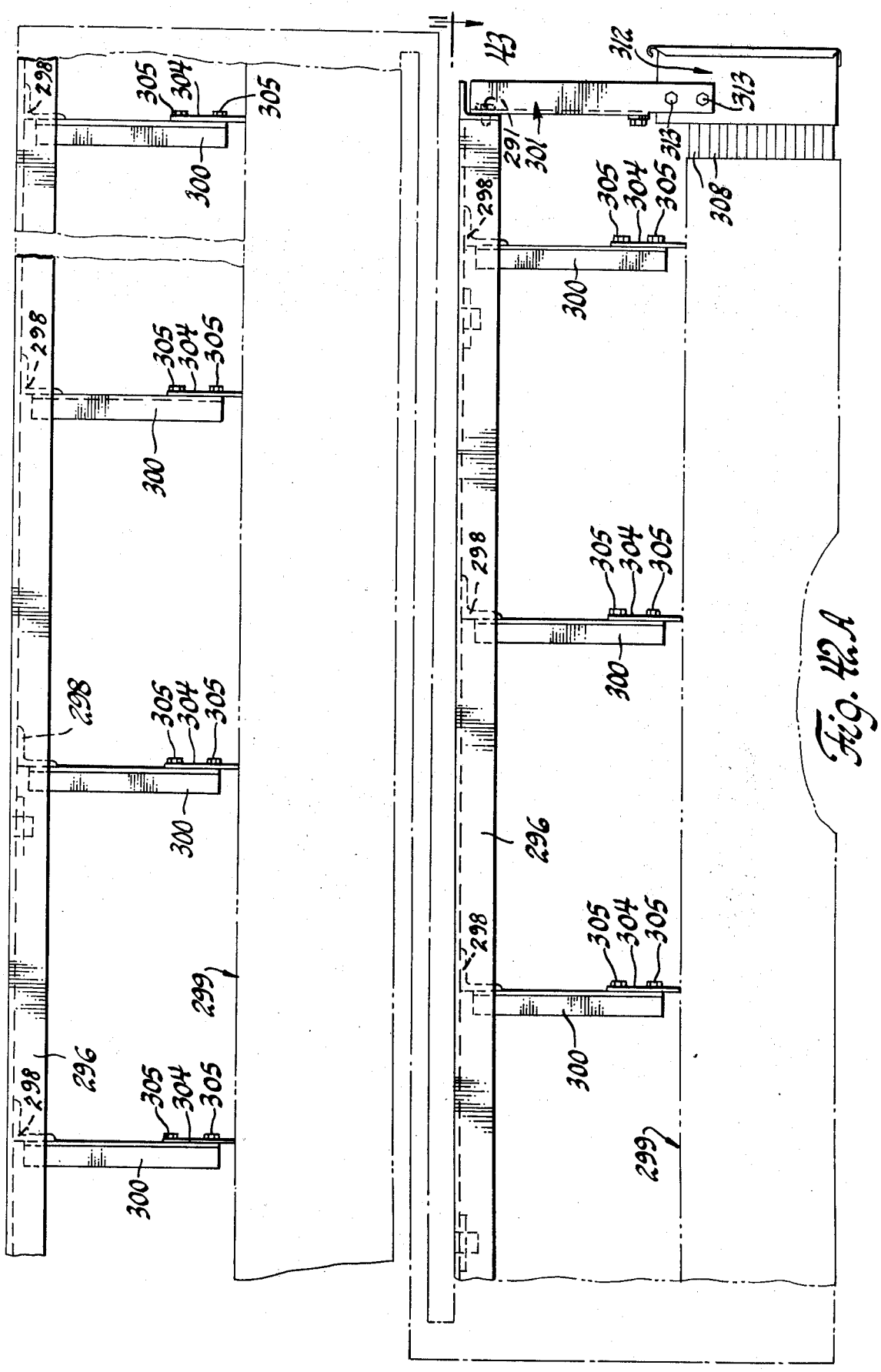

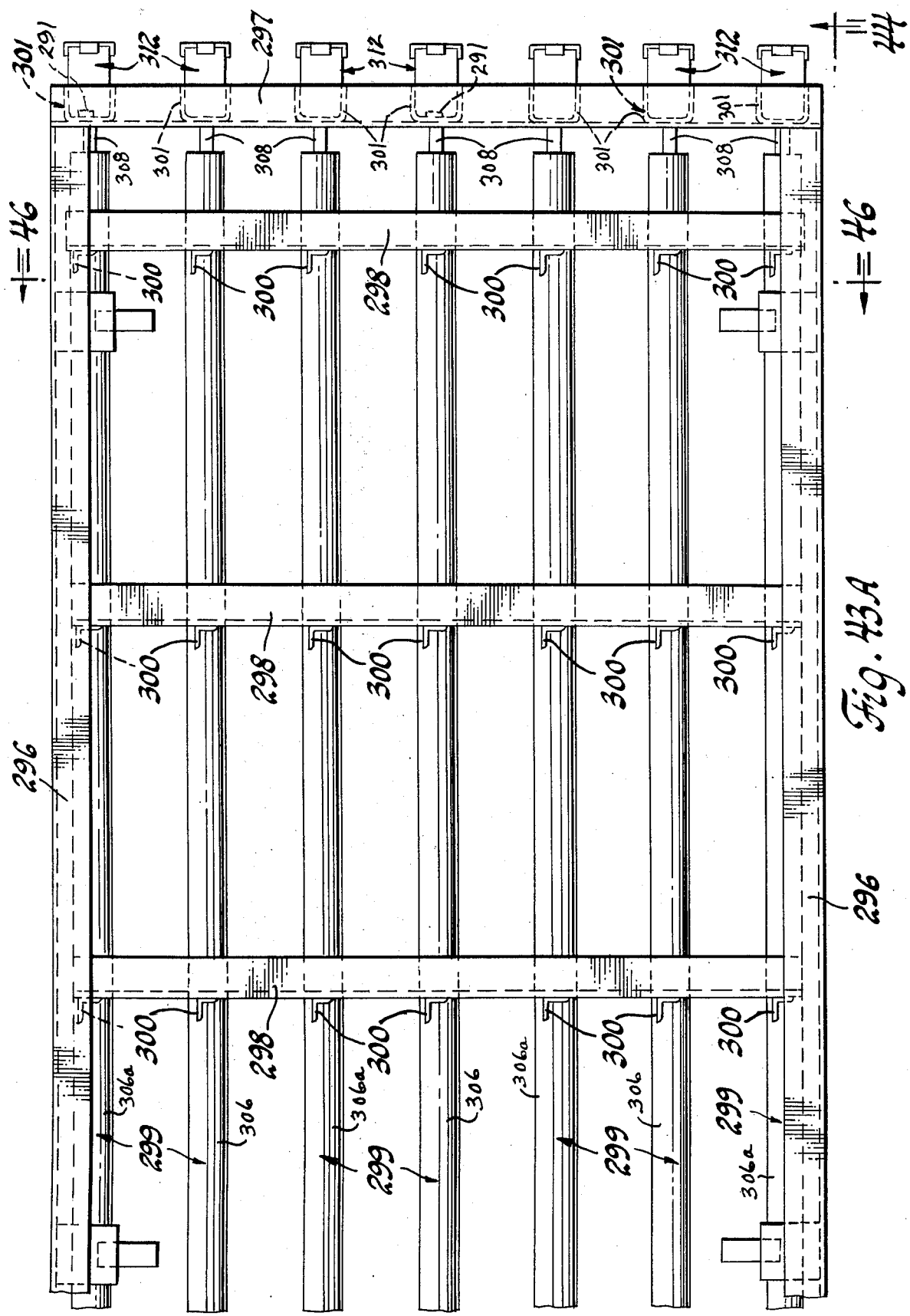

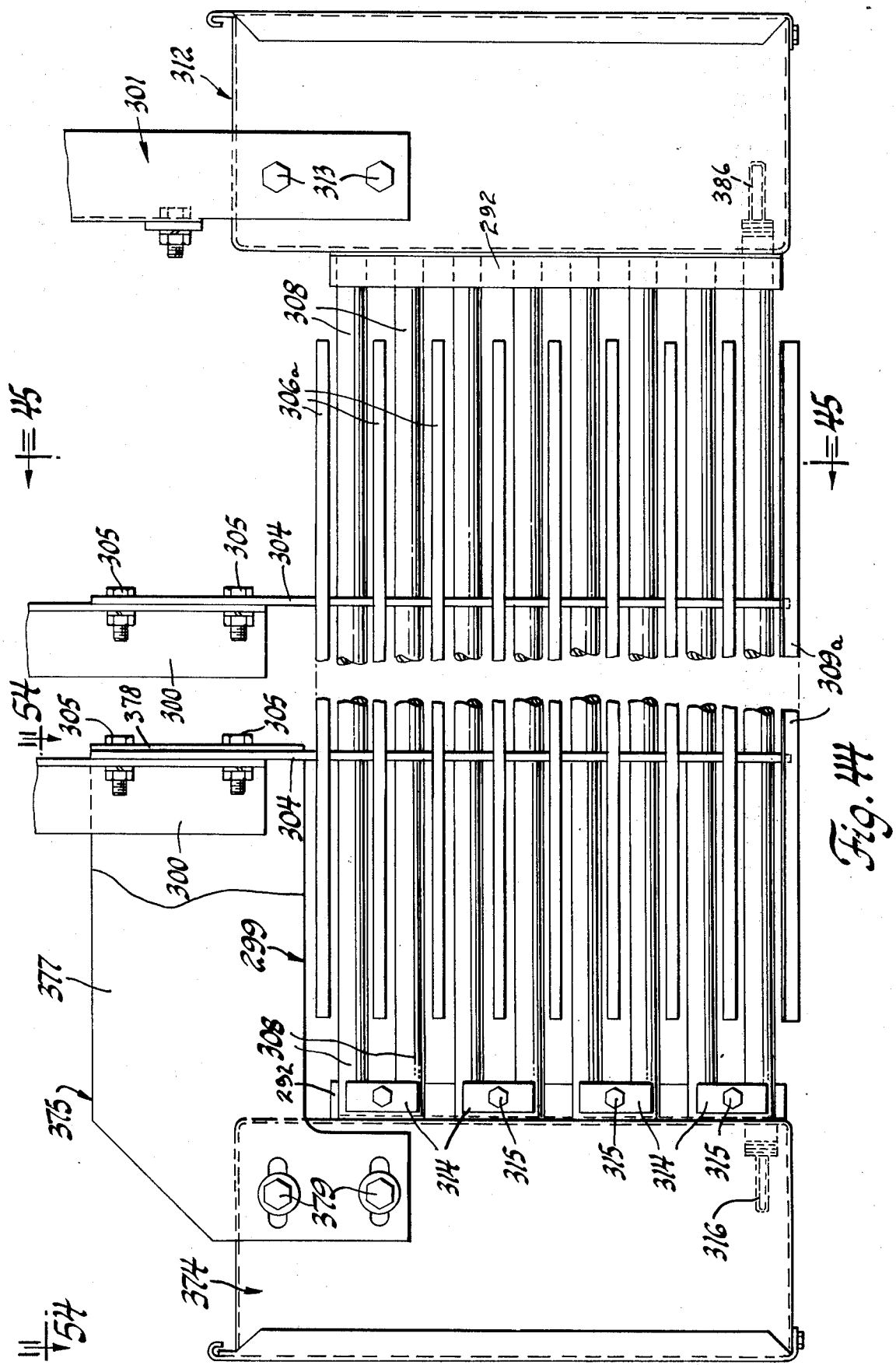

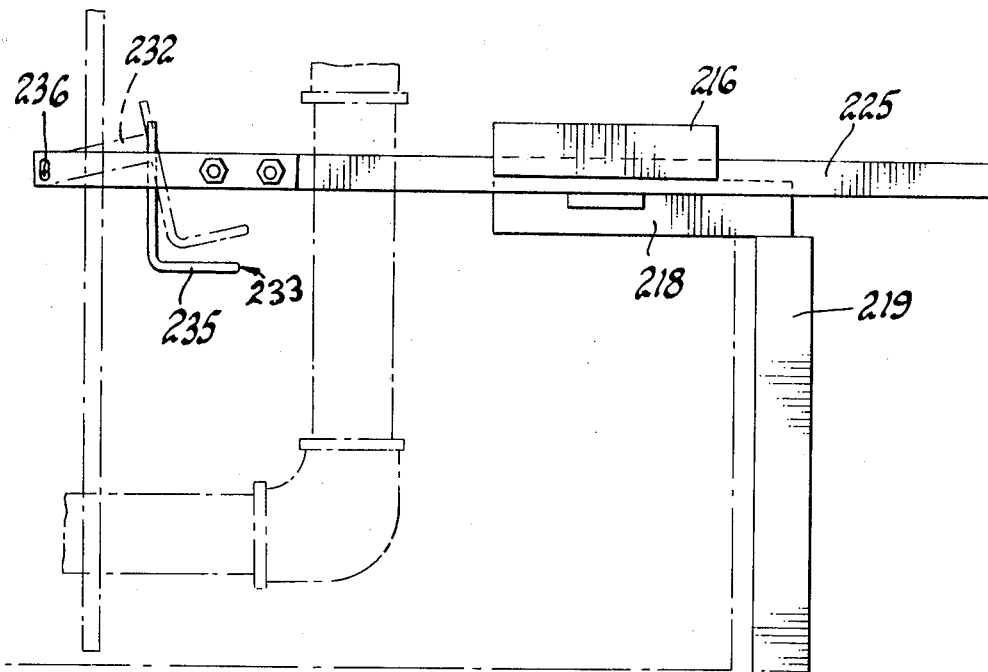
Fig. 50
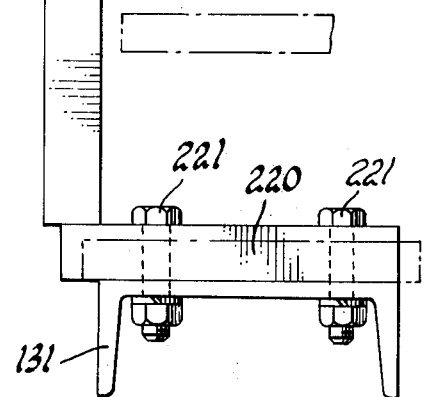

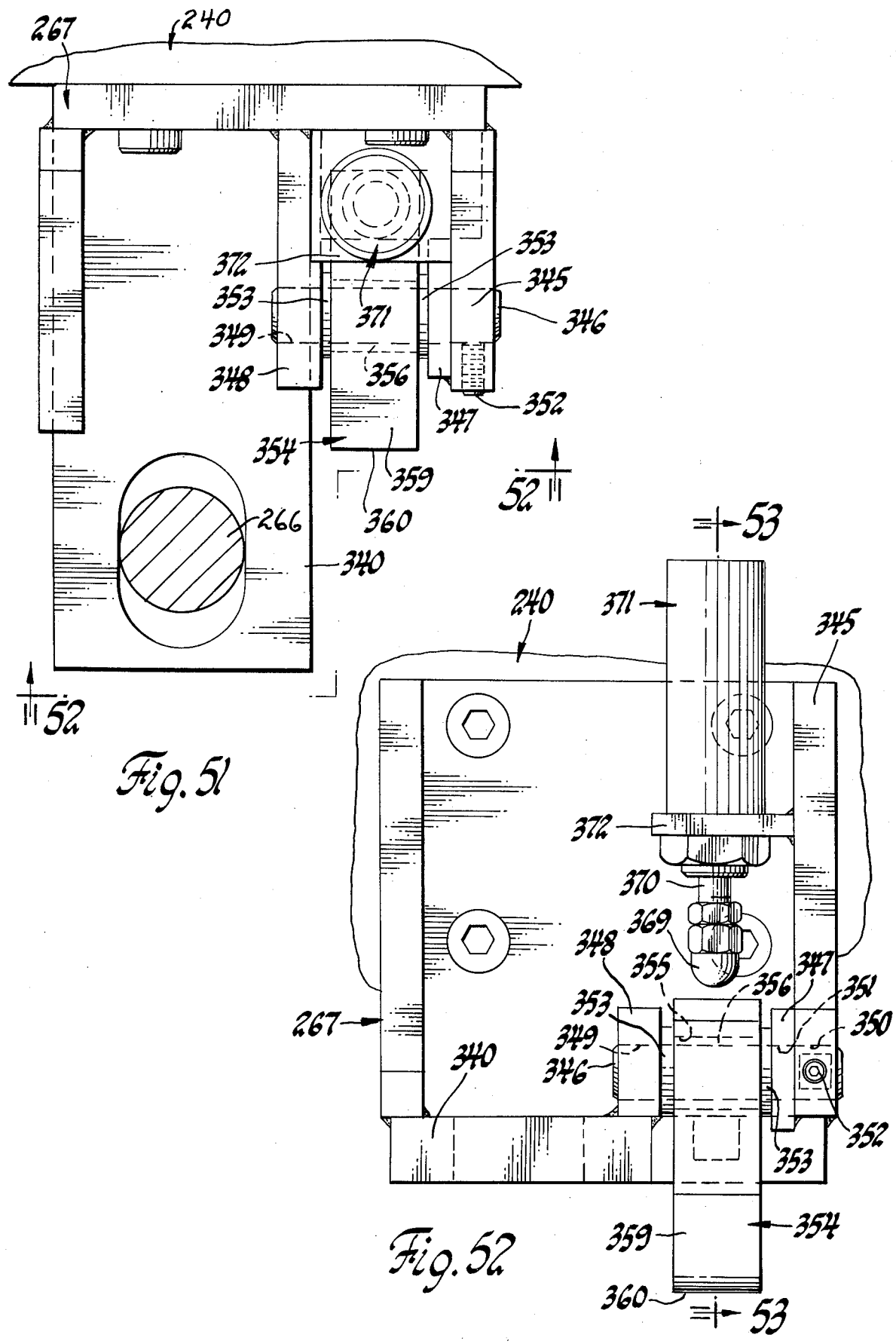

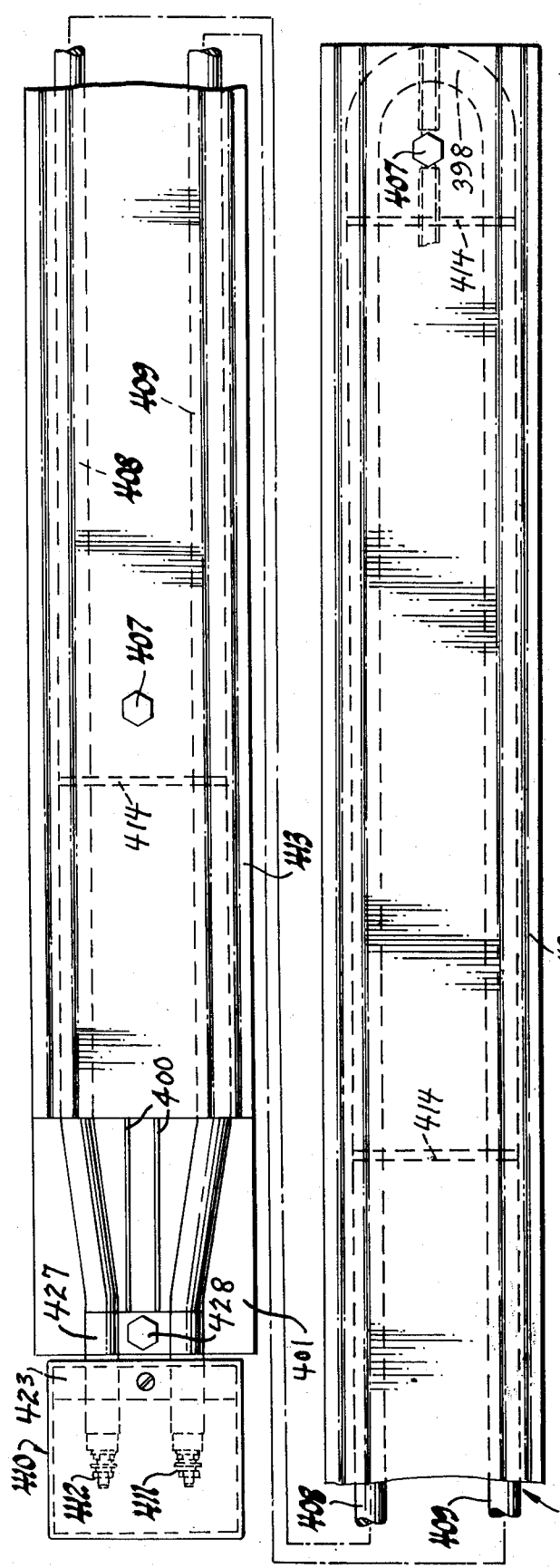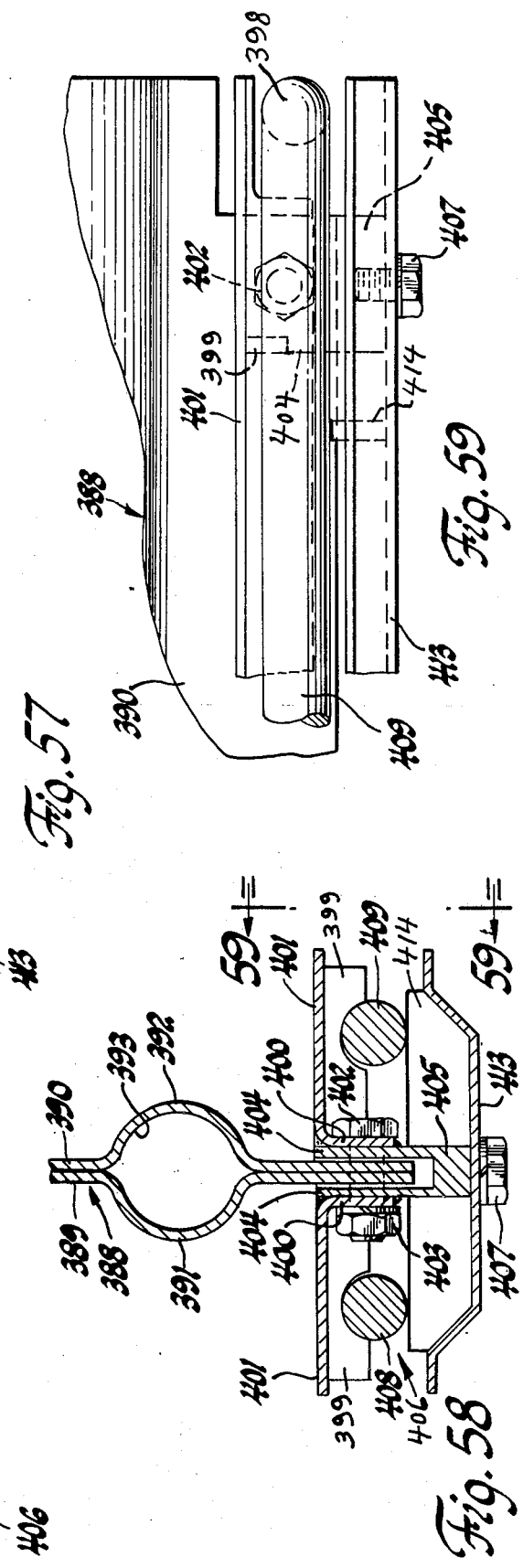

PRE-FORM REHEAT OVEN FOR STRETCH BLOW MOLDING MACHINES

SUMMARY OF THE INVENTION

This invention relates generally to the stretch blow molding art, and more particularly, to a continuous motion reheat oven for reheating preforms for subsequent stretch blow molding operations on a continuous motion stretch blow molding apparatus.

In conveying pre-forms through reheat ovens, it is desirable to maintain a minimum distance between the pre-forms as they are conveyed in a continuous line through the reheat furnace. It is also necessary, due to the nature of the pre-form reheating, that the pre-form conveyor moving through the oven operate contiuously, whether the subsequent blow molding operations are active or not. A disadvantage of the prior art pre-form reheating ovens is that they cannot maintain a minimum spacing or distance between the pre-forms while they are being conveyed through the oven because of the prior art structure required to maintain rotation of the pre-forms. Still another disadvantage of the prior art pre-form reheating ovens is that they heat a pre-form with the neck end up, and under such conditions it is not possible to control the heat rising to the neck portion, which neck portion should be maintained in a controlled cooler condition of about 150° F. A further disadvantage of the prior art pre-form reheating ovens is that the overall cost of carrying out the reheating operation is expensive due to the low production rate and high scrap or pre-form loss.

Accordingly, in view of the foregoing, it is an important object of the present invention to provide a novel and improved continuous longitudinal and rotational motion pre-form reheat oven which overcomes the aforementioned disadvantages of the prior art pre-form reheat ovens.

It is another object of the present invention to provide a novel and improved continuous linear and rotational motion pre-form reheat oven which is capable of heating a plurality of pre-forms in a fast and efficient manner, at low cost, with the pre-forms being disposed in a plurality of laterally spaced rows, and with minimum distances between each row of pre-forms.

It is still another object of the present invention to provide a novel and improved continuous motion pre-form reheat oven which is capable of applying horizontally stratified heating to the body of a pre-form while maintaning the neck end or thread portion at a cooler stable temperature. The pre-forms are conveyed in an inverted vertical postion with the neck area downward, in close proximity to controlled temperature heaters in a heating zone of the oven and cooling means in a conditioning zone of the oven, while being rotated during linear travel through the oven, and with the neck end of the pre-form in slidable engagement with a cooled guide rail means. The guide rail means includes a magnet means for magnetically engaging a carrier ring in which each pre-form is mounted, for rotating the carrier ring and pre-form during linear travel through the oven.

It is still another object of the present invention to provide a novel and improved pre-form reheat oven which includes a continuous motion conveying means having a plurality of rotatable magnetic carrier rings which convey pre-forms in an inverted position along a guide rail means, with the neck of each of the pre-forms disposed in a ring, and wherein a magnet means is disposed along the guide rail means, in the portion of the guide rail means in the oven, so that the magnet means engages the pre-form carrier rings and rotates the rings as they are moved linearly through the furnace and also exerts a downward pressure on the necks of the pre-forms to maintain them in engagement with the guide rail means.

It is a further object of the present invention to provide a novel and improved pre-form reheat oven which is adapted for conveying the pre-forms to a dump station in the event that the subsequent operations are interrupted.

It is still another object of the present invention to provide a pre-form reheat oven for reheating pre-forms and discharging the pre-forms onto a stretch pin means on a continuous motion stretch blow molding apparatus, and which includes an oven for operative mounting adjacent a contiuous motion stretch blow molding apparatus, and a continuous linear and rotational motion pre-form conveying means having a pre-form loading station and a pre-form discharge station for conveying pre-forms received at said load station through said oven for reheating the pre-forms, and thence conveying the pre-forms to said discharge station for discharging the preforms onto the stretch pin means of a stretch blow molding apparatus.

Other features and advantages of this invention will be apparent from the following detailed description, appended claims, and the accompanying drawings.

BRIEF DESCRIPTION OF THE DRAWINGS

FIG. 1 and FIG. 1A form a composite side elevational view of a pre-form reheat oven made in accordance with the principles of the present invention.

FIGS. 5 and 5A form a composite plan view of the reheat oven with the oven portion removed and showing a substantial portion of the conveyor means employed in the invention.

FIGS. 6 and 6A form a composite plan view of the pre-form turning magnets, guide rails and pre-form discharge structure employed in the illustrated embodiment of the present invention.

FIGS. 7, 7A and 7B form a composite side elevational view of the oven structure of the invention, similar to FIG. 1, but with parts added and parts removed, and showing a power drive means and additional conveyor means structure.

FIG. 17 is a broken, fragmentary, elevational section view of the oven conveyor structure illustrated in FIG. 7A, taken along the line 17—17 thereof, and looking in the direction of the arrows.

FIG. 18 is a fragmentary, elevational section view of the oven conveyor structure illustrated in FIG. 17, taken along the line 18—18 thereof and looking in the direction of the arrows.

FIG. 19 is an enlarged, fragmentary, side elevational view of the elongated magnet structure employed in the oven conveyor means, for rotating the pre-forms as they are conveyed through the oven, taken along the line 19—19 of FIG. 14, and looking in the direction of the arrows.

FIG. 20 is a fragmentary, enlarged, elevational section view of the structure illustrated in FIG. 19, taken along the line 20—20 thereof, and looking in the direction of the arrows.

FIG. 21 is a fragmentary, enlarged, elevational section view of the structure illustrated in FIG. 19, taken along the line 21—21 thereof, and looking in the direction of the arrows.

FIG. 22 is an enlarged top plan view of the pre-form discharge area of the oven conveyor means.

FIG. 31 is a fragmentary, side elevational view of the structure illustrated in FIG. 30, taken along the line 31—31 thereof, and looking in the direction of the arrows.

FIG. 32 is a fragmentary, elevational view of te structure illustrated in FIG. 29, taken along the line 32—32 thereof, and looking in the direction of the arrows.

FIGS. 33 and 33A form a composite side elevational view of the oven apparatus of the present invention, taken substantially along the line 33—33 of FIG. 4, and looking in the direction of the arrows.

FIGS. 34 and 34A form a composite top plan view of the oven structure illustrated in FIG. 33 and 33A, taken along the line 34—34 thereof, and looking in the direction of the arrows.

FIG. 35 is a right side elevational view of the oven structure illustrated in FIG. 34A, taken along the line 35—35 thereof, and looking in the direction of the arrows.

FIG. 36 is a left side elevational view of the oven structure illustrated in FIG. 34, taken along the line 36—36 thereof, and looking in the direction of the arrows.

FIG. 37 is a fragmentary, side elevation view of the structure illustrated in FIG. 34A, taken in the direction of the arrows marked "37".

FIG. 38 is a fragmentary, side elevation view of the structure illustrated in FIG. 34A, taken in the direction of the arrow marked "38".

FIG. 39 is a fragmentary, right side elevation view of the structure illustrated in FIG. 38, taken along the line 39—39 thereof, and looking in the direction of the arrows.

FIG. 40 is a fragmentary, elevational section view of the structure illustrated in FIG. 34A, taken along the line 40—40 thereof, and looking in the direction of the arrows.

FIG. 41 is a fragmentary, side elevation view of the structure illustrated in FIG. 34, taken in the direction of the arrow marked with the reference numeral "41".

FIGS. 42 and 42A form a composite, broken, side elevation view, withthe outer oven shroud removed, of the structure illustrated in FIG. 4, taken substantially along the line 42—42 thereof, and looking in the direction of the arrows.

FIGS. 43 and 43A form a composite top plan view of the structure illustrated in FIG. 42, taken substantially along the line 43—43 thereof, and looking in the direction of the arrows.

FIG. 44 is a fragmentary, enlarged, broken, side elevation view of the oven structure illustrated in FIGS. 43 and 43A, taken substantially along the line 44—44 thereof, and looking in the direction of the arrows.

FIG. 50 is a right side elevational view of the structure illustrated in FIG. 49, taken substantially along the line 50—50 thereof, and looking in the direction of the arrows.

FIG. 51 is a fragmentary, enlarged, horizontal view, partly in section, of the oven safety lock means shown in FIG. 35, taken along the line 51—51 thereof, and looking in the direction of the arrows.

FIG. 52 is a front elevational view of the structure illustrated in FIG. 51, taken along the line 52—52 thereof, and looking in the direction of the arrows.

FIG. 57 is a broken, enlarged, bottom plan view of the structure illustrated in FIG. 42, taken along the line 57—57 thereof, and looking in the direction of the arrows.

FIG. 58 is a fragmentary, enlarged, elevational section view of the structure illustrated in FIG. 42, taken along the line 58—58 thereof, and looking in the direction of the arrows.

FIG. 59 is a fragmentary, right side elevational view of the structure illustrated in FIG. 58, taken along the line 59—59 thereof, and looking in the direction of the arrows.

DESCRIPTION OF THE PREFERRED EMBODIMENTS

The pre-form reheat oven of the present invention is constructed and arranged to provide a continuous high speed supply of the reheated pre-forms to a continuous motion stretch blow molding machine of the type disclosed and claimed in the copending U.S. pending application, Ser. No. 415,851 filing date Nov. 14, 1973, which is owned by the assignee of this invention and application, and entitled "Rotary Stretch Blow Molding Machine".

The pre-forms are loaded on a continuous linear and rotational motion pre-form conveying means, at a loading station, and they are then conveyed in an inverted vertical position through an elongated oven, at a constant speed, while being freely rotated continuously. The oven includes a controlled heating means that permits reheating of the pre-forms for a subsequent blow molding operation which requires discrete heating of the pre-form body while maintaining the neck or thread portion of the pre-form at a cool temperature. Pre-form rotation is accomplished by the interaction of a rotating sleeve or ring, in which each of the pre-forms is operatively mounted, and a magnetic support rail. The pre-forms are conveyed through the oven along a linear path and in close proximity to the heating means. The conveying means of the present invention is adapted to convey a plurality of pre-forms along a plurality of adjacent linear paths, at a minimum pitch or distance between the pre-forms.

The oven is provided with a heating means which provides a constant heat throughout the length of the oven but which provides horizontally stratified zones of heat axially of the vertically disposed pre-forms as they are fed through the oven. The heating means includes a plurality of individual heaters provided with individual controls.

The pre-forms employed may be made from any suitable thermoplastic resin, as for example, polymers and copolymers of polypropylene. The resin may be extruded or molded into the pre-forms, and then conveyed by suitable means to the load station of the pre-form conveying means.

Figure 1A:
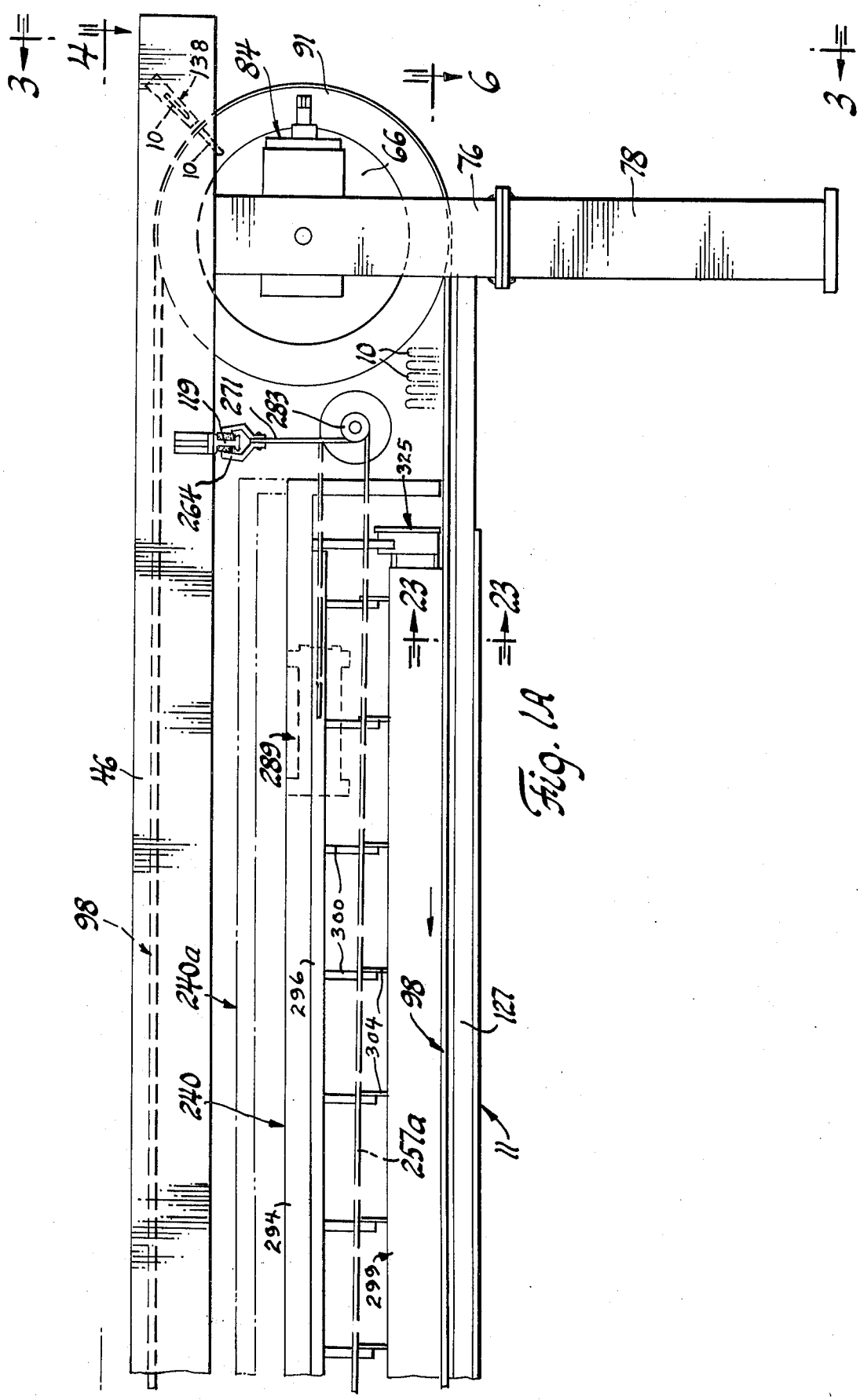

The apparatuses for initially forming the pre-forms do not form any part of this invention, and any suitable such apparatuses may be employed. As shown in FIG. 1, the numeral 10 generally designates a pre-form which is substantially test tube shaped. The elongated tubular pre-forms 10 have a closed bottom end, and an open top end around which is formed the usual bottle neck thread.

The numeral 11 in FIG. 1 generally indicates an illustrative embodiment of the present invention. The numeral 12 generally designates the pre-form loading rotary turret of the aforementioned stretch blow molding machine which is generally indicated by the numeral 13.

Figure 4:
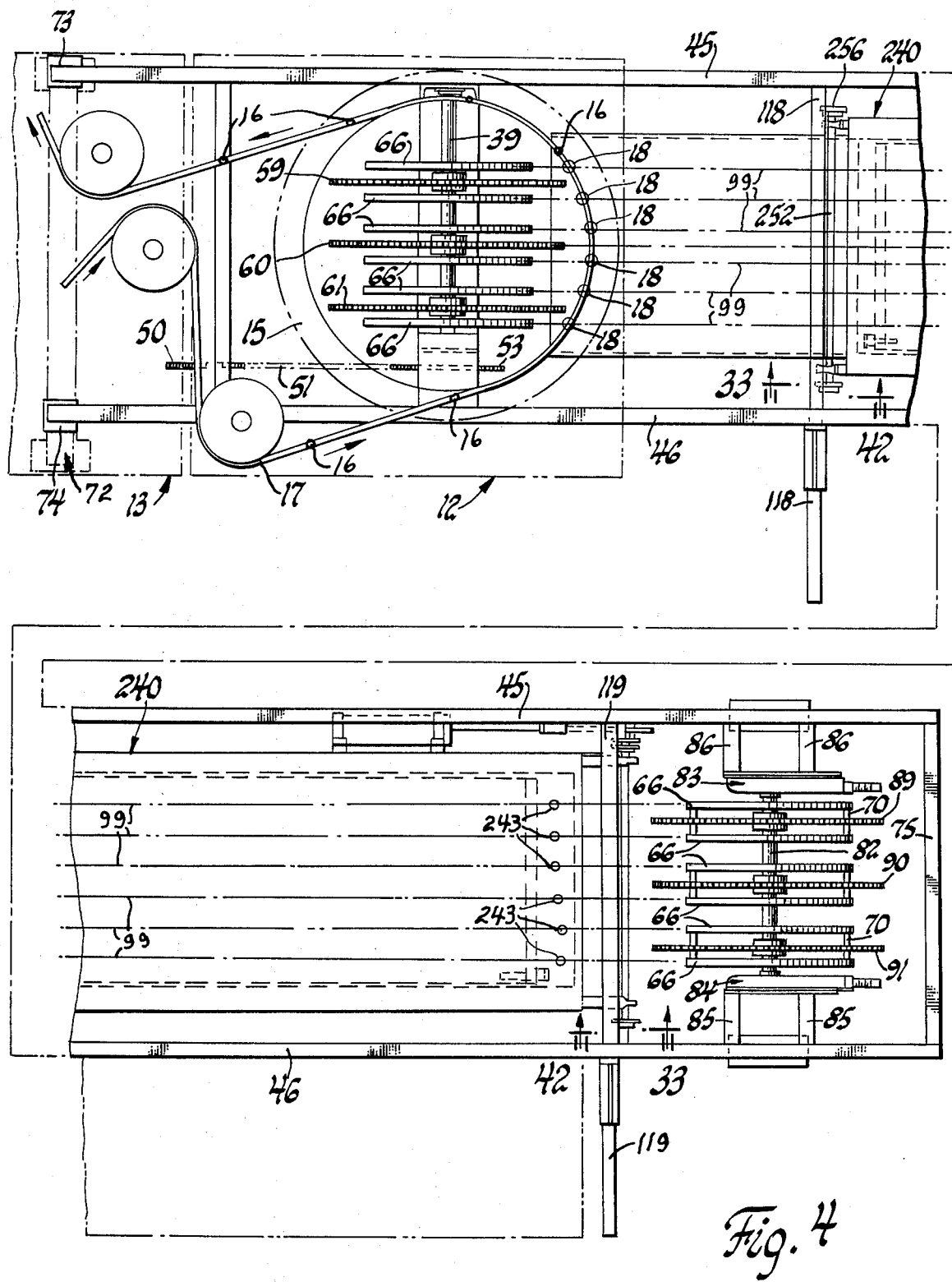
FIG. 4 is a top plan view of the reheat oven structure illustrated in FIGS. 1 and 1A, taken along the line 4—4 thereof, and looking in the direction of the arrows.

As shown in FIG. 1, the pre-form loading rotary turret 12 includes a plurality of pre-form loading funnels or chutes 14 which are annularly disposed and carried on a cylindrical carrier member 15. The continuously rotating carrier member 15 moves the pre-form funnels 14 under the discharge station of the reheat oven 11, as more fully described hereinafter, so that they each receive a reheated pre-form 10 for conveying the same downwardly into an operative position on a stretch pin assembly, indicated by the numeral 16. As shown in FIG. 4, the stretch blow molding machine includes a continuous carrier chain 17 which carries the stretch pin assemblies 16 through an arcuate discharge path so as to move each of the chutes 14 to a respective pre-form drop point, indicated by the numeral 18 in FIGS. 1 and 4. The drop point 18 for each of the linear flow paths of the pre-forms through the oven 11 are varied so as to be commensurate with the arcuate path of the stretch pin assemblies 16, as more fully explained hereinafter.

Figure 29:
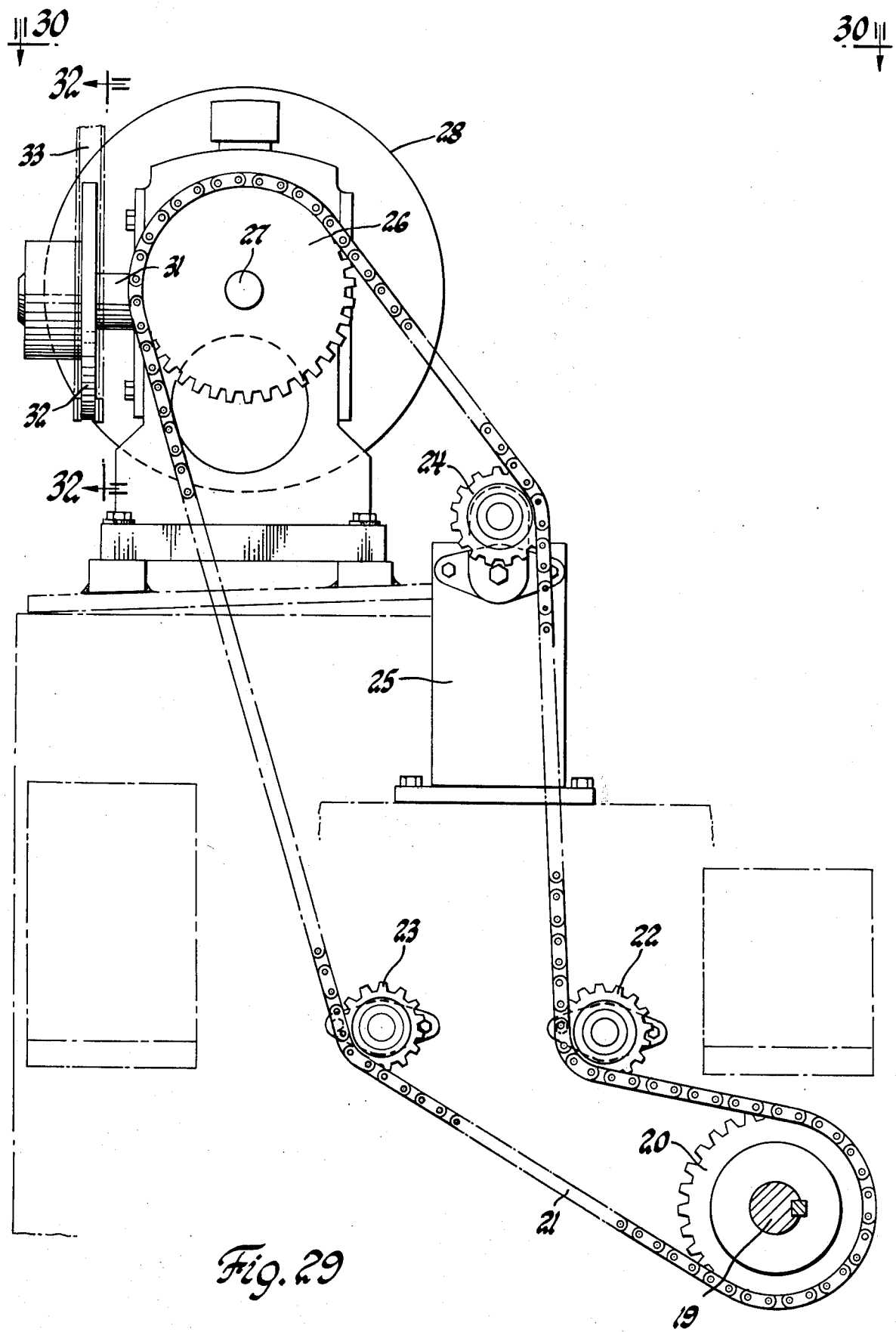
FIG. 29 is a fragmentary, elevational view of the main drive structure illustrated in FIG. 1, taken substantially along the line 29—29 thereof, and looking in the direction of the arrows.
Figure 30:
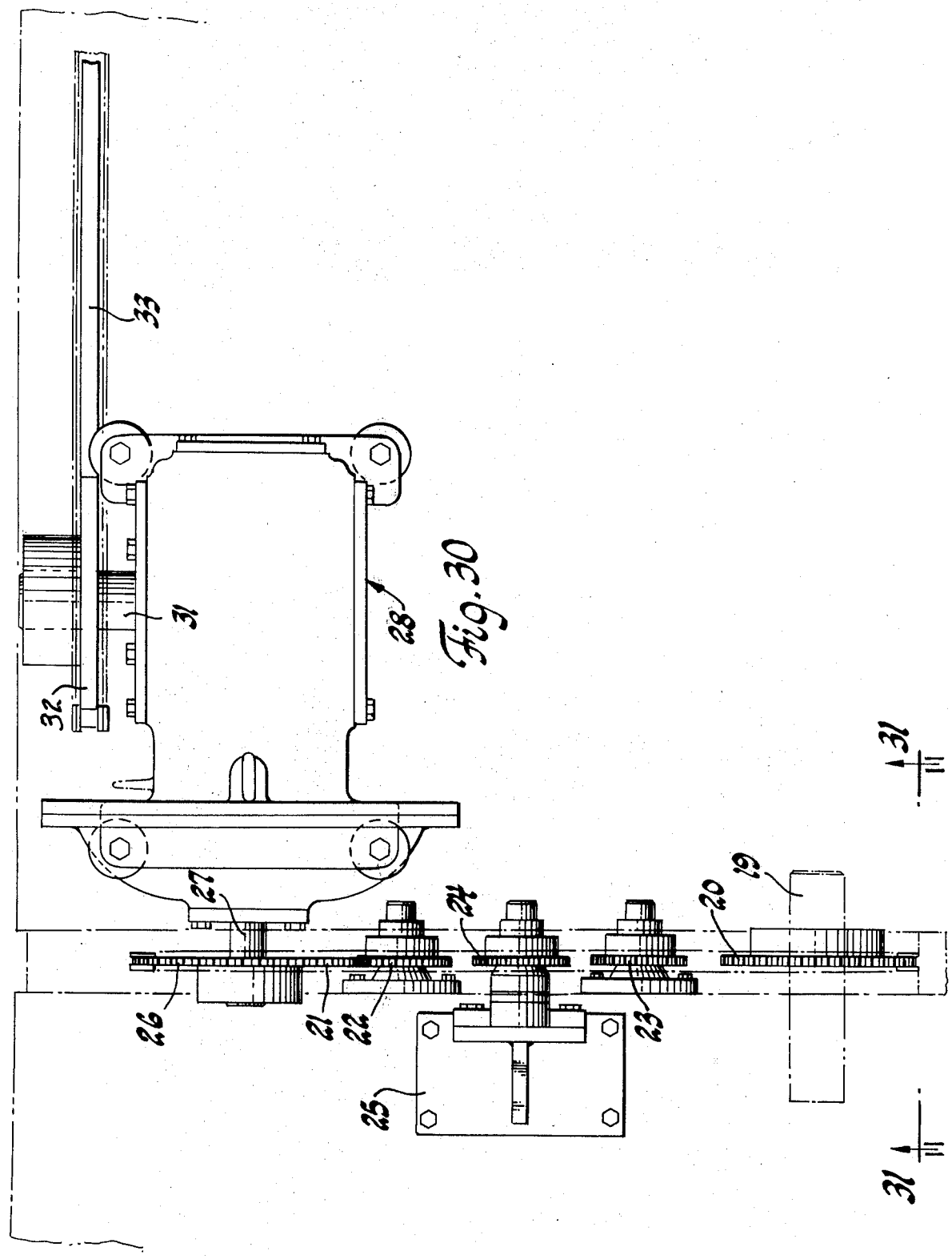
FIG. 30 is a top plan view of the structure illustrated in FIG. 29, taken along the line 30—30, and looking in the direction of the arrows.

The conveying means of the reheat oven of the present invention receives constant speed power input from the stretch blow molding machine 13 into which it is discharging pre-forms. However, it will be understood that it could be provided with any suitable separate power drive means. As shown in FIG. 1, a secondary drive shaft 19 of the stretch blow molding machine 13 is the source of the constant speed power input for the oven conveying means. The drive shaft 19 has fixedly mounted thereon, by any suitable means, a drive sprocket 20. As best seen in FIG. 29, the drive sprocket 20 is drivingly engaged with a suitable continuous drive chain 21 which operatively meshes with a pair of idler gears 22 and 23 and a driven sprocket 26 which is fixedly mounted on the input shaft 27 of a suitable right angle gear reducer, generally indicated by the numeral 28. The idler gears 22 and 23 are rotatably mounted by any suitable means on the stretch blow molding machine 13. The drive chain 21 is also operatively engaged with a chain take-up gear 24 which is adjustably mounted on a support member 25 that is fixed on the stretch blow molding machine 13.

Figure 2:
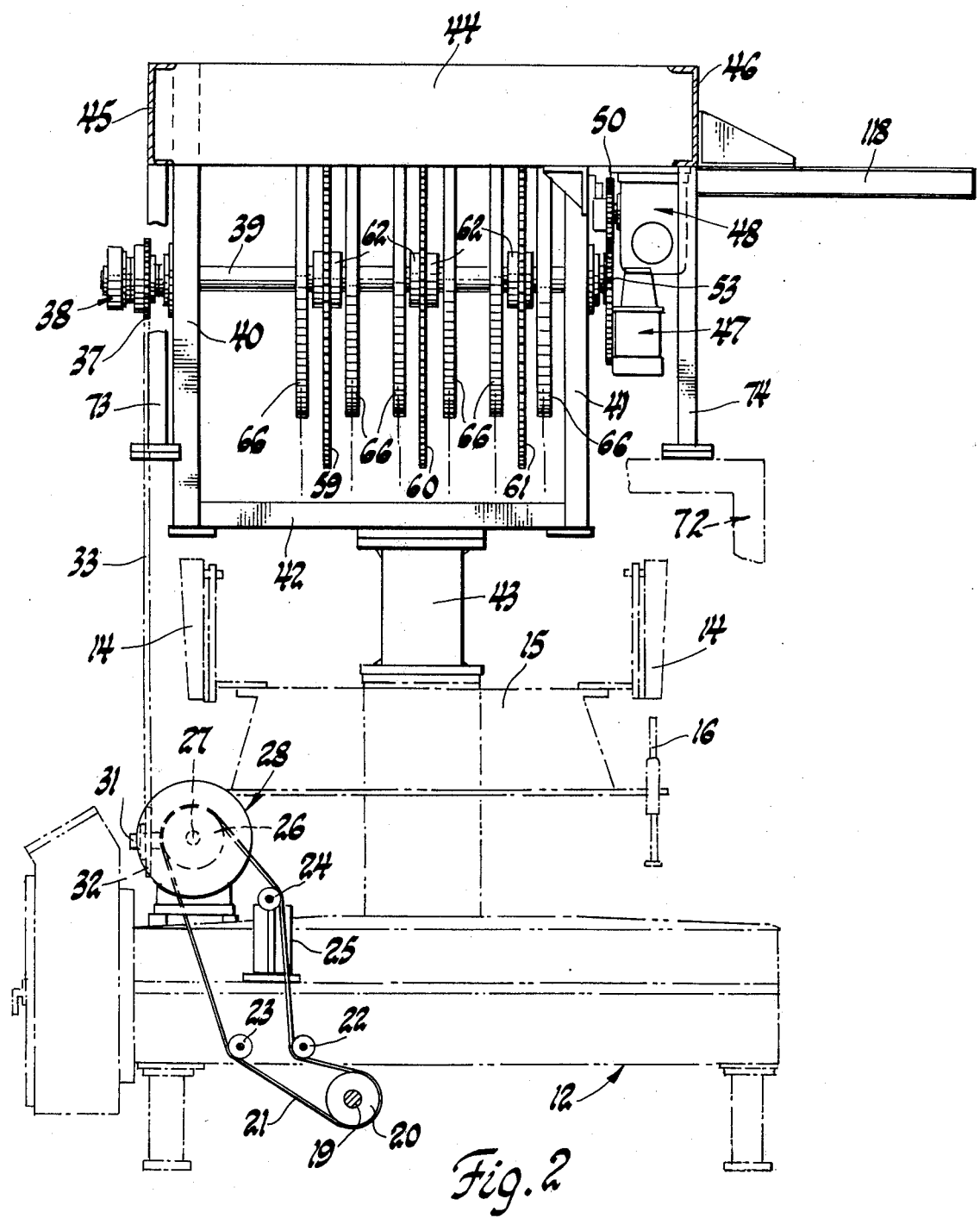
FIG. 2 is a left side elevational view of the reheat oven structure shown in FIG. 1, taken substantially along the line 2—2 thereof, and looking in the direction of the arrows.
Figure 10:
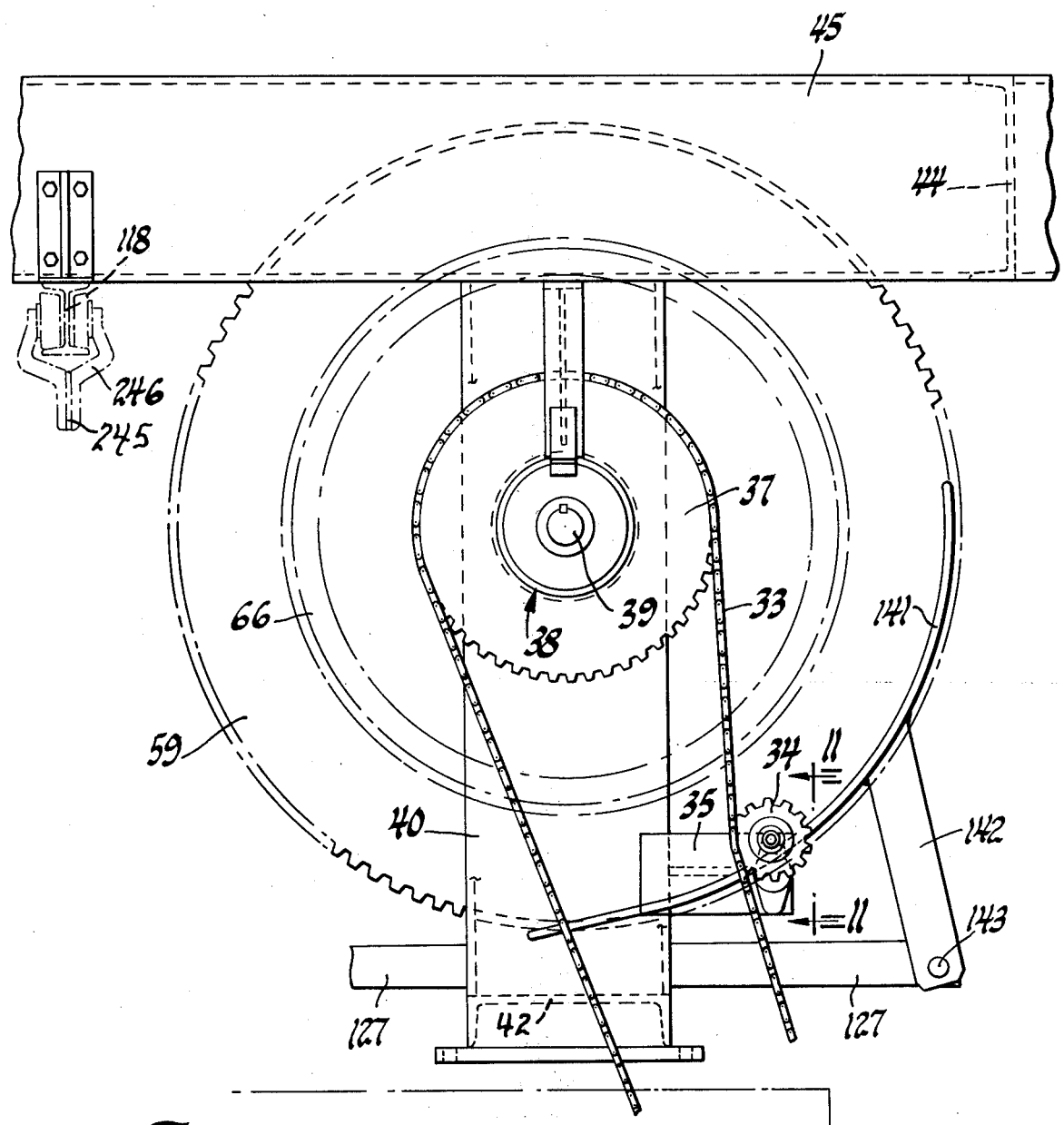
FIG. 10 is a fragmentary, enlarged, side elevational view of the oven structure illustrated in FIG. 5, taken along line 10—10 thereof, and looking in the direction of the arrows.
Figure 11:
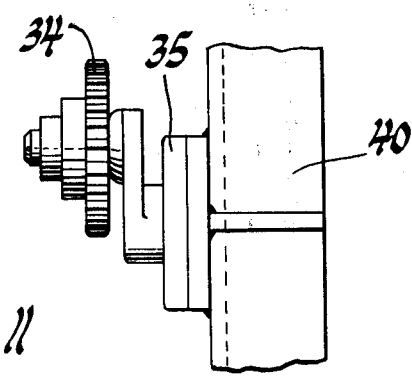
FIG. 11 is a fragmentary, enlarged, elevational section view of the oven structure illustrated in FIG. 10, taken along the line 11—11 thereof, and looking in the direction of the arrows.

As shown in FIGS. 1 and 32, the gear reducer 28 is provided with an output shaft 31 which has operatively mounted thereon a drive sprocket 32. The drive sprocket 32 is drivingly engaged with a drive chain 33 which meshes with a drives a drive sprocket 37 that is operatively mounted on a suitable clutch means generally indicated by the numeral 38 (FIG. 2). The clutch means 38 is operative to selectively engage the drive sprocket 37 with the oven conveyor means drive shaft 39, as shown in FIG. 2. As shown in FIG. 32, the drive chain 33 is provided with a suitable chain take-up gear 34. As shown in FIGS. 10 and 11, the chain take-up gear 34 is adjustably carried on a support member 35 which is fixedly secured, as by welding, to one of the oven vertical support frame channels 40.

Figure 9:
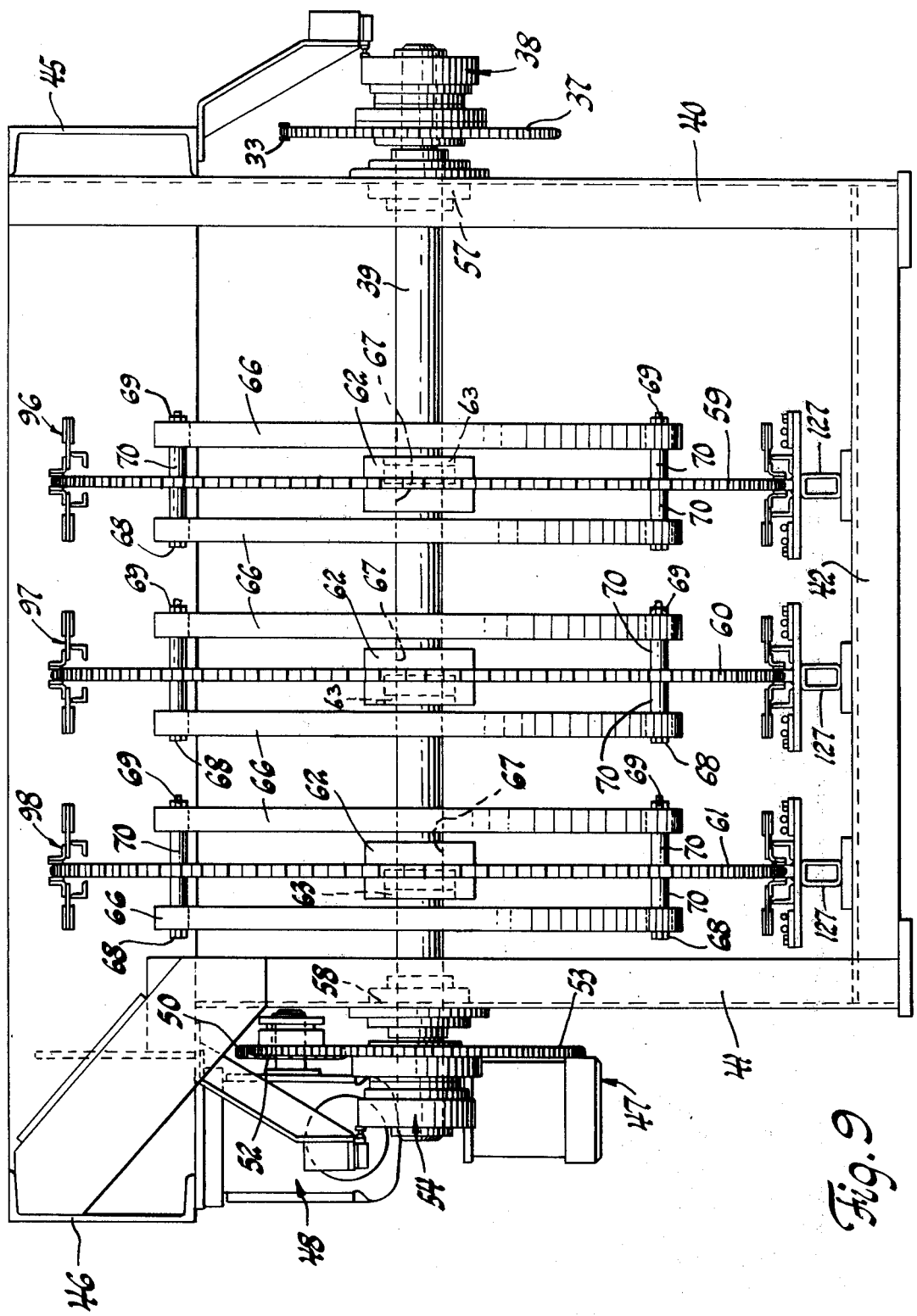
FIG. 9 is an enlarged, elevational section view of the oven structure illustrated in FIG. 6, taken along the line 9—9 thereof, and looking in the direction of the arrows.

As shown in FIG. 9, the conveying means includes an elongated frame structure which includes a pair of vertically disposed, spaced apart, vertical support channels 40 and 41 which are connected at the lower ends thereof by a fixed horizontal support channel 42. As shown in FIG. 2, the support channel 42 is operatively mounted on the upper end of a frame support post 43 which comprises the center post for the pre-form loading rotary turret 12. As shown in FIG. 2, the upper ends of the frame members 40 and 41 are fixed to an upper transverse frame channel 44. The channel 44 is fixed at its end, as by welding, to one end of each of a pair of longitudinally disposed, spaced apart frame channels 45 and 46.

The conveying means is provided with an auxiliary power drive system to permit the reheat oven to function if the stretch blow molding machine 13 should be shut down for any reason. In the event that the stretch blow molding machine 13 is shut down, the reheat oven of the present invention is kept operating so as not to lose process control and to protect the pre-forms which are in process in the oven. The folowing described auxiliary drive system would automatically take over the drive of the oven conveying means through suitable automatic controls in the event that the stretch blow molding machine 13 is shut down for any reason.

As shown in FIGS. 2 and 5, the aforedescribed main power drive system for the conveying means is operatively connected to one end of the conveying means drive shaft 39, and the auxiliary power drive means is operatively connected to the opposite end of the drive shaft 39. As best seen in FIGS. 1, 2 and 7, the auxiliary power drive means includes a suitable electric drive motor, generally indicated by the numeral 47, which is operatively connected to and supported on a suitable gear reducer means, generally indicated by the numeral 48. The gear reducer means 48 is provided with an output shaft 49 which has operatively mounted thereon a drive sprocket 50. The drive sprocket 50 meshes with and drives a suitable continuous drive chain 51 which is operatively mounted around a driven sprocket 53 that is mounted on a suitable air operated clutch, generally indicated by the numeral 54. The last described drive chain system includes a suitable take-up gear 52, as shown in FIGS. 1 and 7. As shown in FIG. 9, the conveying means drive shaft 39 is rotatably mounted in a pair of suitable bearing means 57 and 58 which are operatively mounted on the frame vertical support channels 40 and 41, respectively.

As shown in FIGS. 2, 4, 5 and 9, the pre-form conveying means includes three large diameter drive sprockets 59, 60 and 61 which are laterally spaced apart on the drive shaft 39. The sprockets 59, 60 and 61 each include a hub 62 having a bore 67, and each hub is drivingly secured to the shaft 39 by any suitable means, as by a suitable timing and locking assembly 63.

As shown in FIGS. 5 and 9, each of the drive sprockets 59, 60 and 61 carries a pair of cog rings or cog wheels 66 for operative engagement with the closed ends of the pre-forms which are not discharged for some reason at the exit end of the oven onto the pre-form loading rotary turret 12. The cog rings 66 prevent the non-discharged pre-forms from sticking to each other when hot. A pair of cog rings 66 are carried by each of said drive sprockets, and they are disposed on opposite sides of the said drive sprockets. Each of said cog rings 66 is held in a spaced apart position from its respective sprocket and concentric to the shaft 39 by a plurality of tubular spacers 70 which are disposed around the periphery of the cog rings. The cog rings 66 are secured to their respective drive sprockets by a plurality of machine screws 68 which each extend through the cog rings, a pair of spacers 70 and the respective sprocket, and they are secured in place by suitable nuts 69.

Figure 3:
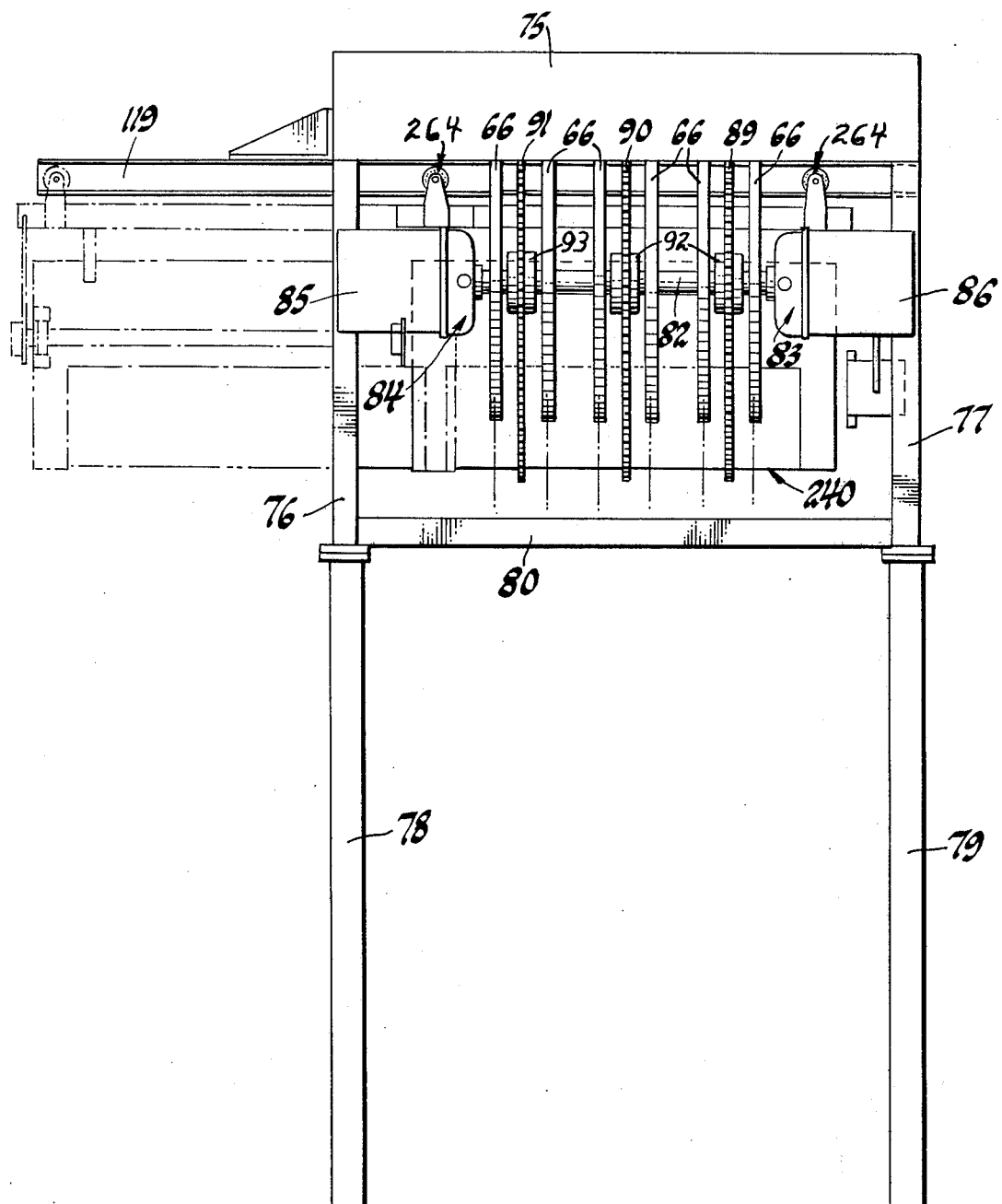
FIG. 3 is a right hand elevational view of the structure shown in FIG. 1A, taken along the line 3—3 thereof, and looking in the direction of the arrows.

As shown in FIGS. 1 and 4, the discharge end of the conveying means is supported to the ground or floor by a pair of vertical frame posts 73 and 74 that are mounted on the bridge 72 of the blow molding machine 13. As shown in FIG. 4, the pre-form loading end of the conveying means frame includes an upper transverse frame channel 75 which interconnects the longitudinal frame channels 45 and 46. As shown in FIG. 3, the loading end of the conveying means frame includes a pair of vertical frame posts 76 and 77 which have their upper ends fixed to the transverse frame channel 75 and their lower ends supported by a pair of ground engaging vertical frame posts 78 and 79. The lower ends of the frame posts 76 and 77 are fixedly interconnected by a transverse frame channel 80.

As shown in FIGS. 3, 4 and 5A, the pre-form conveying means includes a horizontally disposed driven shaft 82 which has its ends rotatably supported by a pair of suitable chain adjustment or take-up means 83 and 84. As best seen in FIGS. 3 and 5A, the chain take-up means 84 is fixedly mounted on the vertical frame post 76 by a pair of spaced apart mounting brackets 85, and a similar pair of mounting brackets 86 fixedly mount the chain take-up means 83 on the verical frame post 77.

As best seen in FIGS. 3 and 5A, the pre-form conveying means includes three large diameter driven idler sprockets 89, 90 and 91. The sprockets 89 and 90 are rotatably mounted on the driven shaft 82 by suitable bushed hubs 92. The driven idler sprocket 91 is keyed and locked to the shaft 82 by any suitable means, as by the hub 93.

As shown in FIG. 7B, the chain adjustment means 83 and 84 can be operated to move the driven idler sprockets 89, 90 and 91 longitudinally of the conveying means, as for example, rearwardly, to an adjusted position marked by the numeral 91A. As shown in FIGS. 3 and 4, each of the driven idler sprockets 89, 90 and 91 is provided with a pair of cog wheels 66 that are spaced from their respective sprockets by spacers 70 in the same manner as the cog wheels 66 mounted on the driven sprockets 59, 60 and 61. The cog wheels 66 mounted on the driven idler sprockets 89, 90 and 91 function in the same manner as described hereinbefore for the cog wheels 66 on the drive sprockets 59, 60 and 61.

As illustrated in FIGS. 5 and 5A, the pre-form conveying means includes three continuous carrier chain assemblies, generally indicated respectively by the numerals 96, 97 and 98. It will be seen that the carrier chain assembly 96 is operatively mounted between the drive sprocket 59 and the driven idler sprocket 89, the carrier chain assembly 97 is operatively mounted between the drive sprocket 60 and the driven idler sprocket 90, and the carrier chain assembly 98 is operatively mounted between the drive sprocket 61 and the driven idler sprocket 91.

Each of the carrier chain assemblies 96, 97 and 98 carries two continuous linear rows of pre-forms 10 between the load end, or right end of the conveying means as viewed in FIG. 4, and the discharge end, or the left end of the conveying means as viewed in FIG. 4. The six linear rows of preforms 10 are schematically indicated in FIG. 4 by the broken lines numbered 99.

Figure 16:
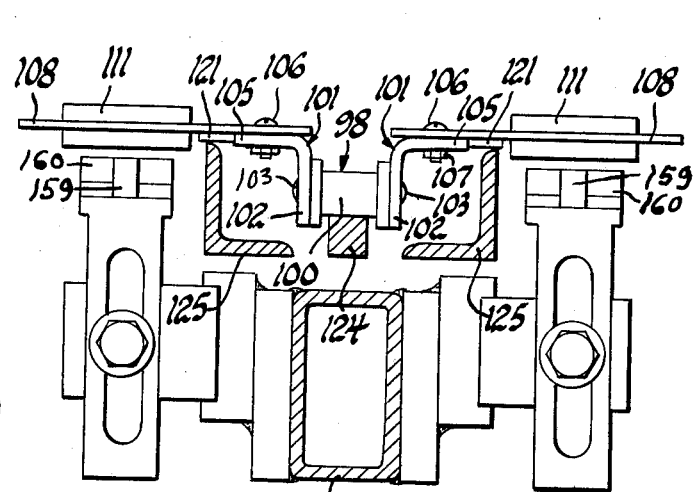
FIG. 16 is a fragmentary, enlarged, elevational section view of the oven conveyor structure illustrated in FIG. 7A, taken along the line 16—16 thereof, and looking in the direction of the arrows.

As best seen in FIG. 16, each of the carrier chain assemblies 96, 97 and 98 includes a continuous or loop-shaped roller chain 100. Each of the roller chains 100 carries a plurality of carrier angle brackets, generally indicated by the numeral 101, which each have the vertical leg 102 thereof detachably mounted to the chain 100 by a suitable chain pin 103. The horizontal leg 105 of each of the angle brackets 101 has affixed thereto a roller carrier lug or plate 108. Each roller carrier lug 108 is fixed to its respective angle bracket leg 105 by any suitable means, as by a machine screw 106 and a lock nut 107.

Each of the carrier lugs 108 is provided with a suitable opening in which is rotatably mounted a pre-form carrier ring or sleeve 111. The carrier ring 111 is made from a suitable magnetic material and it has an inverted, T-shaped elevational configuration so that the lower end 114 has a slightly larger outer diameter, to provide a shoulder which abuts the lower surface 113 of the carrier lug 108 to prevent the carrier ring 111 from passing upwardly through the lug 108, as viewed in FIG. 15. The carrier ring 111 is retained in the opening in the lug 108 by a suitable releasable retainer ring 112 which is operatively mounted around the reduced diameter upper end of the pre-form carrier ring. The pre-form carrier ring opening in the lug 108 is elongated to the right and to the left, as the lug 108 is viewed in FIG. 15, to permit lateral movement of the carrier ring 111 in the lug 108. The retainer ring 112 is also mounted so as to permit some upward and downward movement of the carrier ring in the lug 108. It will be understood from the foregoing, that the carrier ring 111 is loosely mounted in the lug 108 to permit rotation of the carrier ring 111 during movement of the ring 111 through the heating oven, as more fully explained hereinafter. The carrier ring 111 is provided with a flange 115 (FIG. 20) around its inner periphery to engage the shoulder on the neck end of a pre-form and carry the pre-form during movement of the conveying means from the discharge end to the loading end if some of the pre-forms are not discharged and are carried up and around the cog rings or wheels 66 carried on the drive sprockets 59, 60 and 61.

Figure 13:
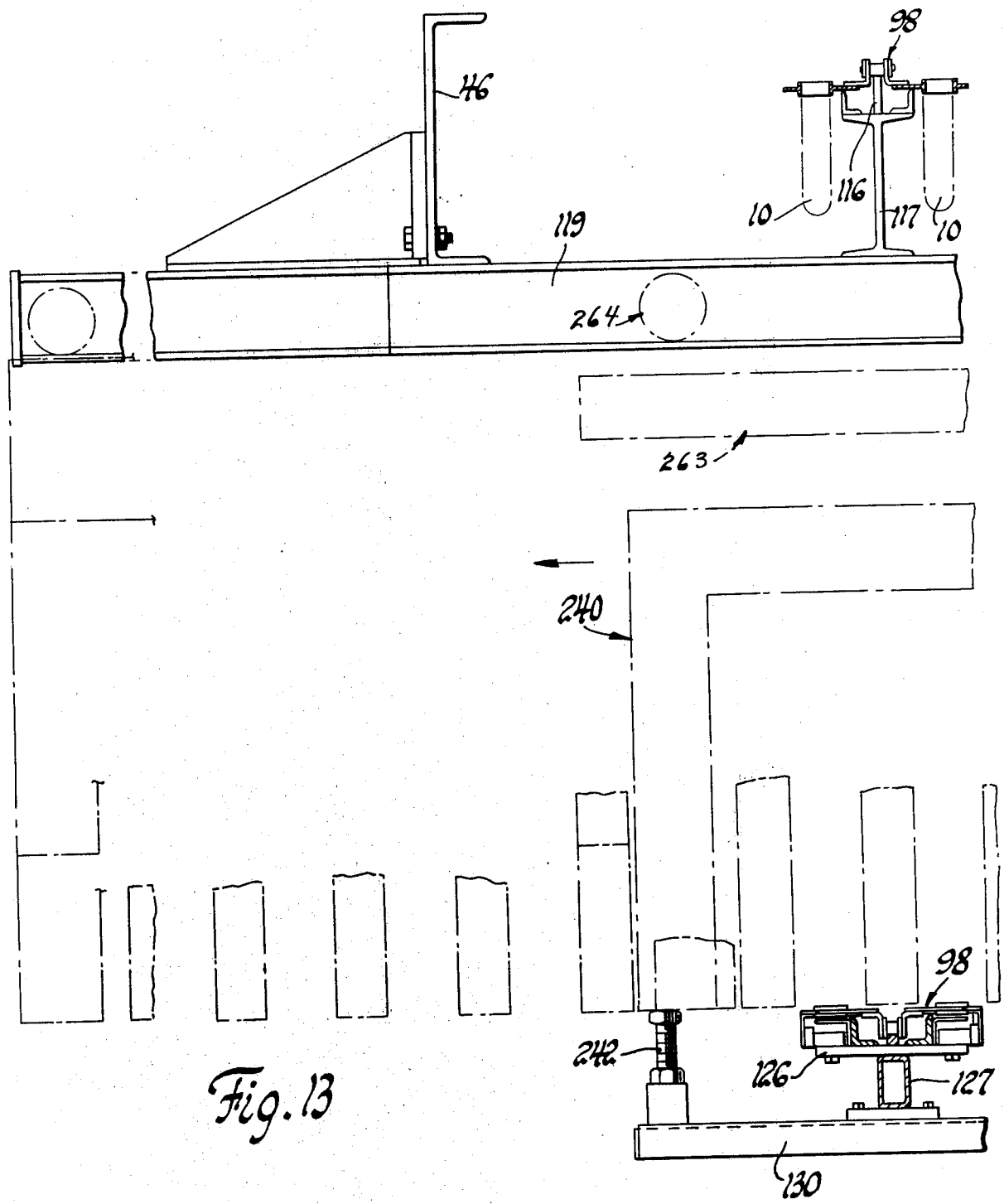
FIGS. 13 and 13A form a composite elevational section view of the oven structure illustrated in FIG. 5A, taken along the line 13—13 thereof, and looking in the direction of the arrows.
Figure 13A:
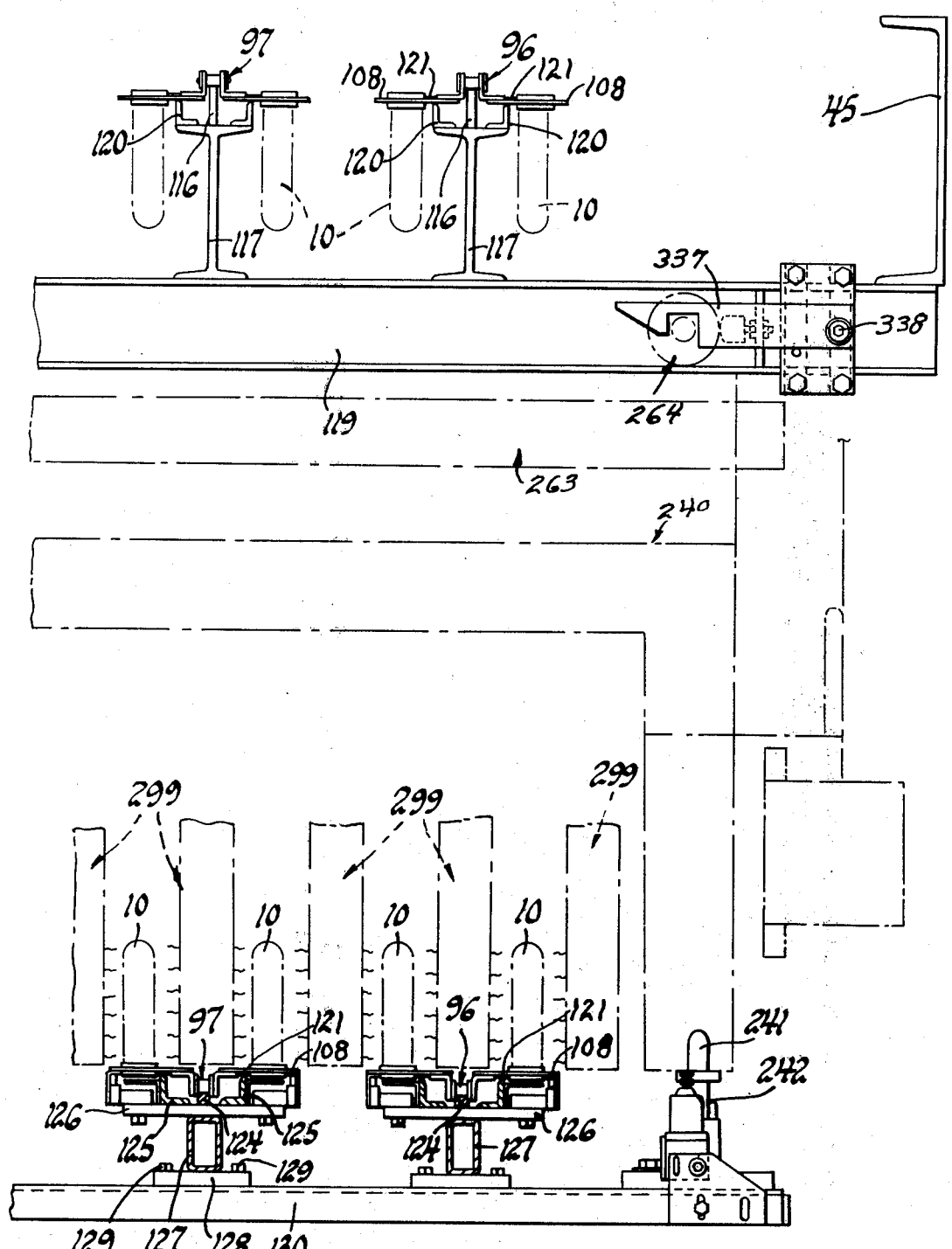
Figure 14:
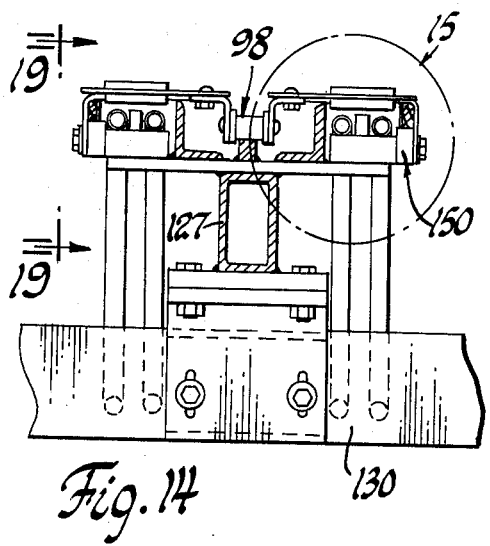
FIG. 14 is a fragmentary, enlarged, elevational section view of the oven structure illustrated in FIG. 7A, taken along the line 14—14 thereof, and looking in the direction of the arrows.

As shown in FIGS. 13 and 13A, the carrier chain assemblies 96, 97 and 98 are operatively supported when they move in their return pass from the discharge end of the conveying means to the loading end of the conveying means by separate upper support structures which each includes a longitudinally extended guide bar 116 that rollably supports the roller chain 100 of the respective chain assembly. Each of the guide bars 116 is fixedly mounted on the upper end of a longitudinally disposed I-beam guide rail 117. As shown in FIGS. 13 and 13A, the rails 117 are supported at the loading end of the conveying means on a transverse I-beam rail 119 which is fixedly attached, as by welding, to the lower sides of the longitudinal frame channels 45 and 46. As shown in FIG. 5, the conveying means support frame also includes a transverse I-beam rail 118, adjacent the discharge end thereof, and it operatively supports the rails 117 in the same manner as illustrated in FIGS. 13 and 13A.

As shown in FIGS. 13 and 13A, the upper carrier chain guide means for each chain includes a pair of laterally spaced apart angle guide rails 120 which are fixedly mounted, as by welding, on the upper end of the I-beam guide rails 117. The guide bars 116 and the guide rails 120 are also seen in FIGS. 5 and 5A. As shown in FIGS. 13A and 16, each of the carrier lugs 108 is provided on the lower face thereof with a fixedly mounted bearing plate 121 which slides on the lower guide rail 125, as the chain assemblies are moved forwardly through the oven.

Figure 6:
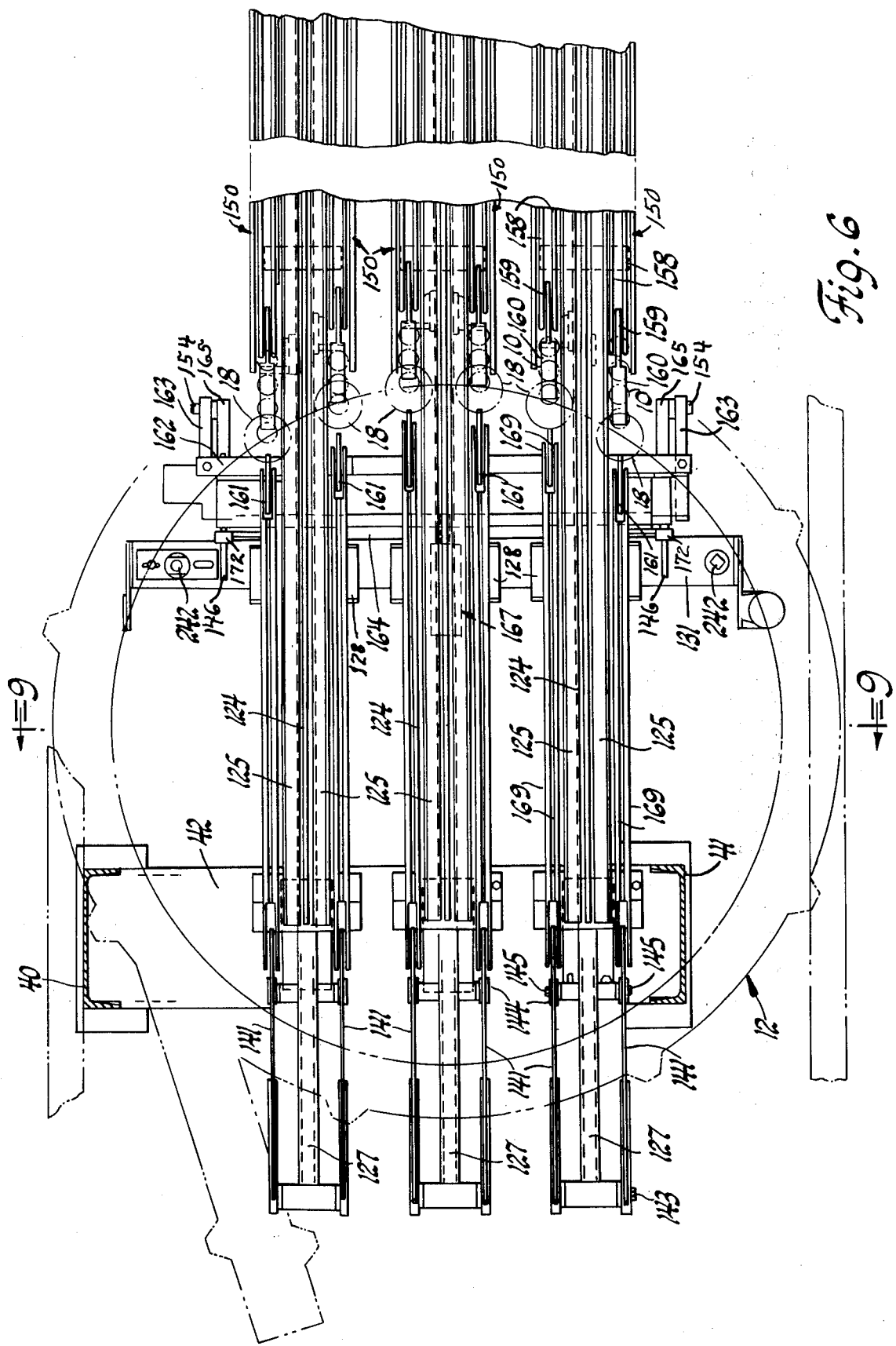
Figure 15:
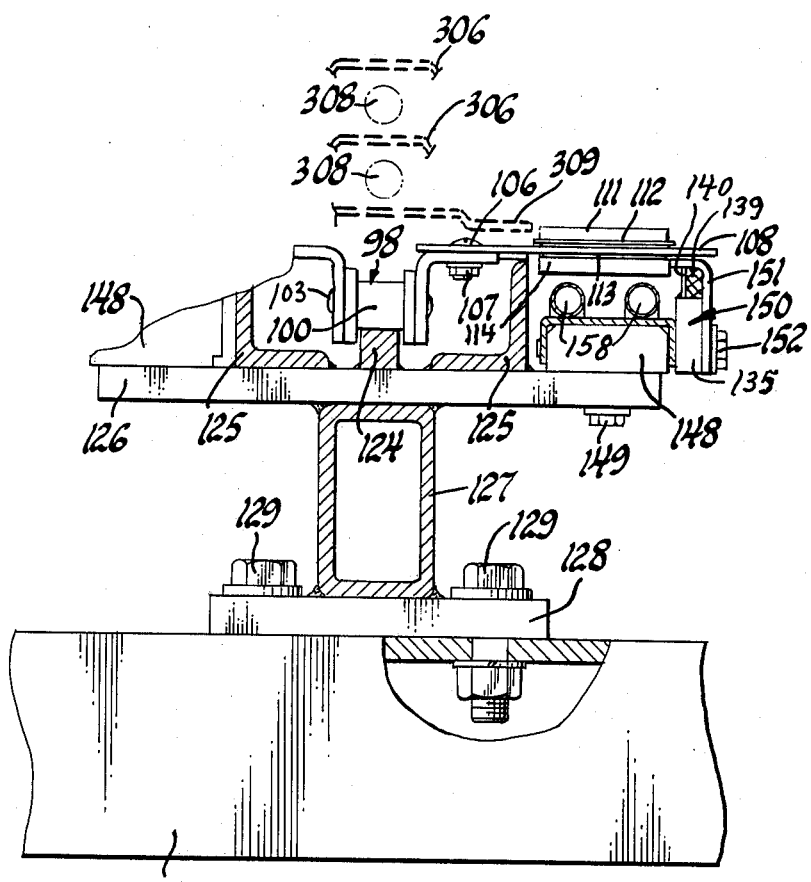
FIG. 15 is a fragmentary, enlarged view of the oven structure illustrated in FIG. 14, taken within the circle marked by the numeral "15".

As shown in FIGS. 6 and 6A, the pre-form conveying means includes three lower carrier chain guide structures which each include a centrally disposed, longitudinally extended roller guide rail 124 on which is rollably mounted the respective roller chain of the carrier chain assembly mounted thereon. As shown in FIGS. 15 and 16, each of the lower carrier chain guide structures includes a pair of laterally spaced apart angle guide rails 125 which are fixedly mounted as by welding on a plurality of mounting plates 126. The mounting plates 126 are carried on a longitudinally extended tubular support rail 127. Each of the mounting plates 126 is fixedly secured to its respective support rail 127 by any suitble means, as by welding. As shown in FIGS. 6A and 7B, the loading ends of the support rails 127 are fixedly mounted on the transverse frame channel 80. As shown in FIG. 6, the discharge ends of the support rails 127 are operatively supported by the transverse frame channel 42. As shown in FIGS. 6 and 6A, the support rails 127 support a pair of transverse guide rail support legs 131 and 130 at intermediate positions therealong. Each of the support rails is fixedly attached, as by welding, to a mounting plate 128 which is releasably secured to the respective guide rail support legs 130, 131. The manner of attaching each of the mounting plates 128 to its respecitive support leg 130, 131, is illustrated in FIG. 15, which shows the mounting plate 128 secured to the support leg 130 by a suitable machine screw and lock nut assembly 129. As shown in FIG. 1, each of the support rails 127 is provided with a ground engaging support post 134.

Figure 12:
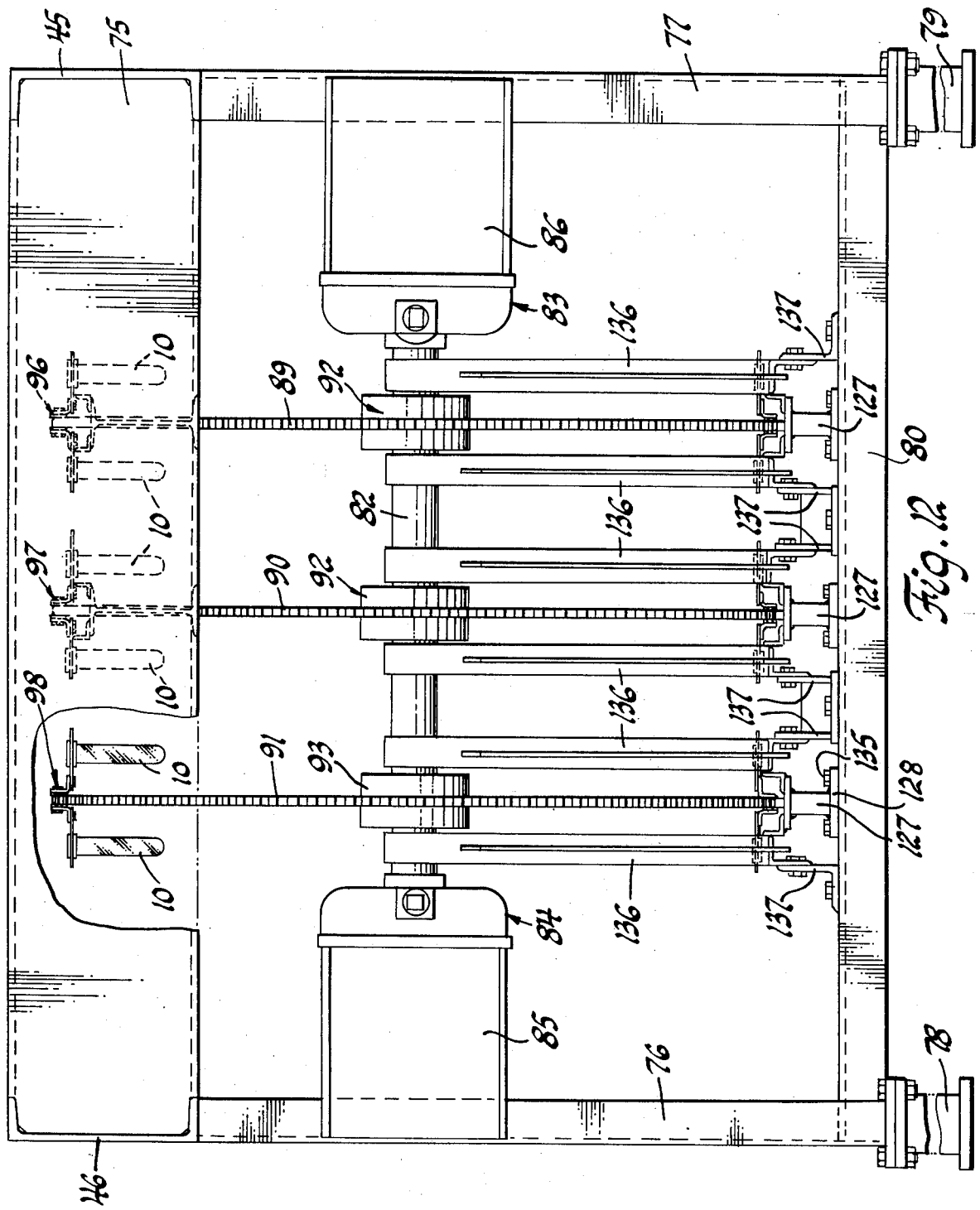
FIG. 12 is a right side elevational view of the oven structure illustrated in FIG. 5A, taken along the line 12—12 thereof, and looking in the direction of the arrows.

As shown in FIG. 12, the guide means for each of the carrier chain assemblies 96, 97 and 98 includes a pair of laterally spaced apart arcuate pre-form guide rails indicated each by the numeral 136. As illustrated in FIG. 7B, each of the guide rails 136 commences slightly above the horizontal center line of the pre-form conveying means and follows the curvature of the driven sprockets and engages the neck end of the inverted pre-forms 10 as they are moved downwardly and then horizontally through the reheat oven. The guide rails 136 maintain the pre-forms 10 in their respective carriage rings 111 until they are engaged by the lower guide means, as more fully explained hereinafter. As shown in FIG. 12, each of the guide rails 136 is adjustably mounted by means of suitable angle brackets 137 on the transverse frame member 80. The guide rails 136, because of their adjustable mounting, can be adjusted longitudinally to permit the driven idler sprockets 89, 90 and 91 to be moved to adjusted positions, as indicated by the numeral 91a in FIG. 7B.

The pre-forms 10 may be loaded into the carriage lugs 111 by any suitable means. One suitable method for loading the pre-forms 10 into the carrier ring 111 is illustrated in FIG. 7B, which shows a tubular loading member or funnel 138 fixedly mounted by any suitable means in a position normal to the arcuate conveying path, at the loading end of the conveying means. Pre-forms 10 may be moved by gravity or air pressure through the loading funnel 138 in a timed sequence so as to have a single pre-form 10 deposited in each carrier ring 111 as the carrier rings 111 are moved past the funnel 138. It will be understood that there would be provided six of the funnels 138 for loading the pre-forms 10 into the six rows of carrier rings 111. The infeed or loading funnel 138 may be suitably disposed, and one operable position would be on an angle of approximately 45° from the horizontal center-line of the conveying means. It will be understood that the pre-forms 10 would be loaded through the funnel 138 with the closed end of the pre-form downwardly so that when the pre-forms 10 are moved clockwise, as viewed in FIG. 7B, their neck ends will slidably engage the guide rail 136 to maintain the pre-forms 10 in their respective carrier rings 111.

As shown in FIG. 7, the pre-form conveying means is provided at its discharge end with a pre-form retaining guide rail 141 along each of the six pre-form flow paths to prevent the pre-forms 10, that are not discharged, from dropping out of their respective carrier rings 111, and to permit the conveying means to move the pre-forms 10 upwardly and along the upper return flow path of the conveying means without damaging the pre-forms 10.

Figure 8:
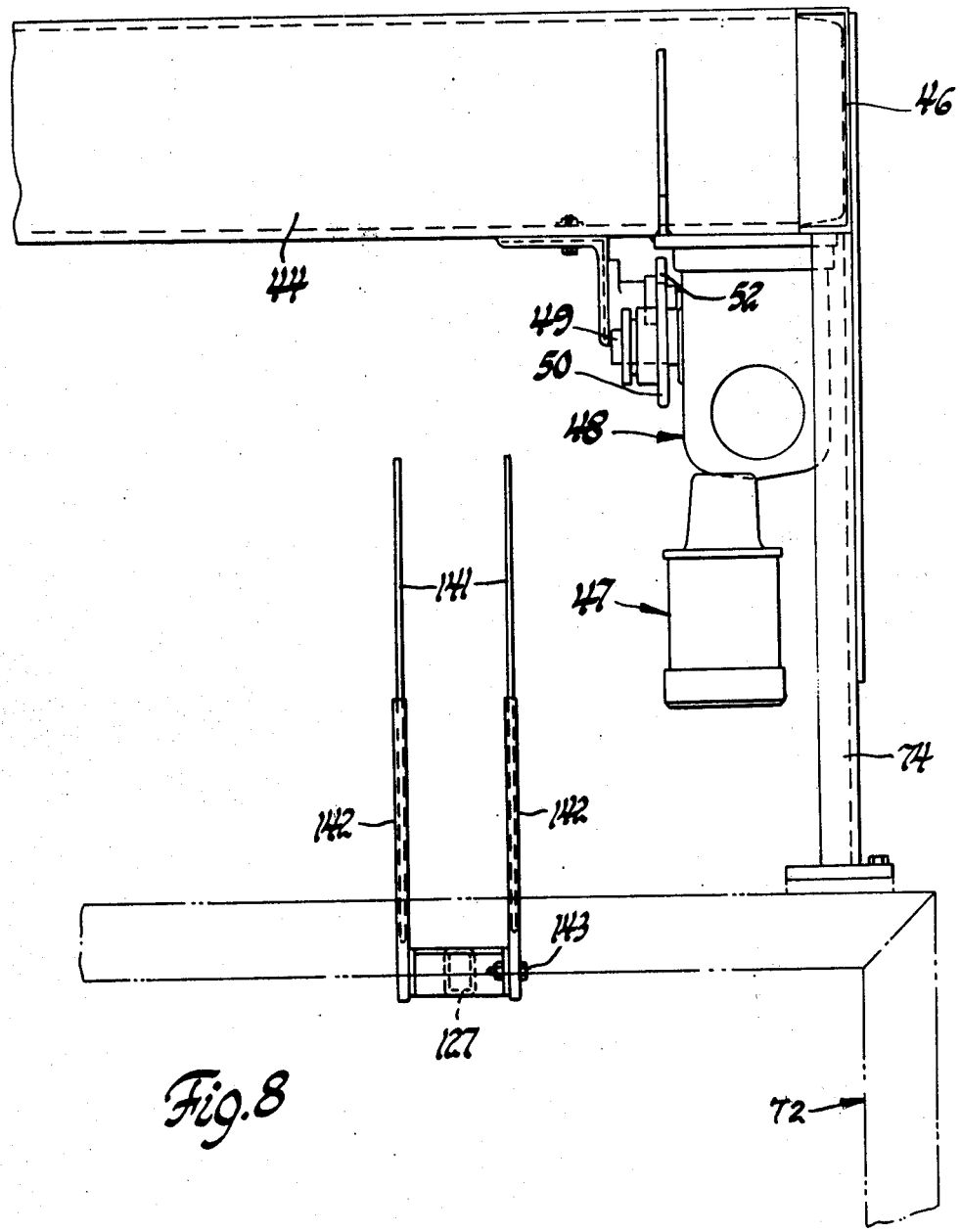
FIG. 8 is a fragmentary, left side elevational view of the oven structure illustrated in FIG. 7, taken along the line 8—8 thereof, and looking in the direction of the arrows.

Each of the pre-form retaining guide rails 141 engages the neck end of the pre-forms 10. As shown in FIGS. 6 and 7, the guide rails 141 commmences at a position substantially at the vertical center-line of the drive sprockets 59, 60 and 61 and extends forwardly and upwardly to a termination point slightly above the horizontal axis of the conveying means. The inner end of each of the guide rails 151 is fixedly connected, as by welding, to a support arm 144 which is adjustably attached by a suitable means, as by a suitable machine screw 145, to its respective support tube 127. The outer end of each of the guide rails 141 has fixedly attached thereto, as by welding, a longer supporting arm 142 which has its lower end adjustably attached by a suitable machine screw 143 to its respective guide tube 127 (FIG. 8).

The carrier rings 111 are rotated as they are moved through the reheat oven 240, and this rotation is effected by engagement of the rings 111 in a rolling contact with or the flux of six elongated magnets, generally designated by the numeral 150, which are disposed along the line of travel of the rings 111 (FIG. 6A). The magnets 150 are each made from a plurality of separate strip magnets. As illustrated in FIG. 15, the magnets 150 are secured to mounting blocks 148 by suitable machine screws 152. The mounting blocks 148 are secured on the transverse mounting plates 126 by any suitably means, as by machine screws 149. Each magnet 150 includes an elongated, L-shaped in cross section, arm 151 which is made from a magnetic material and secured as by welding, to a non-magnetic mounting pad 135. Carried on the upper end of the mounting pad 135, and enclosed by the upper horizontal leg of the mounting arm 151, is a suitable ceramic magnetic material 139 that is enclosed along its inner side by a suitable seal 140. The magnet arm 151 extends along the path of travel of the rings 111 so as to provide either a rolling contact or a flux contact with the rings 111 as they are rolled thereby.

As shown in FIGS. 6A, a lead-in guide member or cam 153 is fixedly mounted on the front end of each of the magnets 150, and it guides the ring 111 into the area of the magnet 150. The ring 111 is loosely mounted in the aperture in the carrier lug 108, and the carrier chain pushes the magnetic ring 111 along the magnet 150, and the ring 111 will roll against the magnet arm 151 in a no-slip condition. The rolling of the carrier ring 111 imparts rotation to the pre-form carried in the ring 111. It will be seen that the continuous attraction between the magnet 150 and the carrier ring 111 maintains the rotation of the ring 111 along the entire length of the magnet 150. As viewed in FIGS. 6 and 6A, it will be seen that the magnets 150 extend from the transverse rail 130 to a point adjacent the transverse rail 131.

The pre-forms 10 are moved along the arcuate guide rails 136, as shown in 7B, and onto a pre-form slide rail 157, as shown in FIG. 19. The course of the slide rail 157 extends to a termination point indicated in FIG. 19 by the numeral 157a, at which point the pre-forms are supported by water-cooled rails, as explained hereinafter. The slide rail 157 is shown in FIG. 21 as being fixedly mounted to the sides of the guide rails 125 by any suitable means, as by welding.

As shown in FIGS. 19 and 20, the pre-forms 10 are moved by the carrier rings 111 from the pre-form slide rail 157 onto a water-cooled slide rail formed by a pair of laterally spaced apart cooling tubes 158 which are operatively connected to a suitable sorce of cooling fluid, as cooling water. As shown in FIG. 7A, the cooling tubes 158 extend to a discharge rail shelf 160. The discharge shelf 160 is provided with an integral narrow portion 159 which extends between the terminal ends of the cooling tubes 158 for guiding the pre-forms 10 onto the discharge rail shelf 160. As shown in FIGS. 6 and 22, the discharge shelves 160 are disposed on an arc so that each shelf discharges a pre-form 10 at its own predetermined drop-off point 18. It will be understood that the discharge shelves 160 are adjustably mounted for adjustment forward and backward, and upward and downward.

In case of an emergency, when it is desired to put the oven of the present invention in a dump mode, a movable skid or slide rail structure is provided to the left of each discharge shelf 160, as viewed in FIG. 6, to close the discharge gap at the end of the discharge shelf 160, and to provide a continuous slide rail structure to convey the pre-forms 10 forward, and up and around the conveying means, and to a suitable dump station. This last mentioned action of closing the discharge gap is effected by providing a movable guide rail 161, as shown in FIG. 6, for each of the pre-form flow paths in the conveying means. As shown in FIG. 17, each of the guide rails 161 is fixedly mounted on a transverse carrier bar 162 which is movable forwardly and backwardly by the following described structure. As shown in FIG. 6, the movable guide rails 161 are in a retracted position to permit the discharge of the pre-forms 10 onto the stretch pin assemblies 16.

As shown in FIGS. 6, 7A and 17, a vertically disposed frame member 163 is fixedly secured to each of the ends of the carrier bar 162 by any suitable means, as by suitable machine screws. Pivotally connected to the lower end of each of the frame members 163 is a horizontally disposed longitudinal carrier frame member 165. The frame member 165 is pivotally secured to the frame member 163 by any suitable means as by pivot machine screws 154. As shown in FIGS. 7A and 17, each of the longitudinal frame members 165 carries a pair of longitudinally spaced apart, upwardly extended frame support arms 166. Each pair of arms 166 is fixedly mounted on a longitudinally movable support shaft 146. As shown in FIG. 6, each of the shafts 146 is slidably mounted in a pair of suitable bearing blocks 172 which are carried on the conveying means frame.

As shown in FIGS. 6 and 17, the transverse carrier frame member 164 is fixedly connected between the longitudinal frame members 165 and it carries an upwardly extended pusher arm 171 for operative engagement by a suitable air cylinder 167 for moving the carrier bar 162 and the movable guide rails 161 to the right, as viewed in FIG. 6, from the retracted position of FIGS. 6 and 7A to a forward position to close the discharge gap. Reference numeral 168 in FIG. 7A shows the guide rails 161 in the forward position so as to block the discharge gap at the end of the discharge shelves 160.

When the apparatus of the present invention is in a dump mode, and the movable guide rails 161 are moved to the forward position, the pre-forms 10 carried in the conveyor means will move from the discharge shelf 160 over the discharge gap and over the guide rails 161 to the fixed guide rails 169, as shown in FIG. 6. The guide rails 169 then guide the pre-forms 10 onto the arcuate retaining guide rails 141. The conveying means moves the pre-forms to a suitable dump station.

The aforedescribed movable or indexing guide rail means also functions as a jam detection means. As best seen in FIG. 7A, a downwardly extended bracket 175 is fixedly connected to each of the vertical frame members 163 by any suitable means, as by welding. Fixedly connected, as by welding, to the lower end of each bracket 175 is a horizontally disposed arm 176. As viewed in FIG. 7A, one of the arms 176 is adapted to be normally engaged with a limit switch indicated by the numeral 156. The other arm 176 is adapted to normally engage an adjustable stop member 155. If a jam is caused at the discharge gap by means of a pre-form 10 pressing downwardly on one of the movable guide rals 161, said last mentioned guide rail 161 will press downwardly on the transverse bar 162 so as to pivot the frame members 163 and the arms 176 downwardly to the broken line position shown in FIG. 7A by the reference numeral 176a. This last mentioned action energizes the limit switch 156 to indicate a jam situation, and that appropriate action should be taken. The arm 176 is normally spring biased upwardly to the solid line normal position shown in FIG. 7A by a suitable spring means indicated by the numeral 147.

A further means for detecting the fact that a pre-form 10 has not been discharged through the discharge ap is provided by a photo switch means 173, as shown in FIGS. 7A and 17, which is operatively associated with photo switch reflector means 174, as shown in FIG. 17. The photo switch 173 is located on one side of the conveying means, and the photo switch reflector means 174 is located on the opposite side of the conveyor means, and these members are located at a point to the left of the last mentioned indexing slide rail structure, as shown in FIG. 7A.

It will be seen from FIG. 7A, that the upper surface of each of the discharge shelves 160 is at a level higher than the upper surfaces of the movable guide rails 161 and the connecting fixed guide rails 169. In one instance, this difference in levels between the guide rails 161 and 169 and the discharge shelves 160 amounted to approximately ½ inch. This last mentioned difference in rail surfaces is provided so that if the conveying means is put into a dump mode, the upwardly disposed closed ends of the pre-forms 10, as viewed in FIG. 7, may be received within each of the cogs or notches 170 on the respective cog wheel 66 without tipping or moving the pre-forms into contact with each other, so as to prevent damage to the pre-forms to permit reuse of the same.

Figure 48:
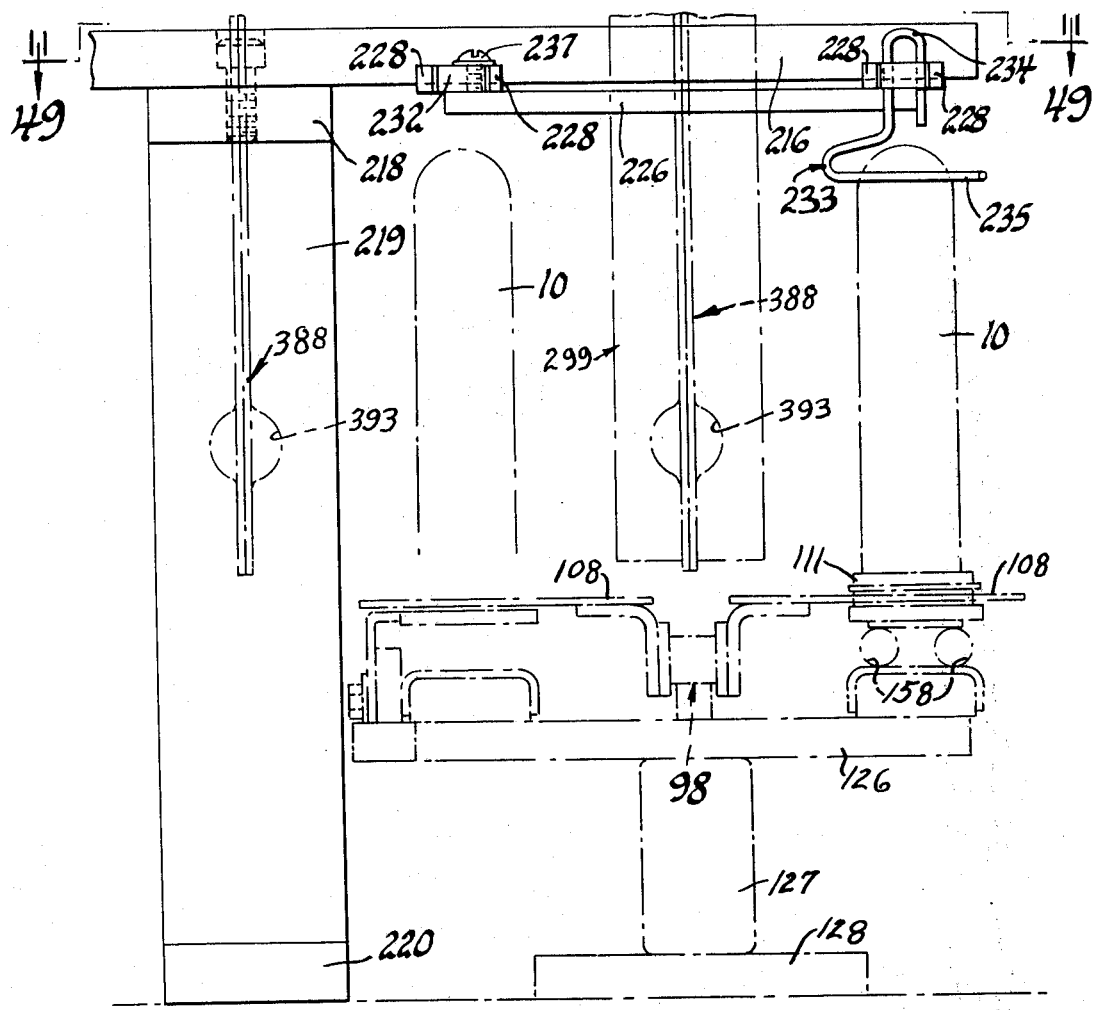
FIG. 48 is a fragmentary, enlarged, elevation section view of the structure illustrated in FIG. 1, taken along the line 48—48 thereof, and looking in the direction of the arrows.
Figure 49:
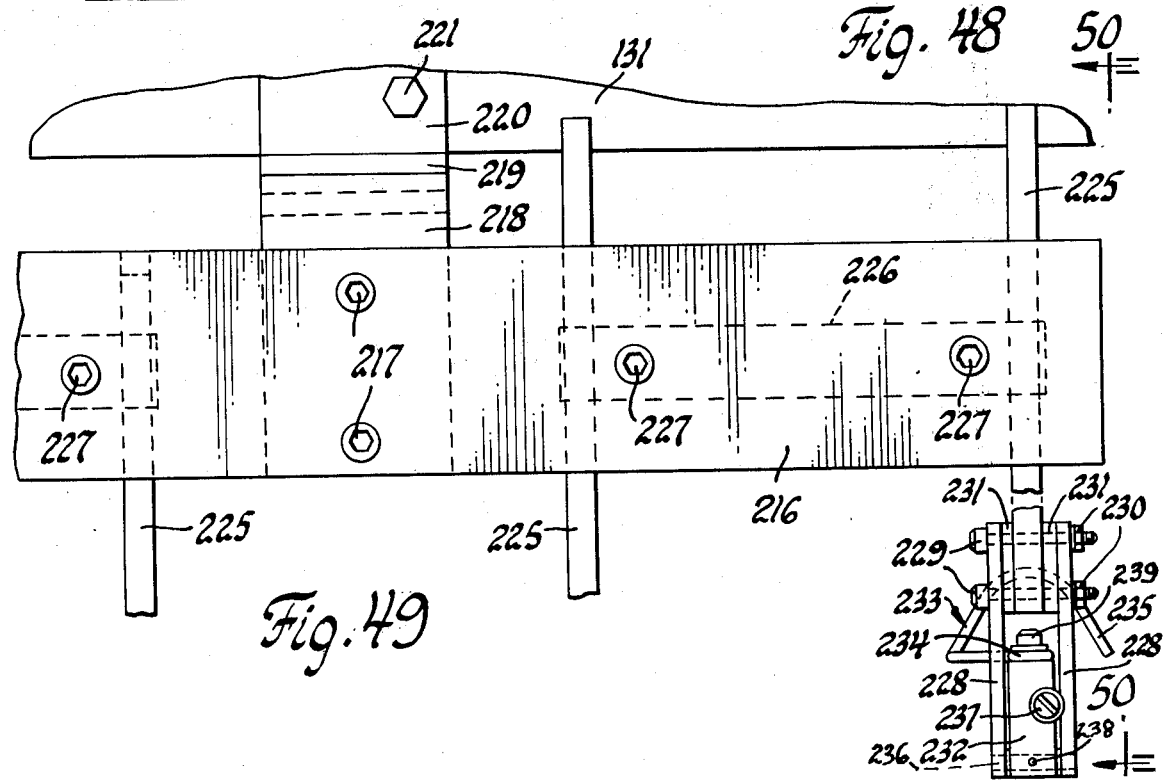
FIG. 49 is a fragmentary, top plan view of the structure illustrated in FIG. 48, taken along the line 49—49 thereof, and looking in the direction of the arrows.

FIGS. 48, 49 and 50 illustrate a flipper gate 233 which is disposed at the drop point 18 at the end of each of the discharge shelves 160. A pre-form 10, when it passes off of a discharge shelf 160, tends to lean over because of the slop in the ring assembly 111. The flipper gate 233 engages the top end portion of a pre-form 10, as shown in FIG. 48, so as to hold it in a straight mode until it drops completely off the discharge shelf 160 and down through the discharge gap. It will be seen from FIG. 48 that the flipper gate 233 is so disposed, that if the aforedescribed indexing guide rails 161 are moved to the closed position, a pre-form 10 will still drop down the ½ inch, off a shelf 160, until it engages a guide rail 161 and passes beneath its flipper gate 233. In case of a jam-up, if the upwardly disposed closed end of a pre-form 10 would happen to hit one of the flipper gates 233, the gate is arranged and constructed so that it would pivot upwardly to permit the pre-form to pass thereunder, as shown by the broken line position of the gate 233, in FIG. 50.

As shown in FIGS. 48 and 49, the flipper gates 233 are carried on the following described structure. A transverse support bar 216 is disposed above the conveying means adjacent the discharge gap area, and it is supported by a pair of support brackets 218 which are each fixed, as by welding to the top of a vertical support bar post 219. The transverse support bar 216 is connected to the brackets 218 by any suitable means, as by the machine screws 217. As shown in FIG. 50, each vertical support bar post 219 is fixed, as by welding, to the upper side of a mounting plate 220 which is secured by machine screws 221 to the tansverse support channel 131 (FIG. 7A) carried on the conveying means frame.

As shown in FIG. 49, a pair of longitudinally disposed carrier arms 225 are adjustably attached to the lower side of the transverse support bar 216 by a retainer plate 226. The plate 226 is releasably secured to the support bar 216 by suitable machine screws 227.

Each of the flipper gates 233 is carried on a separate one of the carrier arms 226, in alignment with a flow path of the pre-forms 10, as they are passing over a discharge shelf 160. As shown in FIG. 49, a pair of mounting arms 228 are secured at one end thereof on opposite sides of each carrier arm 225 by a pair of spacer blocks 231, machine screws 229 and nuts 230. A flipper gate carrier block 232 has its outer end pivotally mounted between the other ends of the mounting arms 228 by means of a suitable pivot pin 236. The carrier block 232 is adjustably secured to the pivot pin 236 by a suitable set screw 238. A machine screw 237 is threadably mounted on the upper side of the carrier block 232, and it carries a washer which extends beyond one side of the carrier block 232 so as to be normally seated on the upper side of one of the mounting arms 228 to normally prevent the block 232 from swinging downwardly, and to maintain it in the position shown in FIG. 48. It will be understood that the carrier block 232 may be pivoted upwardly, to the broken line position shown in FIG. 50, to permit the flipper gate 233 to be moved out of the way of a jammed pre-form 10 and allow it to pass thereunder. As shown in FIG. 48, the flipper gate 233 comprises a vertically disposed U-shaped attachment end 234 which is releasably secured to the inner end of the carrier block 232, by any suitable means, as by a machine screw 239 shown in FIG. 49. The flipper gate 233 also includes an integral, horizontal, U-shaped end 235 which is the end of the flipper gate that normally engages a pre-form 10, as shown in FIG. 48, to insure a straight drop of the pre-form through the discharge gap.

FIGS. 23 through 28 illustrate a second type of preform loading apparatus for loading the pre-forms 10 straight upwardly into the carriers 111 at a point shortly after they are conveyed into the oven which is designated by the numeral 240 in FIG. 4. The pre-form loading apparatus illustrated in FIGS. 23 through 28 would load pre-forms 10 into the carrier rings 111 at the loading points indicated by the numerals 243 in FIG. 4. The loading apparatus of FIGS. 23 through 28 is mounted on a suitable support structure, generally indicated by the numeral 185 in FIG. 24. The support structure 185 would be disposed under the oven 240 so as to feed the pre-forms 10 straight upwardly, with the neck end disposed downwardly, and into the carrier rings 111 at the aforementioned loading points 243.

Figure 23:
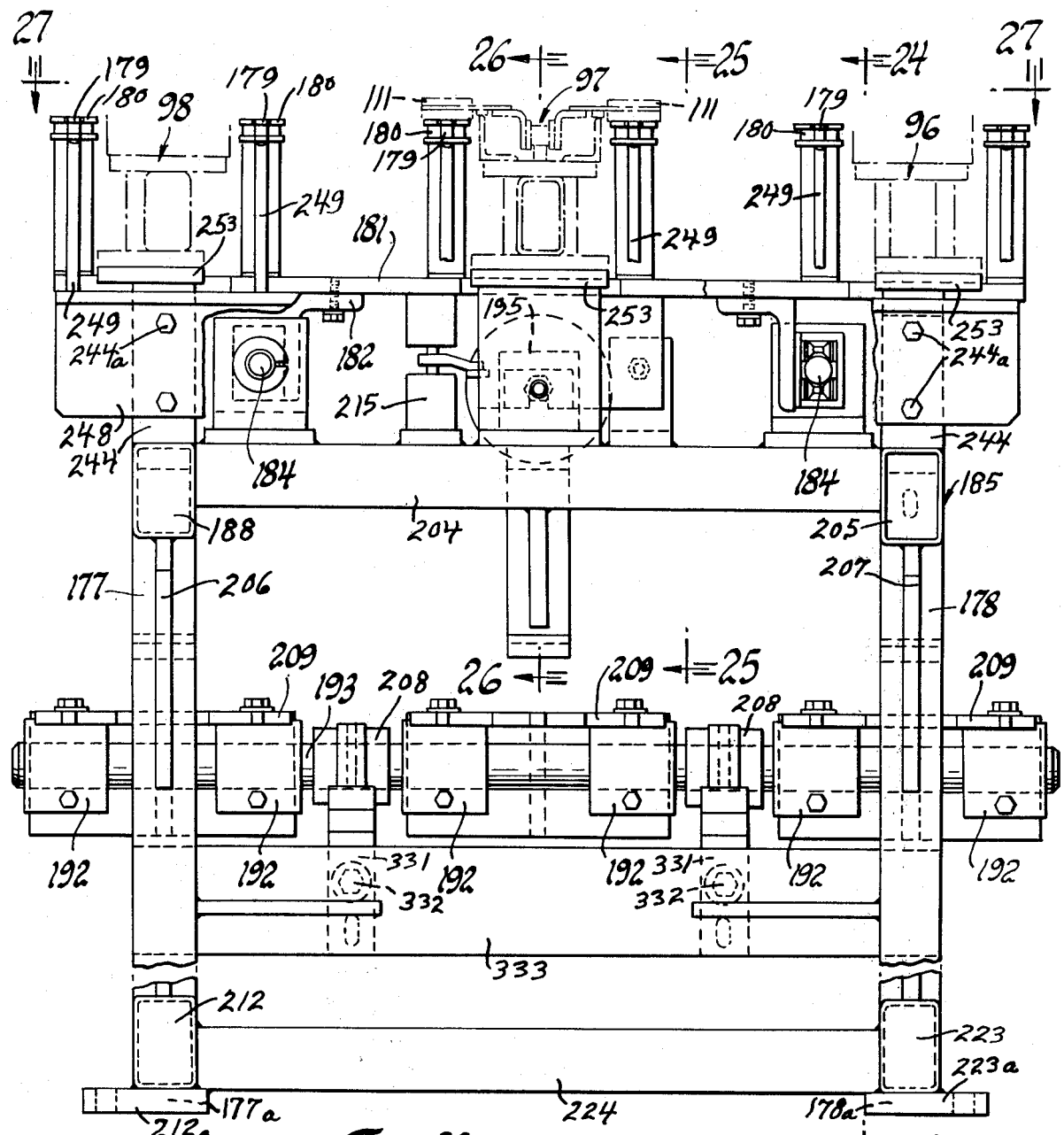
FIG. 23 is a fragmentary, enlarged, elevational section view of a modified pre-form infeed means, taken substantially along the position of line 23—23 of FIG. 1, and looking in the direction of the arrows.
Figure 24:
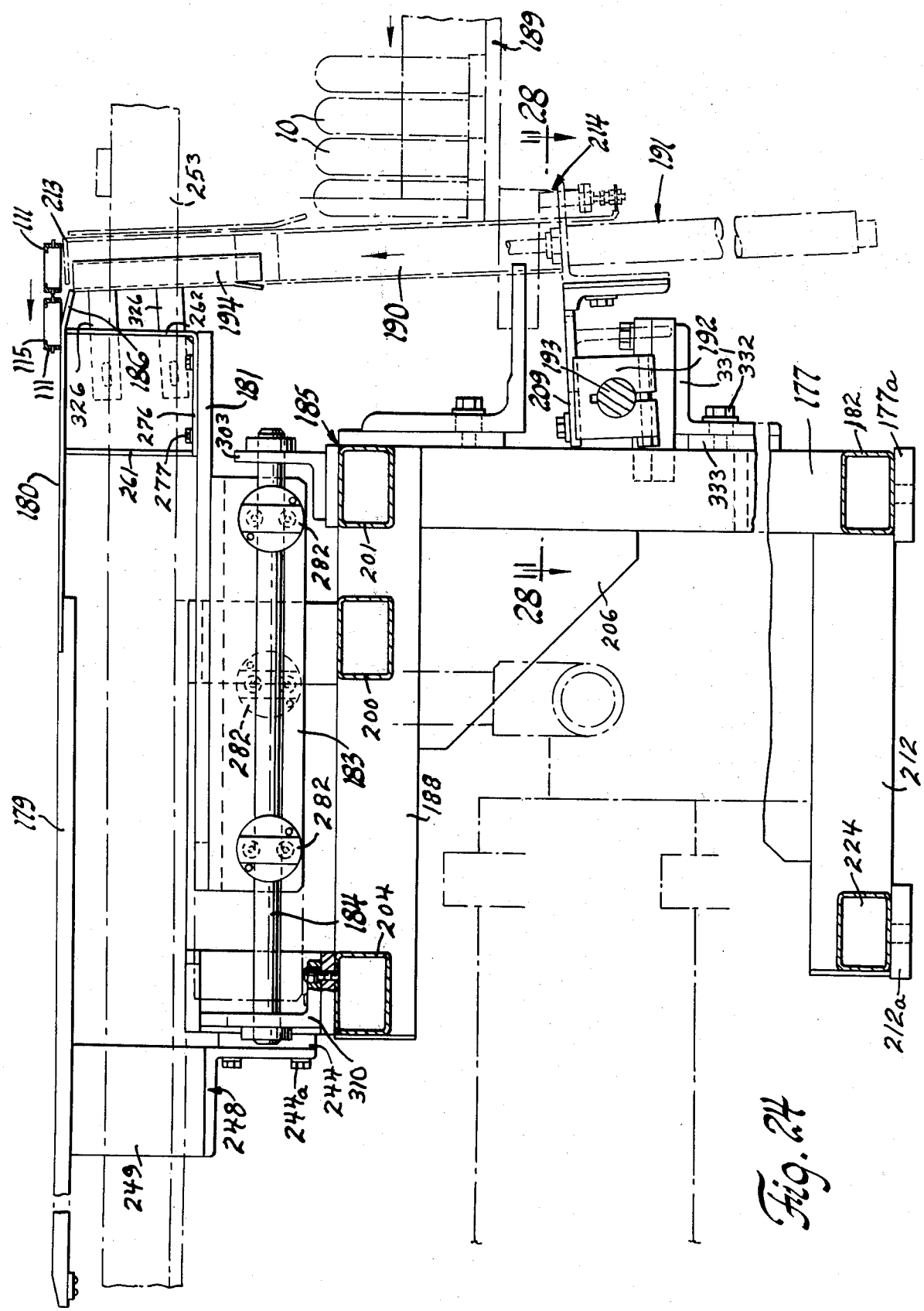
FIG. 24 is a fragmentary, elevational section view of the structure illustrated in FIG. 23, taken along the line 24—24 thereof, and looking in the direction of the arrows.
Figure 27:
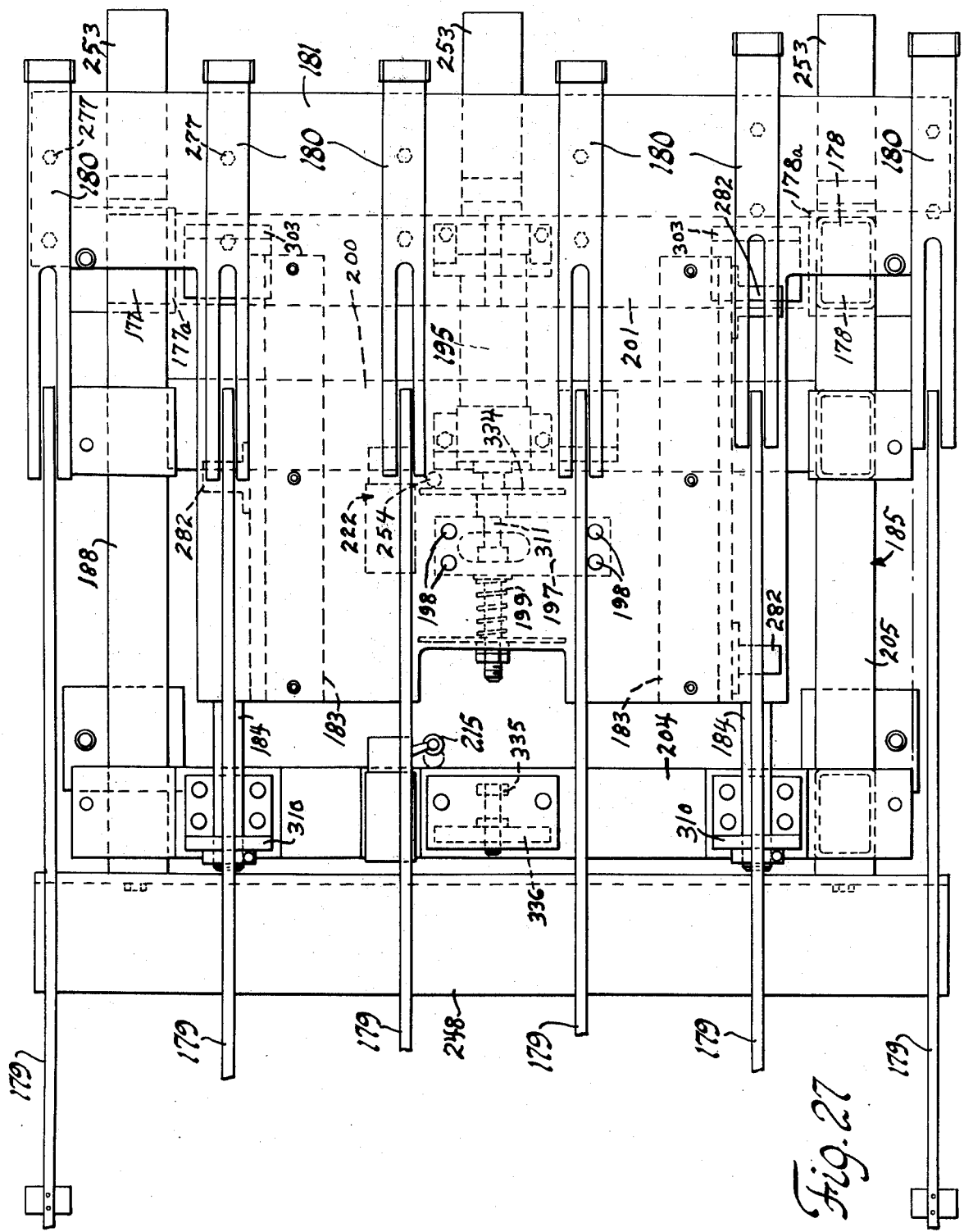
FIG. 27 is a top plan view of the structure illustrated in FIG. 23, taken along the line 27—27 thereof, and looking in the direction of the arrows.

As shown in FIG. 23, the support structure 185 includes a pair of laterally spaced apart, vertical tubular members 177 and 178 which have fixedly mounted on the lower ends thereof, as by welding, ground engaging foot pads 177a and 178a, respectively. As shown in FIGS. 24 and 27, the vertical frame members 177 and 178 are interconnected by a transverse frame member 182 at the lower ends thereof, and at the upper ends thereof by a similar tubular transverse frame member 201.

As shown in FIGS. 23 and 27, the support frame 185 further includes a pair of upper longitudinally extended frame members 188 and 205. As shown in FIG. 23, the frame members 188 and 205 are provided with suitable support brackets 206 and 207, respectively. As shown in FIGS. 23, 24 and 27, the free ends of the longitudinal frame members 188 and 205 are interconnected by a transverse frame member 204. The longitudinal frame members 188 and 205 are also interconnected by a similar intermediate transverse frame member 200. As shown in FIG. 23, the support frame 185 further includes a pair of laterally spaced apart, longitudinal frame members 212 and 223 which are fixed at their forward ends to the lower ends of the vertical frame members 177 and 178, respectively. The rear ends of the longitudinal frame members 212 and 223 are interconnected by a transverse frame member 224. The rear ends of the longitudinal frame members 212 and 223 are provided with ground engaging pads 212a and 223a, respectively.

As shown in FIG. 27, the support structure 185 operatively supports six longitudinally extended, laterally spaced apart guide rails 179 which lead to the aforedescribed cooled guide rails and function in the same manner as the previously described guide rails 157. As shown in FIG. 23, the longitudinal frame members 188 and 205 each has fixedly mounted, as by welding, on the upper rear ends thereof a pair of upwardly extended frame members 244 to which is attached a transverse rail supporting angle bar 248 by suitable machine screws as 244a. As illustrated in FIGS. 23 and 24, each of the fixed guide rails 179 is fixedly mounted on the upper end of a mounting plate 249 which has its lower end fixedly attached, as by welding, to the upper flange of the bar 248. As shown in FIGS. 23 and 27, the support frame structure 185 carries three carrier chain mounting track members 253 for operatively mounting thereon the carrier chain track assemblies 96, 97 and 98.

As shown in FIGS. 23, 24 and 27, the support frame structure 185 operatively supports six longitudinally movable extension guide rails 180. As shown in FIG. 27, the extension guide rails 180 have a bifurcated rear end so as to slidably receive the forward end of the fixed guide rails 179. As shown in FIG. 24, each of the extension guide rails 180 is fixedly attached to a ball slide carrier plate 181 by a pair of vertically disposed support legs 261 and 262 which have the upper ends thereof fixed to the rails 180 by any suitable means, as by welding. The lower end of the support leg 262 is integrally attached to a horizontal attachment bar 276 which is fixedly secured by suitable machine screws 277 to the slide plate 181. The lower end of the other support leg 261 is fixed, as by welding, to the bar 276. It will be understood that all of the extension rails 180 are connected in the same manner to the plate 181.

As shown in FIG. 27, the ball slide carrier plate 181 is provided with a pair of laterally spaced apart ball slide supporting blocks 183 which are affixed thereto by any suitable means, as by suitable machine screws. One block, as shown in FIG. 27, is provided with one conventional ball slide bearing assembly 282 which rollably supports its respective block 183 on a longitudinally disposed shaft 184. The other ball slide block 183 is rollably supported on the second longitudinally extended shaft 184 by a pair of the ball slide bearing assemblies 282.

As illustrated in FIGS. 24 and 27, the front ends of the ball slide shafts 184 are each supported by a suitable mounting angle bracket 303 which is mounted on a transverse frame member 201. The rear ends of each of the ball slide shafts 184 are operatively mounted in a similar manner on a mounting angle bracket 310 which is fixedly mounted on the transverse frame member 204.

Figure 25:
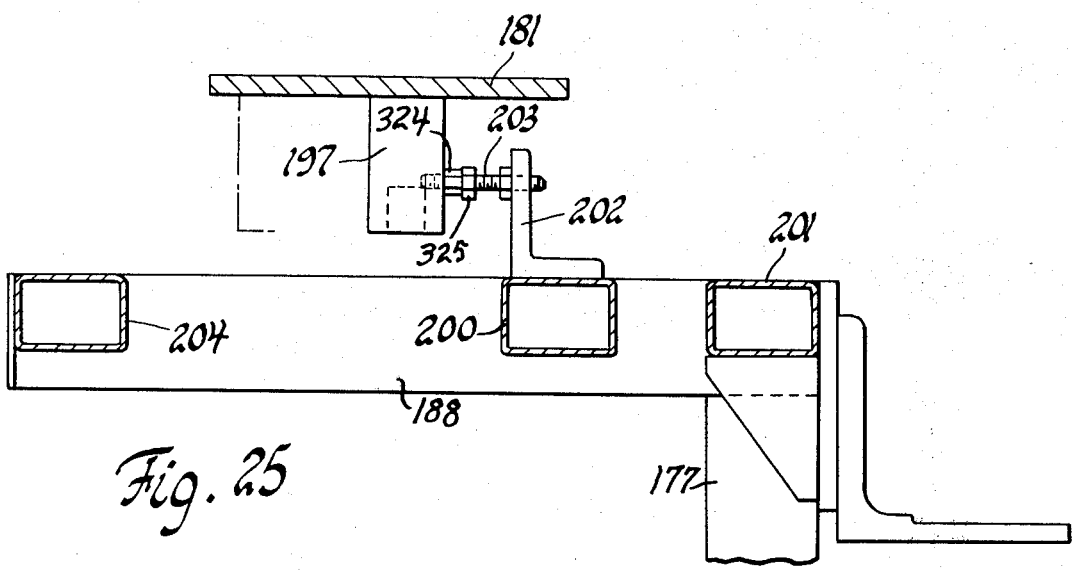
FIG. 25 is a fragmenatary, elevational section view of the structure illustrated in FIG. 23, taken along the line 25—25 thereof, and looking in the direction of the arrows.
Figure 26:
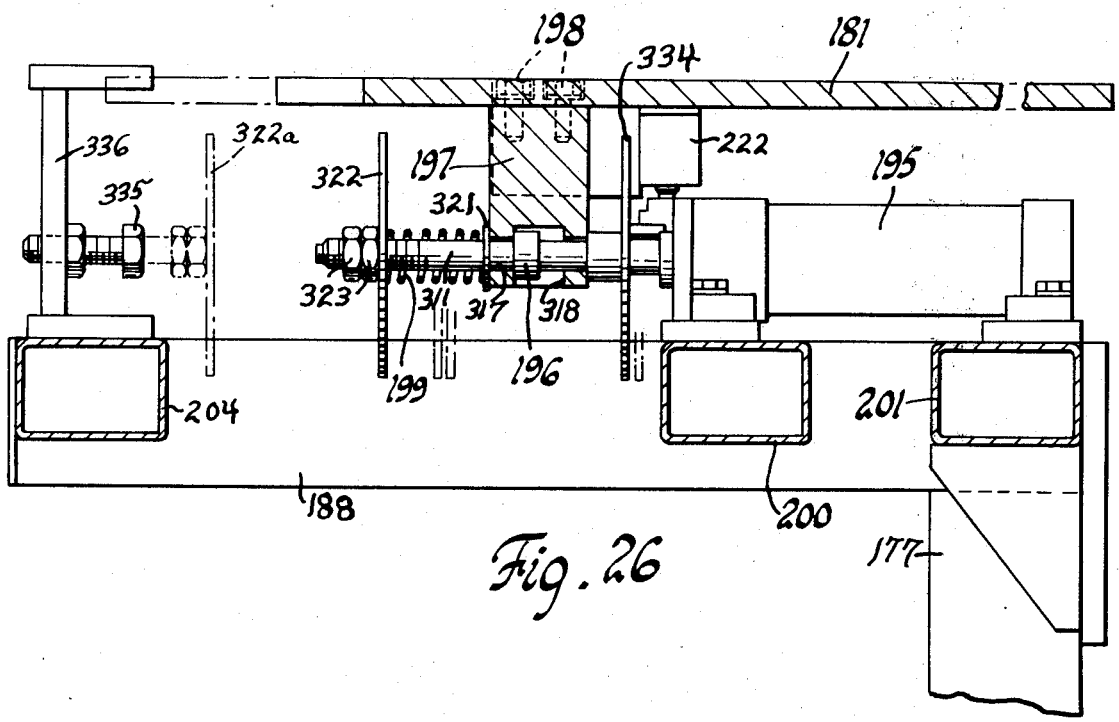
FIG. 26 is a fragmentary, elevational section view of the structure illustrated in FIG. 23, taken along the line 26—26 thereof, and looking in the direction of the arrows.

As shown in FIGS. 25 and 26, the ball slide actuator plate 181 is provided on the lower side thereof with an actuator block 197. As shown in FIG. 26, the actuator block 197 is fixedly connected to the plate 181 by suitable machine screws 198. The actuator block 197 is adapted to be spring-biased in one direction to a normal loading position, and in the other direction by an air cylinder 195 in the event of a jam-up of pre-forms 10 at the loading position. As shown in FIG. 26, the cylinder 195 is provided with a cylinder rod 311 on which is formed a flange 196. The cylinder rod 311 extends through an axial passage 317 formed through the lower end of the actuator block 197. An enlarged recess 318 is formed in the lower end of the actuator block 197 and interrupts the bore 317 to split it into two portions. It will be seen that the cylinder rod flange 196 is seated in the recess 318, and that it is movable backwardly and forwardly therein.

As shown in FIG. 26, a spring 199 is operatively mounted around the cylinder rod 311 and one end thereof abuts against a washer 321 which is seated against the rear face of the actuator 197. The other end of the spring 199 bears against a circular limit switch actuator plate 322 which is held on the outer cylinder rod 311 by means of suitable lock nuts 323. As shown in FIG. 25, the actuator block 197 is provided on the front face thereof with a suitable bumper member 234 which is adapted to normally engage a stop member in the form of a stud 325 which is adjustably and threadably mounted in the vertical leg of an angle bracket 202 which is fixedly secured, as by welding, to the upper side of the transverse frame member 200. It will be seen that the slide plate 181 is in the forward and normal pre-form loading position, as shown in FIGS. 24, 25, 26 and 27, and that the spring 199 normally biases the plate into said loading position which is determined by the bumper member 324 abutting the stop stud 325.

As shown in FIG. 24, the leading end 186 of each of the extension guide rails 180 slopes downwardly and forwardly for the reception of the neck end of a preform 10 after it is loaded into a carrier ring 111, immediately after the pre-form seats in the ring 111.

As shown in FIG. 24, a pre-form supply means, generally indicated by the numeral 189, is disposed adjacent each of the leading edges 186 of each extension guide rail 180 in a position spaced therebelow. The pre-form supply means 189 is adapted to sequentially feed pre-forms 10 into a pre-form loading or infeed apparatus generally indicated by the numeral 214. As shown in FIG. 24, each of the pre-form loading means 214 includes a vertically disposed infeed or pre-form loading tube 190 which has its upper end 213 disposed immediately forward from the leading edge 186 of the adjacent extension guide rail 180. The loading tube 190 is open on the pre-form supply side thereof so as to receive pre-forms 10 in sequence. An air cylinder 191 is adapted to ram load a pre-form 10 into a carrier ring 111 as the carrier ring 111 moves past the upper end 213 of the loading tube 190. The air cylinder 191 is operatively mounted on a supporting shaft 193, as described more fully hereinafter.

As shown in FIG. 24, an extension rail detector 194 is fixedly mounted adjacent the end of each of the extension rail leading ends 186, by any suitable means, as by pair of mounting arms 326 which are adjustably attached on the support legs 262, by any suitable means. The extension rail detector 194 would be arcuate in cross section and would slidably receive the upper end of the respective loading tube 190.

As shown in FIG. 23, the mounting shaft 193 is fixedly secured in place by a pair of pillow blocks 208 which are fixedly secured by suitable machine screws to a pair of angle brackets 331, which are in turn, fixed by machine screws 332 to the front side of a plate 333 that is fixedly mounted between the vertical support frame members 177 and 178. As shown in FIG. 23, six clamp blocks 192 are fixedly secured in adjusted positions on the shaft 193 by suitable machine screws, and in positions in alignment with the six pre-form flow tracks of the conveying means.

Figure 28:
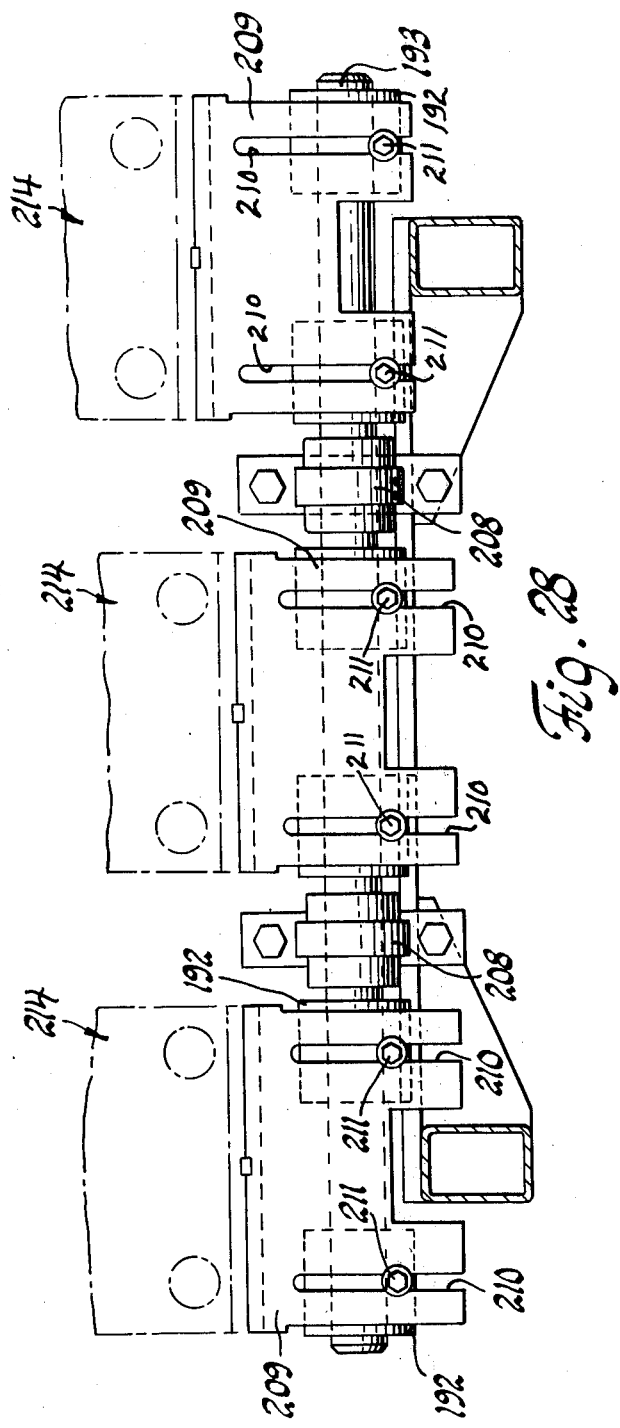
FIG. 28 is a fragmenatry, horizontal section view of the structure illustrated in FIG. 24, taken along the line 28—28 thereof, and looking in the direction from the right side of the structure illustrated in FIG. 24.

As shown in FIG. 28, a mounting bracket 209 is fixedly mounted on a pair of the clamp blocks 192. Each bracket 209 is provided with a pair of slots 210 through which are operatively mounted suitable machine screws 211 for securing the brackets 209 to the clamp blocks 192. As illustrated in FIGS. 24 and 28, the respective pre-form loading means 214 for each of the pre-form conveying lines is operatively attached to the outer ends of the brackets 209. The brackets 209 can be adjusted inwardly and outwardly for adjusting the position of the loading chute 190. The angular position of the loading chute 190 can also be adjusted by rotating the position of the clamp blocks 192 on the shaft 193.

It will be seen that the movable slide plate 181 wit its extension rails 180 functions as a gate. If a pre-form is jammed at the infeed structure of the last described loading apparatus, the jam situation causes a tendency of the slide plate 181 to move to the left, as viewed in FIGS. 24, 26 and 27, whereby the operator arm 254 of the limit switch 222 is caused to engage and move against the actuator plate 334 carried on the cylinder rod 311. This last mentioned action energizes the air cylinder 195 to operate said cylinder so as to move the slide plate 181 rearwardly, or to the left, as viewed in FIG. 27. The limit switch 222 is fixed to the underside of the slide plate 181, as shown in FIGS. 26 and 27. The slide plate 181 can float relative to the cylinder rod 311 for a distance equal to the travel of the flange 196 in the recess 318. The rearward movement of the slide plate 181 continues until the end of the stroke of the cylinder at which point the cylinder rod 311 engages an adjustable stop in the form of an adjustably mounted stud 335 (FIGS. 26 and 27).

The stud 335 is adjustably mounted on a vertical mounting arm 336 which is fixed, as by welding, to the upper side of the transverse frame member 204. When the cylinder rod 311 engages the stud 335, the switch actuator plate 322 is in the position shown by the broken line position indicated by the numeral 322a, and switch actuator plate 322 operatively engages the limit switch 215 which is mounted on the transverse frame member 204. At the same time, the slide plate 181 is relaxed and the spring 199 pushes the slide plate 181 forwardly on the cylinder rod 311 against the flange 196 to relieve the first signal on the first switch 222. After a preset time, the cylinder 195 is allowed to return to its original position. If on the return stroke, the jam is not cleared, then the switch 222 again indicates a jam and the aforementioned cycle is repeated. If the jam continues and additional pre-forms are involved, then the aforedescribed stroke of the slide plate 181 will become shorter and shorter each cycle until such time as the cylinder rod 311 is all the way back to the left and the actuator plate 322 is in contact with switch 215, and a total and unclearable jam is indicated and the oven will be shut down.

It will be understood that the last mentioned preform loading apparatus provides flexibility in that it can be moved longitudinally of the conveying system to load the pre-forms 10 into the furnace 240 at any predetermined position so as to control the heating time of the pre-forms. However, it will be understood that the previously described pre-form loading apparatus is also flexible in use in that the pre-form heating time may be varied by varying the speed of the pre-form conveying means.

The reheat oven employed in the present invention is illustrated in FIGS. 33 through 49, and it is generally designated by the numeral 240. In an emergency shut-down situation, the oven heaters are shut down and the oven is raised to a position 240a, as shown in FIG. 1, so that the plastic preforms 10 are not damaged by falling against each other and sticking together. The apparatus for raising the oven 240 in an emergency shut-down situation is described hereinafter. As shown in FIGS. 35 and 36, the oven 240 is provided at each corner, at the lower end thereof, with a suitable oven rest bracket 241 which is adapted to rest on suitable oven rest pads 242 that are carried on the conveyor frame structure on the transverse frame members 130 and 131 (7A). The apparatus for lifting the oven 240 to the inoperative position 240a is operatively mounted at each end of the oven.

As shown in FIGS. 33, 34 and 36, a transverse carrier bar 245 is provided at the discharge end of the furnace 240. The carrier bar 245 is carried by and fixedly connected to, by any suitable means, four conveyor trolley assembly members, generally indicated by the numeral 246, which are each rotatably mounted on the transverse conveyor frame I-beam 118 that extends outwardly beyond the normal position of the oven, as shown in FIG. 2, to permit the oven 240 to be rolled sidewardly after it has been raised.

As shown in FIGS. 34 and 36, the carrier bar 245 is provided with two pairs of safety bars 247 that will catch the oven on the way down if a trolley assembly shaft should fail. The lower end of each safety bar 247 is fixed by any suitable means, as by machine screws, to the carrier bar 245. The upper end of each safety bar is substantially *c* shaped and normally extends over and above the adjacent flange on the I-beam 118. As best seen in FIG. 36, a pair of downwardly extended guide rods 250 are fixedly mounted at their upper end to the carrier bar 245 and they each operatively carry on their lower end a mounting bracket 251.

The upper end of each of the guide rods 250 is fixedly secured by any suitable means, as by machine screws, to the carrier bar 245. The lower end of each guide rod 250 is slidably mounted through a suitable opening in a flange 340 carried by the respective mounting bracket 251. Each mounting bracket 251 is secured to the oven 240 by any suitable means, as by suitable machine screws. As suitable stop member 341 is operatively mounted on the lower end of each guide rod 250 in a position beneath its respective flange 240 and it is retained in place on the lower threaded end of the guide rod by suitable lock nuts 342. The guide rods 250 guide the oven 240 through its upward and downward movements. When the oven 240 is in the down position, as shown in FIG. 36, the guide rods 250 act as a stop means and retain the oven 240 in the down position of FIG. 36 in case the air pressure is lost in the air cylinder that operates the oven lifting chains. In the last mentioned case, the four guide rods 250 would be the sole means for supporting the oven 240 on the carrier bar 245. A sprocket shaft 252 is operatively supported on the oven 240. The ends of the sprocket shaft 252 are rotatably mounted in the shaft mounting blocks 255 which are fixedly mounted to the discharge end of the oven 240, by any suitable means, as by welding.

As shown in FIGS. 34 and 36, a chain sprocket 256 is operatively mounted on each end of the sprocket shaft 252. As shown in FIGS. 36 and 41, a lift or hoist chain 257 has the lower end thereof operatively connected to one of the sprockets 256, and the upper end thereof is attached to the end of the carrier bar 245, at the point indicated by the numeral 260 in FIG. 36. As shown in FIG. 41, the last mentioned hoist chain 257 is attached by a suitable chain anchor pin 258 at a point on the sprocket 256 where the sprocket is provided with a flat face 259.

Figure 34A:
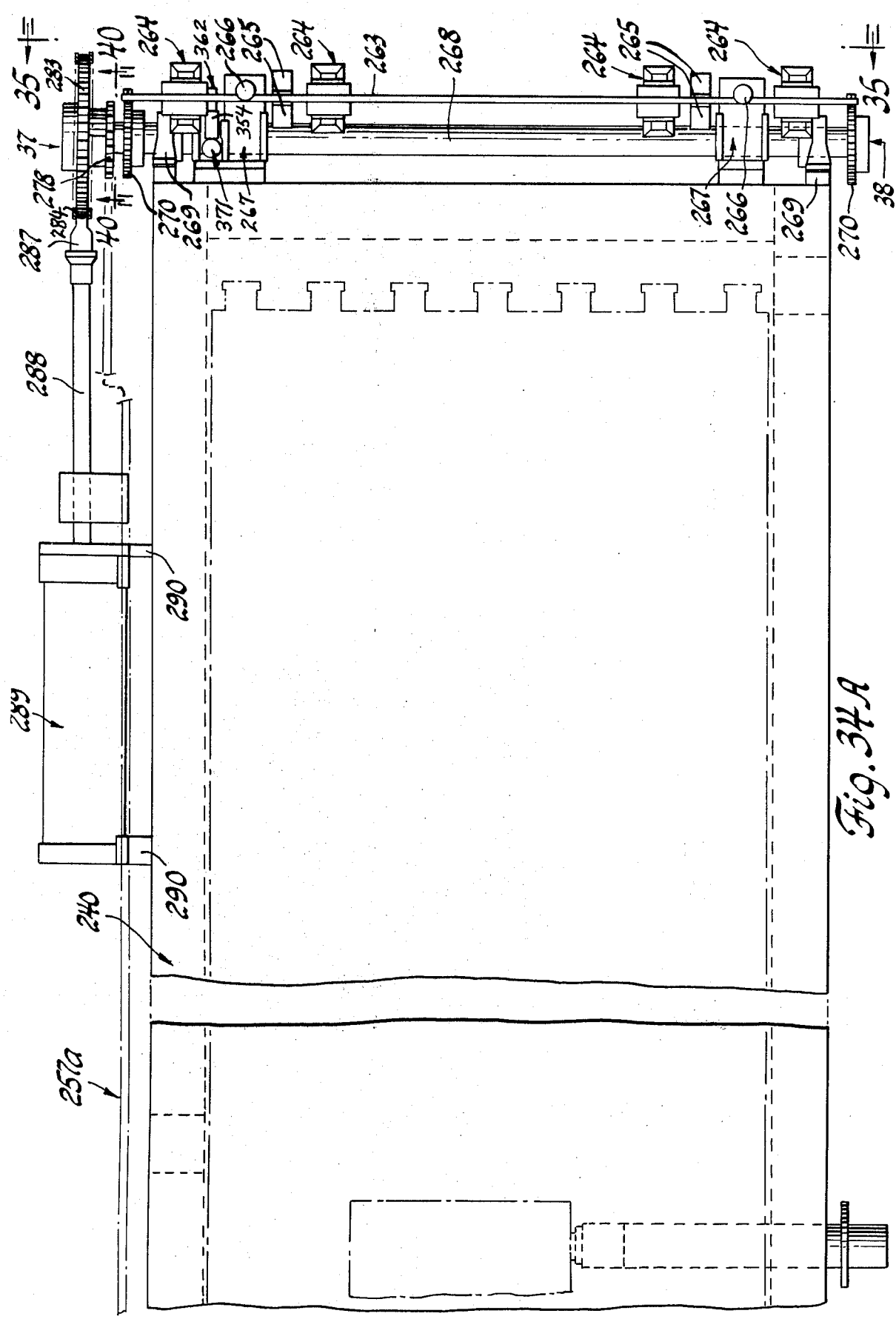

As shown in FIG. 36, the other sprocket 256 has a longer hoist or lift chain 257a trained therearound, with one end attached to the carrier bar 245 at the other end thereof and at the point indicated by the numeral 260. As shown in FIGS. 34 and 34a, the other end of the chain 257a extends toward the loading end of the oven 240, and it is meshed around and anchored to the sprocket 278, in the manner shown in FIG. 40. As shown in FIG. 40, the chain 257a is attached by the chain anchor pin 279 to the sprocket 278, adjacent the flat face 280 formed on the sprocket 278.

Figure 33A:
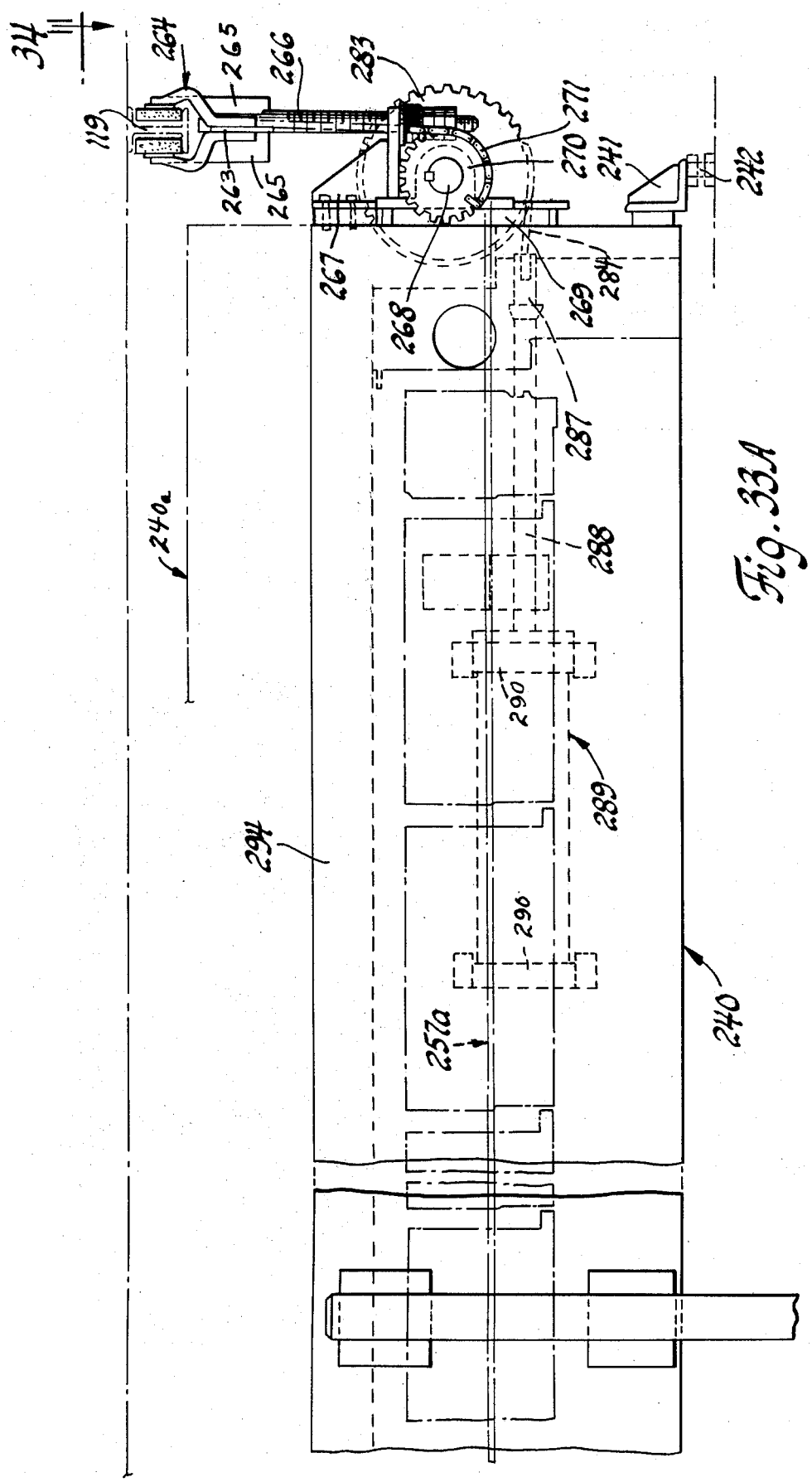

The chain hoist or lift mechanism mounted at the entrance or loading edge of the oven 240 is shown in FIGS. 33a, 34a, and 35. The oven entrance opening 302 is shown in FIG. 35. As shown in FIGS. 34a and 35, the hoist lift mechanism at the entrance end of the oven 240 is substantially the same as the discharge end, and it includes a carrier bar 263 which has fixedly attached thereto, by any suitable means, four conveyor trolley assembly members 264. The conveyor trolley assembly members 264 are rollably mounted on the conveyor frame and transverse I-beam rail 119 which extends sidewardly outwardly from the normal oven operating position, as shown in FIG. 4, to permit the oven 240 to be rolled sidewardly after it has been raised.

As shown in FIGS. 34A, 35 and 38, the carrier bar 263 has fixedly attached thereto, by any suitable means, a pair of sets of safety bars 265 which function in the same manner as the safety bars 247 at the discharge end of the oven 240. A pair of guide rods 266 have their upper ends fixedly connected by any suitable means to the carrier bar 263 and they each carry at their lower ends a mounting bracket 267. The guide 266 function in the same manner as the guide rods 250 at the discharge end of the oven 240. A sprocket shaft 268 is rotatably mounted in a suitable shaft mounting blocks 269 which are fixedly secured by any suitable means to the loading end of the oven 240. As shown in FIG. 35, a sprocket 270 is operatively mounted on each end of the sprocket shaft 268. As illustrated in FIG. 38, each of the sprockets 270 has one end of a lift or hoist chain 271 attached thereto by a chain anchor pin 272 which is adjacent a sprocket flat face 273 on the sprocket 270. As shown in FIGS. 38 and 39, the upper end of each of the chains 271 have attached thereto a chain attachment plate 274 which is secured by suitable machine screws 275 to the carrier bar 263. The same type of chain attachment structure is used for the previously described lift chains 257, at the chain attachment points indicated by the numerals 260 in FIG. 36.

As shown in FIGS. 34A and 35, the sprocket shaft 268 also carries at one end thereof a chain sprocket 278 which is outboard of the adjacent sprocket 270 and which has attached thereto, as shown in FIG. 40, the other end of the chain 257a. Said other end of chain 257a is secured by a chain anchor pin 279 to the sprocket 278 at a sprocket flat face 280. As best seen in FIGS. 34A and 37, the shaft 268 has fixedly mounted on the outer end thereof, in a position outboard of the sprocket 278, a third sprocket 283 to which is attached one end of a hoist chain 284. The chain 284 is anchored to the sprocket 283 by a chain anchor pin 285. The other end of the chain 284 is attached by a pin 286 to a chain attachment lug 287. As shown in FIG. 34A, the chain attachment lug 287 is operatively to the outer end of the cylinder rod 288 of a suitable air cylinder, generally indicated by the numeral 289. The cylinder 289 is operatively mounted on the side of the oven 240 by suitable mounting blocks 290.

As shown in FIGS. 34A and 35, the oven lifting means includes a safety lock means for locking the oven 240 in the up position 240a (FIG. 1), and it includes generally a spring biased latch arm 354 which releasably engages a latch cam 362 that is carried on the sprocket shaft 268. As described in detail hereinafter, the latch arm 354 is normally spring biased into a locking engagement with the latch cam 362, and it is adapted to be released by a suitable air cylinder, generally indicated by the numeral 371.

Figure 53:
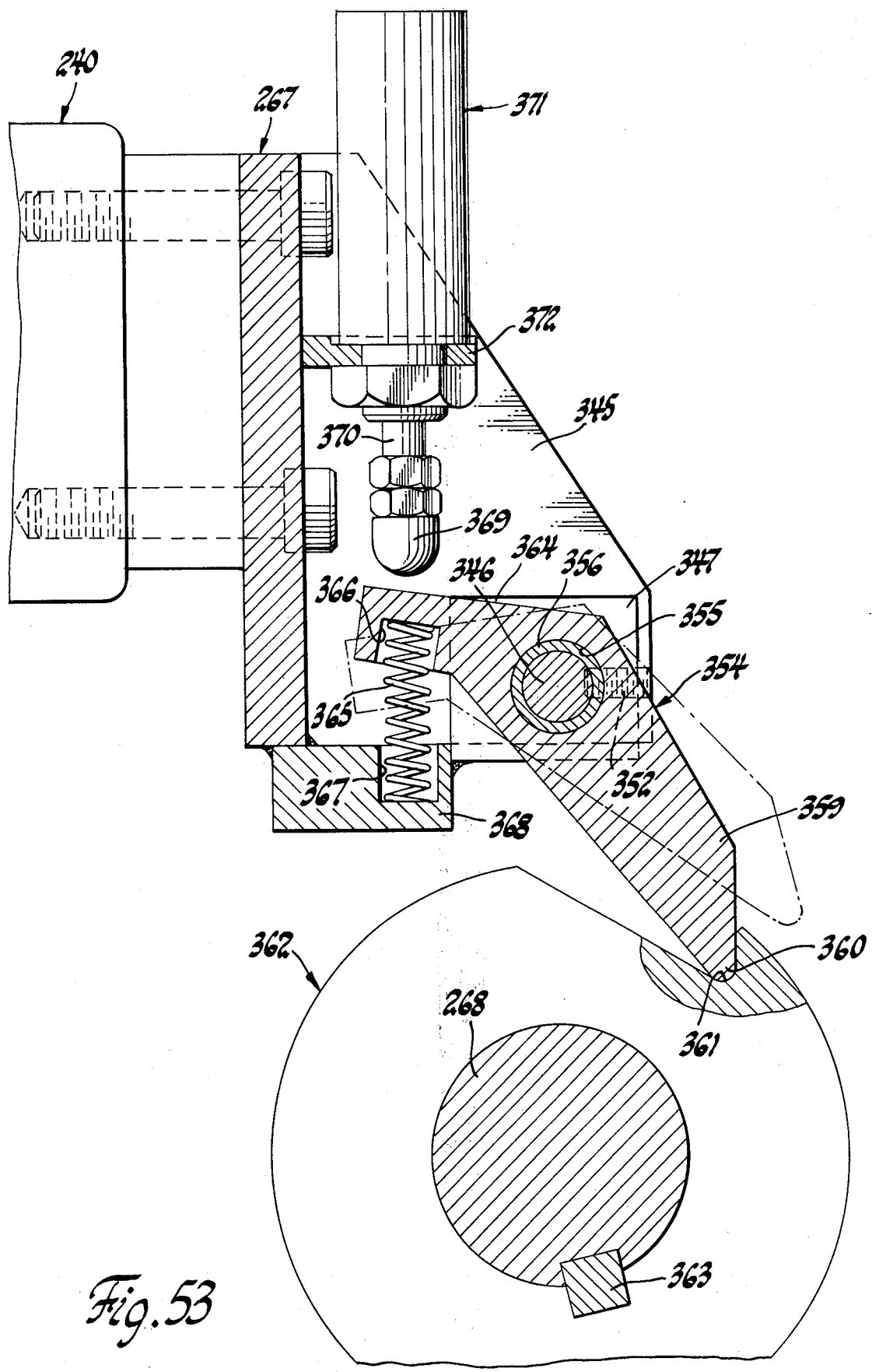
FIG. 53 is a fragmentary, enlarged, elevational section view of the structure illustrated in FIg. 52, taken along the line 53—53 thereof, and looking in the direction of the arrows.

As shown in detail in FIGS. 51, 52 and 53, the latch arm 354 is operatively mounted on one of the mounting brackets 267 that supports one of the guide rods 266. As best seen in FIG. 52, the last mentioned mounting bracket 267 includes a vertical support plate 345 which is provided with a bore 350 in which is fixedly mounted one end of a latch pin 346. The latch pin 346 is releasably secured in place in the bore 350 by any suitable means, as by a set screw 352. The latch pin 346 extends inwardly of the support plate 345 and through a bore 351 in a vertical mounting plate 347 which is fixed to the plate 345 by any suitably means, as by welding. The other end of the latch pin 346 is supported in a bore 349 formed through a second mounting block 348 which is fixed, as by welding, to the bracket plate 340. A pair of spacer washers 353 are mounted on the latch pin 346, on each side of a latch arm 354.

The latch arm 354 is provided with a transverse bore 355 in which is operatively mounted a suitable bushing 356 through which is received the fixed latch pin 346. As shown in FIG. 53, the latch arm 354 includes a front portion 359 which is provided with a rounded nose 360 that is adapted to engage and ride around the outer periphery of a circular latch cam 362. The latch cam 362 is secured to the sprocket shaft 268 by a suitable lock key 363. A latch cam slot 361 is formed in the outer periphery of the latch cam 362 and the latch nose 360 drops into the cam slot 361 as the cam 362 is rotated clockwise during an oven lifting operation, as viewed in FIG. 53. The rear portion 364 of the latch arm 354 is normally spring biased upwardly by a suitable spring 365. When the oven 340 is in the up position 240a, (FIG. 1), the cam 362 is so positioned on the sprocket shaft 268 that the latch cam nose 360 will drop into the cam slot 361 and prevent the oven 240 from being accidentally or unintentionally lowered.

As shown in FIG. 53, the upper end of the spring 365 is seated in a bore 366 formed in the lower face of the latch arm rear portion 364. The lower end of the spring 365 is seated in a bore 367 formed in the upper face of a suitable mounting block 368 which is fixed, as by welding, to the lower end of the vertical mounting support plate 345 and the rear plate of the mounting bracket 267.

As best seen in FIG. 53, an air cylinder 371 is operatively supported on a cylinder mounting plate 372 in an operative position over the latch arm rear portion 364. The air cylinder mounting plate 372 is fixedly secured to the vertical rear plate of bracket 267 by any suitable means, as by welding. The air cylinder 371 is provided with a cylinder rod 370 on which is operatively mounted a suitable contact finger 369. In order to release the latch arm 354 and disengage the same from the latch cam 362, the cylinder 371 is operated to move the contact finger downwardly to engage the rear portion 364 of the latch arm 354, and pivot the latch arm counterclockwise, as viewed in FIG. 53, about the latch pin 346 to disengage the latch arm 354 from the latch cam 362, and permit the oven 240 to be lowered.

It will be seen that the last described latch arm and latch cam structure function with the air cylinder 371 to provide a safety lock means for maintaining the oven 240 in a locked condition when it is in the up position 240a (FIG. 1). If the air pressure in the circuit feeding the air cylinder 289 for raising the oven 240 should be drained out of the circuit, either overnight while the oven is not being used or at some other time, the latch arm 354 will lock the oven 240 in the up position 240a to protect the operator's safety. In order for the latch arm 354 to be released, the oven 240 must be under positive controlled power so that the air cylinder 371 can be operated to disengage the latch arm 354 from the cam 362 to allow the oven 240 to be lowered.

It will be seen that when it is desired to lift the oven 240 in the event of an emergency, the air cylinder 289 is energized and the cylinder rod 288 is moved inwardly of the cylinder 289, to the left as viewed in FIG. 34A. This action pulls the chain 384 off of the sprocket 283, but at the same time rotates the sprockets 370 so as to wind-up the cables 271 around the sprockets 270 and lift the loading end of the oven 240. The discharge end of the oven 240 is lifted simultaneously in a similar manner since the chain 257 is wound-up around one of the sprockets 256. The chain 257a passes around the other of the sprockets 256 but it is wound-up on the sprocket 278 to provide the lift action for the discharge end of the oven 240. After the oven 240 has been raised above the pre-forms, the oven safety latch 337 shown in FIG. 13a, is manually pivoted upwardly about the axis of its pivot attachment pin 338 to permit oven 240 to be rolled sidewardly, as viewed in FIG. 13a, to clear the pre-form conveying tracks. The oven 240 may then be manually moved to the left, as viewed in FIG. 13A. However, a suitable air cylinder may be provided as indicated by the numeral 293 in FIG. 36 for moving the oven 240 to an inoperative location after it has been raised.

Figure 42:
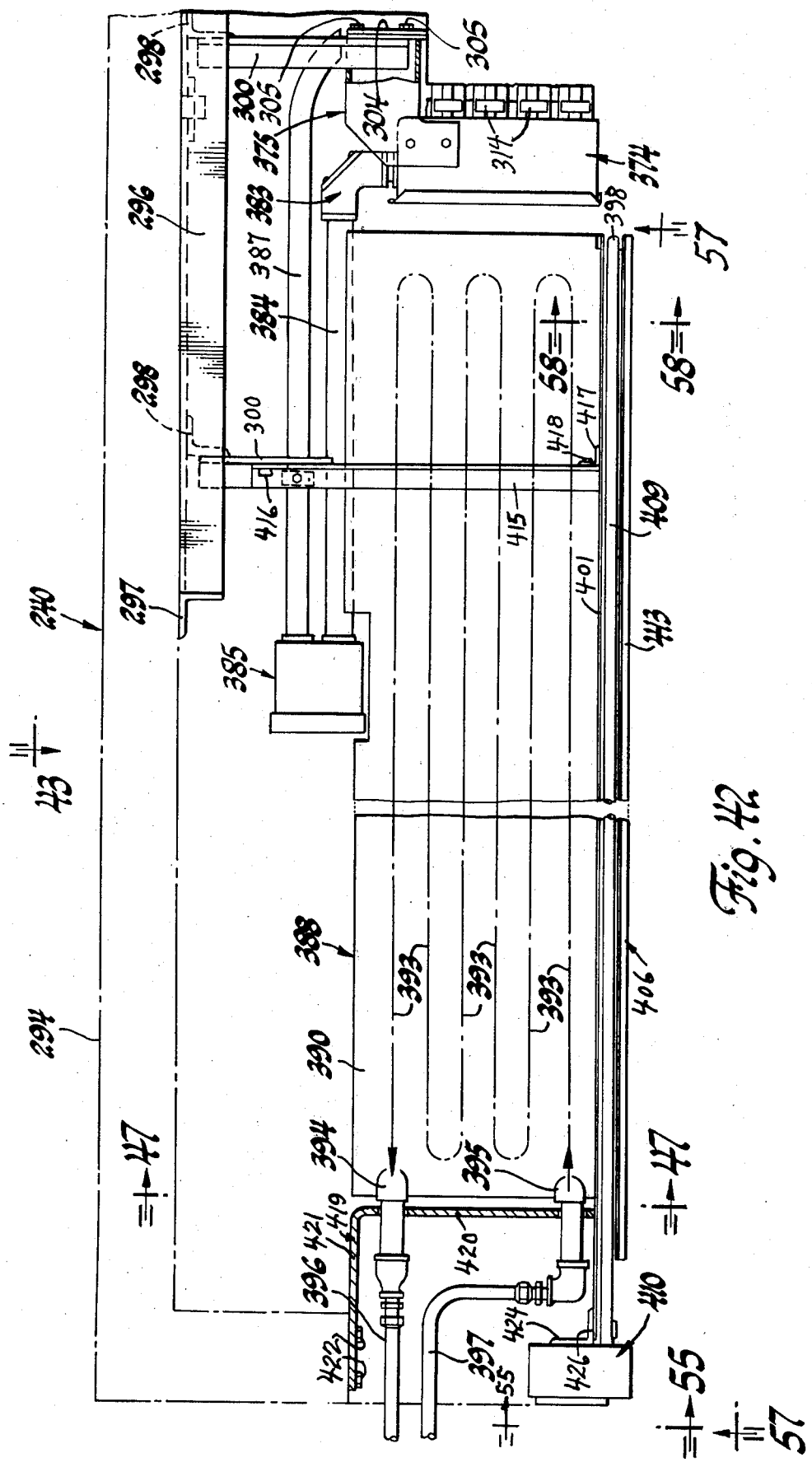
Figure 43:
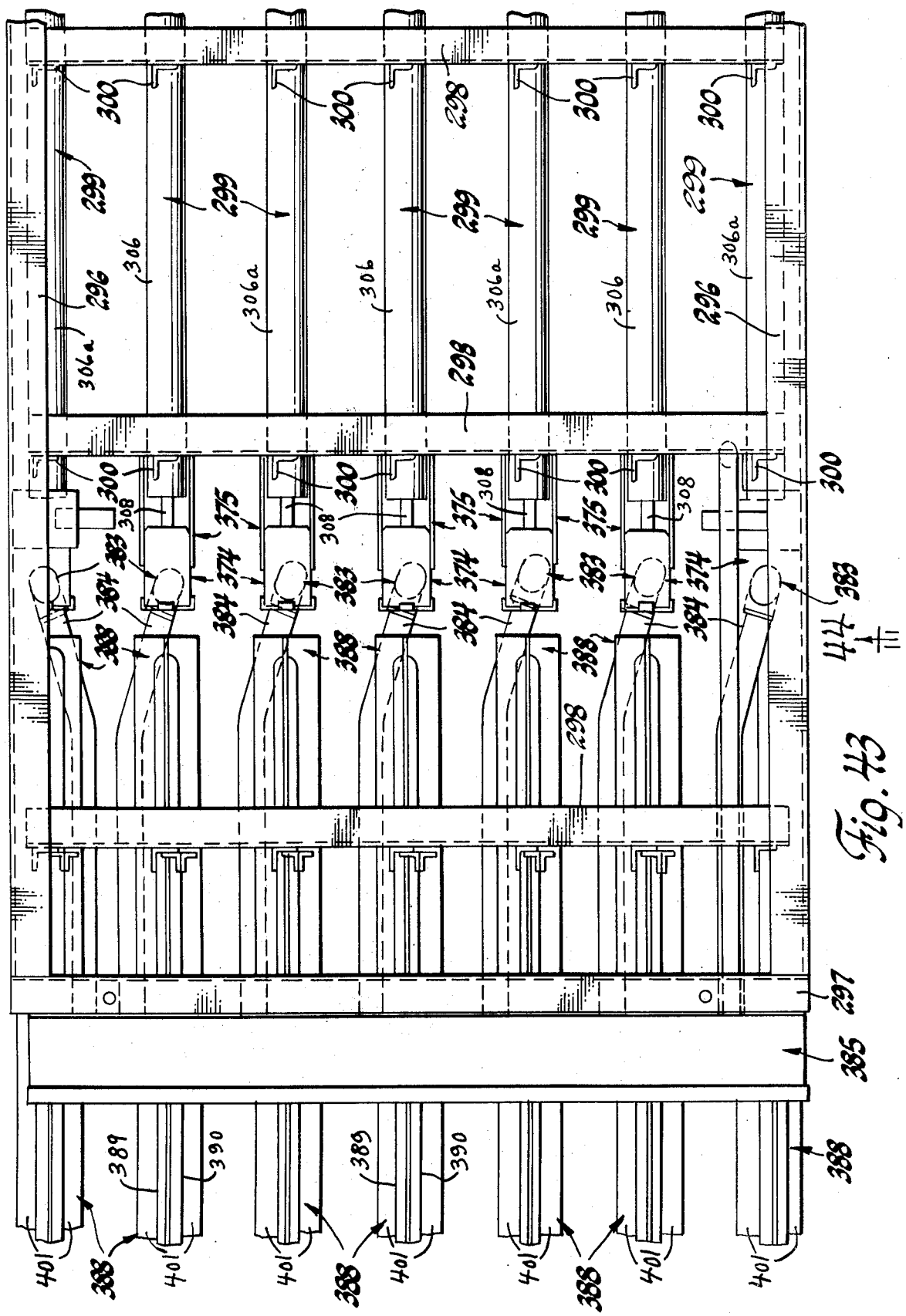

As shown in FIGS. 33 and 33a, the oven 240 includes an oven hood and insulation portion indicated by the numeral 294 to which is mounted a heater frame structure shown in FIGS. 42A, 43 and 43A. The oven 240 is provided with suitable vents, as indicated by the numeral 295 in FIG. 36.

Figure 47:
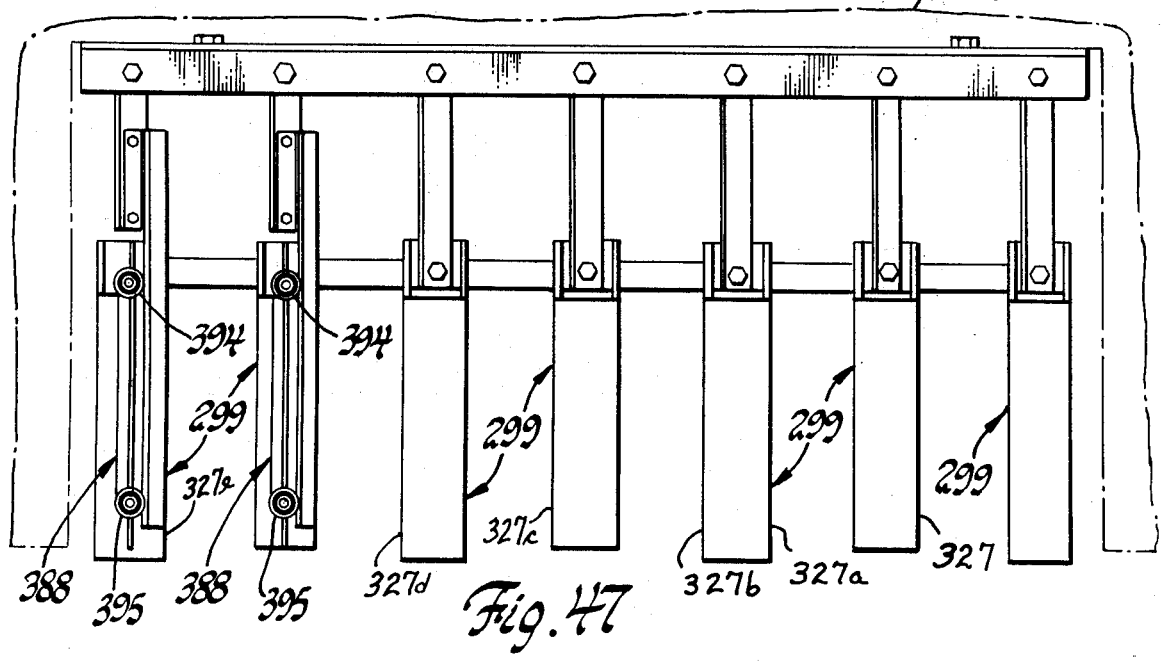
FIG. 47 is a left side elevation of the structure illustrated in FIG. 42, taken along the line 47—47 thereof, and looking in the direction of the arrows.

As shown in FIGS. 42A, 43 and 43A, the heater supporting frame includes a plurality of laterally spaced apart longitudinally extended angle frame members 296 which have the adjacent ends thereof interconnected by a transverse angle frame member 297. The transverse frame end members 297 are fixed to the longitudinal frame members 296 by any suitable means, as by welding. A plurality of intermediate transverse frame members 298 are also fixedly connected between the longitudinal frame members by any suitable means, as by welding. As shown in FIGS. 43, 43A and 47, the heater frame carries a plurality of vertically disposed laterally spaced apart heater units, generally indicated by the numerals 299, which total seven in number, so so to provide a heating zone comprising six heating tunnels through which are moved six rows of the pre-forms 10. The heater frame includes a plurality of vertically disposed angle frame members 300 which are fixed, as by welding, at the upper ends thereof to the transverse frame members 298, and which are attached at their lower ends to the heater units 299. As shown in FIGS. 42A and 44, each of the heater units 299 includes a plurality of vertically disposed heater rod carrier strips 304. Each of the carrier strips 304 has its upper end fixedly secured to the lower end of one of the vertically disposed frame members 300 by a pair of suitable machine screw and nut assemblies, generally indicated by the numerals 305.

As shown in FIGS. 43A and 44, the entrance end of the heater frame includes a plurality of vertical end frame members, generally indicated by the numerals 301, which are U-shaped in cross section and which have their upper ends fixedly secured by suitable machine screws 291 to the adjacent transverse frame member 297. The lower end of each of the vertical end frame members 301 has the bight portion, or wall, removed therefrom, and the lower ends of the side walls straddle a heater terminal box 312 and they are fixedly secured thereto by suitable machine screws 313.

Figure 54:
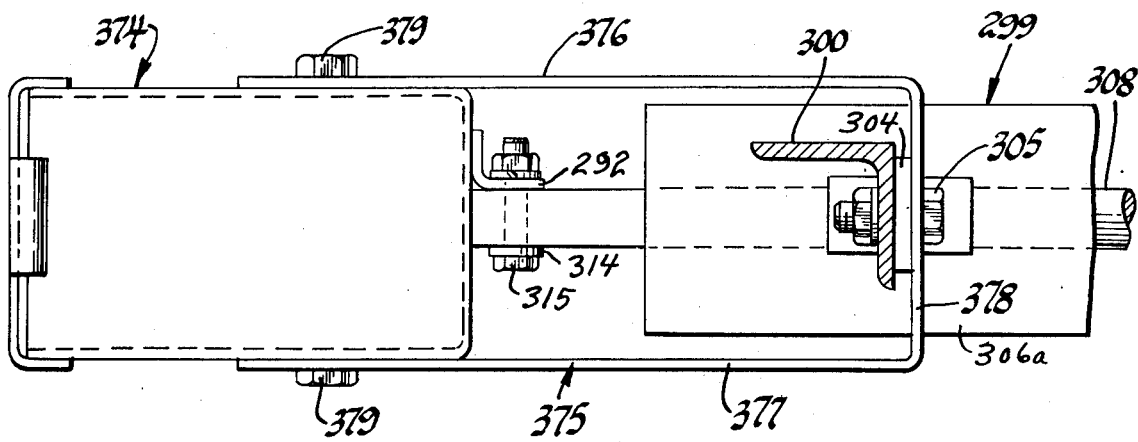
FIG. 54 is a fragmentary, enlarged, horizontal view of the structure illustrated in FIG. 44, taken along the line 54—54 thereof, and looking in the direction of the arrows.

Each of the heater units 299 is provided with a heater terminal box 312 at the entrance end of the heater frame and a heater terminal box 374 at the exit end of the heater frame. As shown in FIG. 43, each of the exit end heater terminal boxes 374 is operatively supported by a U-shaped support bracket, generally indicated by the numeral 375. As best seen in FIG. 54, each of the U-shaped support brackets 375 includes a pair of laterally spaced apart vertical side walls 376 and 377 which are integrally connected at their closed ends by a transverse vertical wall 378. As shown in FIGS. 44 and 54, the support bracket transverse wall 378 is fixedly secured to the lower end of one of the vertical frame members 300 and the upper end of a heater carrier strip 304 by a pair of suitable machine screw and nut assemblies 305. The open ends of each of the support brackets 375 are provided with a downward extension which is secured to one side of the adjacent heater terminal box 374 by a pair of suitable machine screws 379.

Figure 45:
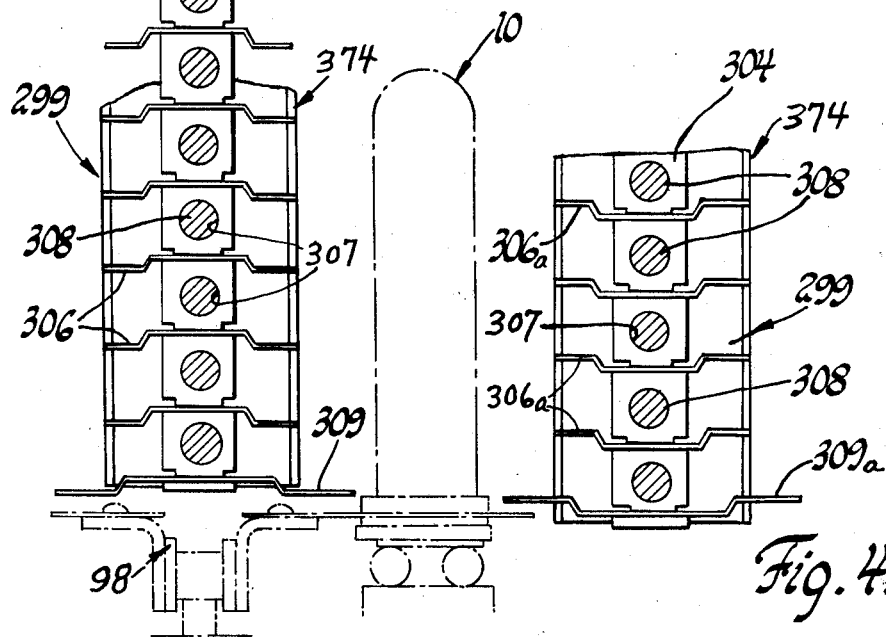
FIG. 45 is a fragmentary, elevational section view of the structure illustrated in FIG. 44, taken along the line 45—45 thereof, and looking in the direction of the arrows.

As shown in FIGS. 44 and 45, each of the heater units 299 includes a plurality of vertically aligned, longitudinally extended heater elements in the form of heater rods 308. In the illustrative embodiment, there are a total of eight heater rods 308 employed in each heater unit 299. The heater rods 308 are carried by a plurality of heater rod strip carriers 304. As shown in FIG. 45, each of the heater rods 308 extends through a suitable opening 307 in each of the heater rod strip carriers 304. As shown in FIG. 45, the heater rods 308 in adjacent heater units 299 are staggered vertically relative to each other in the illustrative embodiment, about one half of an inch. This staggering of the heater rods 308 is illustrated in FIG. 47, which shows four of the heater units 299 disposed downwardly from the other three heater units 299. The vertical staggering of the heater rods 308 in adjacent heater units 299 provides a more uniform control of the heat being applied to the pre-form 10 throughout the length of the same while controlling the heat directed to the pre-form neck area.

As shown in FIG. 45, the heater rod strip carriers 304 each carry a plurality of longitudinally extended plates or heat deflectors 306, in positions above and below each heater rod 308. As shown in FIG. 45, each of the heater units 299 which is a vertically upward staggered heater unit has its deflectors 306 formed with downwardly offset side edges. Also as shown in FIG. 45, the heater units 299 which are staggered vertically downward have heat deflectors 306a formed with upward offset side edges. The deflectors 306 and 306a function to deflect the heat outwardly onto the preforms 10 as they are passing thereby. Each of the vertically upward staggered heater units 299 is provided with a lower end heat deflector in the form of a baffle 309 which is provided with downward offset side edges that extend outwardly beyond the side edges of the heat deflectors 306. The vertically downward staggered heater units 299 are also provided with a similar heat baffle 309a on the lower end thereof, and the side edges thereof are offset upwardly so as to be substantially parallel with the side edges of the baffle 309. It will be understood that the heat deflectors 306 and 306a, and the heat baffles 309 and 309a extend throughout the length of each heater unit 299, and provide an enclosure means along each of the heating tunnels 327 through 327e, as illustrated in FIG. 47.

Figure 46:
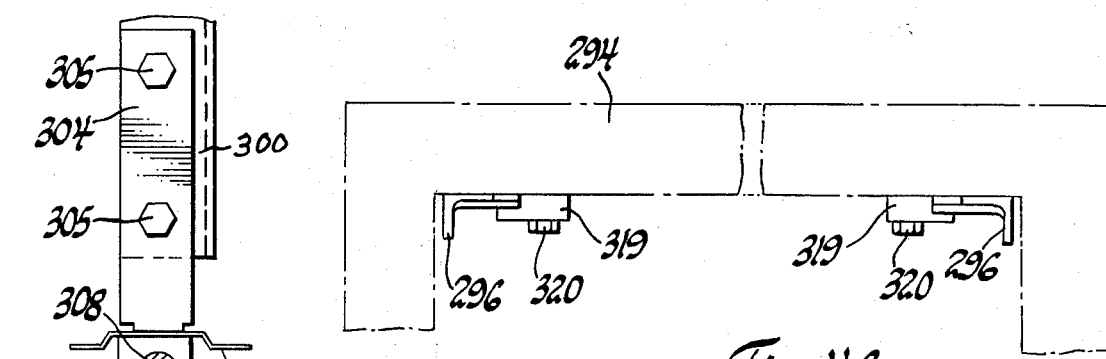
FIG. 46 is a fragmentary, broken, elevational section view of the structure illustrated in FIG. 43A, taken along the line 46—46 thereof, and looking in the direction of the arrows.

As shown in FIG. 46, the heater frame structure is releasably secured to the oven hood and insulation means 294. The longitudinal heater frame members 296 are releasably secured to the hood 294 by suitable retainer members 319 and machine screws 320.

As shown in FIGS. 44 and 54, one of the ends of each of the heater rods 308 for each heater unit 299 extends into a terminal box 374, and they are fixedly secured thereto. A vertically disposed angle bar 292 is fixed to the rear wall of each terminal box 374 by any suitable means, as by welding. As best seen in FIG. 44, four suitable clamp members 314 and machine screw assemblies 315 are employed for securing each heater unit rod 308 in a fixed position against the respective angle bar 292. The other ends of the heater rods 308 for each heater unit 299 are similarly secured to a terminal box 312.

It will be understood that the heater rods 308 are operatively connected to a suitable source of electrical energy, and that the power flow therethrough may be controlled by any suitable electric controls. For example, the heater rod terminals 316 in each terminal box 374 are connected by suitable lead wires extended upwardly through the fitting 383, as shown in FIG. 42. Each of the juncion boxes 374 will be provided with such a fitting 383 (FIG 43), which in turn is connected by a suitable conduit 384 for conducting the lead wires to a suitable junction box 385 from which the lead wires will be operatively connected to said source of electrical energy. As shown in FIG. 44, the other end 386 of each of the heater rods 308 in each terminal box 312 are similarly connected by suitable lead wires passing through a conduit 387 (FIG. 42) which conducts the lead wires to the junction box 385.

As shown in FIGS. 42 and 43, the oven 240 is provided with a conditioning zone or cooling zone at the discharge end of the oven through which the pre-forms 10 are conveyed after they pass beyond the exit ends of the heater units 299. The bodies of the pre-forms 10 are cooled as they pass through the conditioning zone by a plurality of laterally spaced apart cooling plate means 388. The conditioning zone further includes a heater means, generally indicated by the numeral 406, for maintaining heat control in the neck area of the pre-forms 10.

As shown in FIG. 58, each of the cooling plate means 388 is formed from a pair of vertically disposed plates 389 and 390. The plates 389 and 390 are fixedly secured together in sandwich fashion by any suiable means, as by welding. The plates 389 and 390 are provided with serpentine shaped, concave recesses 391 and 392, respectively, so as to form a continuous serpentine shaped cooling conduit or circuit 393 (FIG. 42). As shown in FIG. 42, the entrance end 395 of the cooling conduit 393 is operatively connected to a suitable conduit 397. The exit end 394 of the cooling conduit 393 is operatively connected to a suitable conduit 396. It will be understood that the conduits 396 and 397 are operatively connected to a suitable source of coolant for forcing suitable coolant through the serpentine shaped cooling circuit 393, to provide the desired cooling effect in the conditioning zone.

Each of the cooling plate means 388 is operatively supported in the oven 240 by the following described structure. As shown in FIG. 58, the one end of each cooling plate means 388 has the lower ends of the plates 389 and 390 disposed between the bifurcated legs 404 of a bracket member 405, as shown in FIG. 59. A similar bracket is mounted on the lower ends of the plates 389 and 390, toward the other end thereof of the cooling plate means 388. An elongated angle plate support bracket is longitudinally mounted along the outer side of each of the plates 389 and 390, and it includes a vertical flange 400 which is mounted against the outer face of one of the bracket legs 404. Each of the flanges 400 is integrally attached to a horizontally disposed bracket flange 401. The longitudinally extended flanges 400 are fixedly secured to the bracket legs 404 and the cooling plates 389 and 390 by any suitable means, as by suitable machine screws 402 and lock nuts 403. Suitable transverse vertical support brackets 399 are fixedly secured to the underside of the support bracket flanges 401 by any suitable means, as by welding. The inner ends of the support bracket 399 are fixedly secured, as by welding, to the respective adjacent bracket flange 400.

As shown in FIG. 42, each of the cooling plate means 388 is supported at its entrance end of the conditioning zone by a vertical support angle bar 415 which has its upper end fixedly secured, as by suitable machine screws 416, to a vertical heater angle frame member 300. The lower end of the vertical support angle bar 415 is fixedly secured by suitable machine screws 418 to a mounting bracket 417 which is fixed, as by welding, to the upper side of one of the support plates or flanges 401. Each of the cooling plate means 388 is fixedly supported at the discharge end of the conditioning zone by a suitable support angle bracket, generally indicated by the numeral 419 in FIG. 42. The angle bracket 419 is provided with a vertical leg 420 which has its lower end fixedly mounted by any suitable means, as by welding, to the longitudinally extended support plates or flanges 401. The coolant conduits 396 and 397 extend through suitable openings in the vertical bracket leg 420. The support angle bracket 419 also includes an integral horizontal bracket leg 421 which is fixedly secured by any suitable means, as by machine screws 422, to the oven hood structure 294. As best seen in FIG. 57, the heater means 406 is U-shaped and includes two longitudinally extended suitable heater rods 408 and 409 which are integrally connected by a bight heater rod portion, indicated by the numeral 38, at the entrance end of the conditioning zone.

As shown in FIGS. 58 and 59, the ends of the heating rods 408 and 409 adjaent the entrance end of the conditioning zone are each supported in circular cut-outs, formed on the lower ends of the support brackets 399, by a transverse support bracket 414 which is fixedly connected by welding to the upper face of a dish shaped, longitudinally extended heat deflector and heater support plate 413. The heat deflector heater support plate 413 is secured to the lower end of the bracket 405 by a suitable machine screw 407. As shown in FIG. 57, a second machine screw 407 secures the other end or discharge end of the heater support plate 413 in a similar manner to a similar backet 405. As shown in FIG. 57, the heater rods 408 and 409 are provided with terminal ends 412 and 411, respectively, which extend through suitable openings into a terminal box, generally indicated by the numeral 410.

Figure 55:
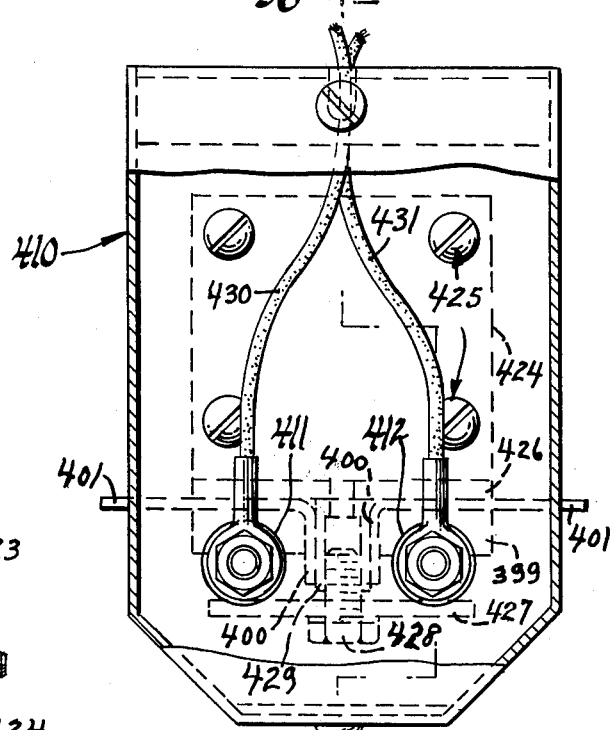
FIG. 55 is a fragmentary, enlarged, right side elevational view of the structure illustrated in FIG. 42, taken along the line 55—55 thereof, and looking in the direction of the arrows.
Figure 56:
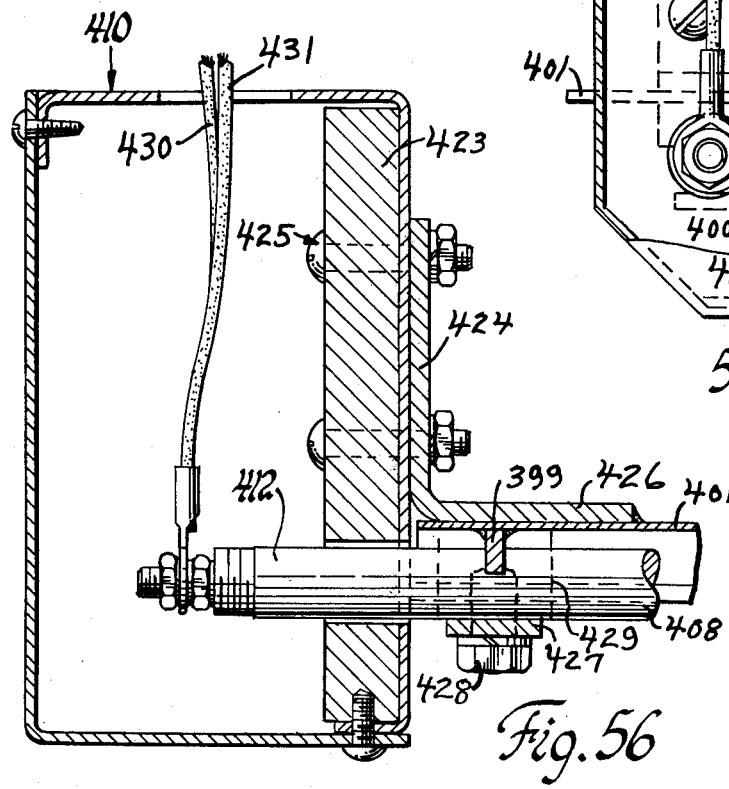
FIG. 56, is an elevational section view of the structure illustrated in FIG. 55, taken along the line 56—56 thereof, and looking in the direction of the arrows.

As shown in FIGS. 55 and 56, a mounting plate 423 is disposed inside of the terminal box 410, against the inner face of the rear wall, and it is secured to the terminal box 410 and to a vertical support bracket flange 424 by suitable screw and nut assemblies 425. A horizontal bracket flange 426 is integrally attached to the lower end of the flange 424 and it is fixedly secured, as by welding, to the cooling plate means support bracket flanges 401. As shown in FIG. 55, a screw mounting block 429 is fixed, as by welding, between the bracket flanges 400. The heater rods 408 and 409 are secured in arcuate recesses in the support bracket 399 by a clamp bracket 427. The clamp bracket 427 is mounted across the lower sides of the heater rods 408 and 409, and it is secured thereto by a machine screw 428 which is threadably mounted into the lower end of the block 429. Suitable lead wires 430 and 431 are operatively attached to the heater rod terminal ends 411 and 412, respectively, as shown in FIGS. 55 and 56. The lead wires 430 and 431 are connected to a suitable source of electrical energy and electrical control means for controlling the heat output of the heater unit 406.

OPERATION

In use, with the pre-form conveying means being driven from the stretch-blow molding apparatus drive shaft 19, the pre-forms 10 are loaded through the loading tube 138 and they are then conveyed linearly downward and forward into the reheat oven 240. The conveying means moves the pre-forms 10 through the heating and conditioning zones of the oven 240 in a continuous longitudinal and rotational motion. The pre-forms 10 are then conveyed to the discharge station where they drop off of the discharge shelves 160 downwardly onto the stretch pin assembly means 16 of the stretch-blow molding apparatus 13. The aforementioned power drive system moves the pre-form conveying means at a constant speed so as to move the pre-forms 10 through the oven 240 at a constant linear speed. The linear speed of the pre-form conveying means, and the heating and cooling times of the pre-forms 10 depend upon the quality of the particular pre-form 10 being processed. In one embodiment, the pre-forms 10 were heated for about 3 minutes and then cooled in the conditioning zone for about 2 minutes. The heating and cooling periods have to be adjusted in accordance with the plastic material used in the pre-forms 10, the wall thickness of the pre-forms and other pre-form factors.

It will be seen that the aforedescribed pre-form conveying means rotates the pre-forms 10 as they are being moved through the furnace to provide optimum heating conditions. The conveying tracks of the conveying means are closely spaced together so as to provide an apparatus which can function with an oven to heat a maximum number of pre-forms in a minimum size oven area.

It will also be seen that the oven 240 provides an apparatus for providing constant heat throughout the length of the oven heating zone, but with a heating function that varies in elevation. The oven heating zone provides horizontally stratified zones of heat, and the heat operating on the pre-forms 10 as they pass through the oven 240 varies axially along the length of the pre-forms. The oven 240 thus provides the pre-forms with an axially controlled temperature. The heater rods 308 are provided with individual heater controls so as to assist in providing the aforementioned controlled heating of the pre-forms 10. The oven conditioning zone cooling apparatus permits controlled cooling of the bodies of the pre-forms 10 while maintaining the heat control in the neck area of the pre-forms.

The timing of the carrier chain assemblies 96, 97 and 98 so as to discharge the pre-forms 10 to the arcuately disposed drop points 18 is effected by locking one of the drive sprockets 59, 60 or 61 to the drive shaft 39 and then adjusting or timing the positions of the other two of said sprockets on the shaft 39 to said one sprocket.

While it will be apparent that the preferred embodiments of the invention herein disclosed are well calculated to fulfill the objects above stated, it will be appreciated that the invention is susceptible to modification, variation and change.

What is claimed is:

1. In a continuous motion pre-form reheat oven for reheating pre-forms and discharging the pre-forms onto a stretch pin means on a continuous motion stretch blow molding apparatus, the combination comprising:
    a. an oven for operative mounting adjacent a continuous motion stretch blow molding apparatus;
    b. a continuous motion pre-form conveying means having a pre-form loading station and a pre-form discharge station for conveying pre-forms received at said load station longitudinally and rotationally through said oven for reheating the pre-forms, and thence conveying the pre-forms to said discharge station for discharging the pre-forms onto the stretch pin means of a stretch blow molding apparatus;
    c. a pre-form loading means for loading pre-forms onto said pre-form conveying means;
    d. said pre-form conveying means includes means for rotating the pre-forms as they are conveyed through the oven;
    e. said oven includes a pre-form heating zone through which the pre-forms are initially conveyed, and a pre-form conditioning zone for receiving the pre-forms from the heating zone and cooling the pre-forms to a condition for blowing into a final product;
    f. said oven includes at least one continuous longitudinal tunnel extending through the heating and conditioning zones;
    g. said pre-form conveying means includes at least one pre-form carrier chain assembly for conveying pre-forms through said oven tunnel with continuous longitudinal and rotational motion;
    h. said oven includes heater means in said heating zone on each side of said tunnel;
    i. each of said heater means includes a pluarality of individually controlled heater elements; and
    j. said heater elements comprise a plurality of longitudinally disposed heater rods.

2. A pre-form reheat oven as defined in claim 1, wherein:
    a. said heater means includes heat reflector means operatively mounted between said heater rods.

3. A pre-form reheat oven as defined in claim 2, wherein:
    a. said heater rods are vertically aligned and spaced apart; and,
    b. each of said reflector means comprises a heat reflector member horizontally disposed above and below each of said heater rods.

4. A pre-form reheat oven as defined in claim 3, wherein:
    a. the heater means on one side of the tunnel is vertically offset downward relative to the heater means on the other side of the tunnel.

5. In a continuous motion pre-form reheat oven for reheating pre-forms and discharging the pre-forms onto a stretch pin means on a continuous motion stretch blow molding apparatus, the combination comprising:
    a. an oven for operative mounting adjacent a continuous motion stretch blow molding apparatus;
    b. a continuous motion pre-form conveying means having a pre-form loading station and a pre-form discharge station for conveying pre-forms received at said load station longitudinally and rotationally through said oven for reheating the pre-forms, and thence conveying the pre-forms to said discharge station for discharging the pre-forms onto the stretch pin means of a stretch blow molding apparatus;
    c. a pre-form loading means for loading pre-forms onto said pre-form conveying means;
    d. said pre-form conveying means includes means for rotating the pre-forms as they are conveyed through the oven;
    e. said oven includes a pre-form heating zone through which the pre-forms are initially conveyed, and a pre-form conditioning zone for receiving the pre-forms from the heating zone and cooling the pre-forms to a condition for blowing into a final product; and
    f. oven hoisting means for moving the oven between a lowered normal heating position adjacent the pre-form conveying means and an inoperative raised position above the pre-form conveying means.

6. A pre-form reheat oven as defined in claim 5, wherein:

a. said hoisting means includes means for rollably supporting the oven for moving the oven between said inoperative raised position and a position laterally disposed from the conveying means.

7. A pre-form reheat oven as defined in claim 6, including:
   a. latch means for releasably locking said oven over the pre-form conveying means, and which may be released for moving the oven to said laterally disposed position.

8. A pre-form reheat oven as defined in claim 5, wherein said hoisting means includes:
   a. a transversely disposed support rail operatively mounted over said oven at each end thereof;
   b. a hangar bar at each end of said oven; and,
   c. conveyor trolley assembly means operatively mounted on said support rail at each end of said oven and attached to the respective hangar bar at each end of the oven for rollably supporting the hangar bars at the ends of said oven.

9. A pre-form reheat oven as defined in claim 8, wherein said hoisting means includes:
   a. sprocket means operatively mounted at each end of said oven;
   b. a power cylinder operatively mounted on said oven; and,
   c. hoisting chain means operatively connected between said power cyliner, said hangar bars and said sprocket means for moving said oven between said lowered normal heating position and inoperative raised position.

10. A pre-form reheat oven as defined in claim 9 wherein said hoisting means includes:
    a. safety bar means mounted on said hangar bars for operative engagement with the transverse support rails.

11. A pre-form reheat oven as defined in claim 9, wherein said support means includes:
    a. a sprocket shaft rotatably mounted on each end of the oven; and,
    b. a sprocket means operatively mounted on each end of said shafts.

12. A pre-form reheat oven as defined in claim 11, including:
    a. a safety lock means operatively mounted on said oven for locking the sprocket means in said inoperative raised position.

13. A pre-form reheat oven as defined in claim 12, wherein said safety lock means includes:
    a. a latch cam mounted on one of said sprocket shafts;
    b. a latch arm pivotally mounted on said oven;
    c. biasing means normally moving said latch arm into a locking engagement with said latch cam; and,
    d. power means for releasing said latch arm from said locking engagement with said latch cam.

14. A pre-form reheat oven as defined in claim 13, wherein:
    a. said biasing means is a spring means.

15. A pre-form reheat oven as defined in claim 13, wherein:
    a. said power means is a fluid operated power cylinder.

16. In a continuous motion pre-form reheat oven for reheating pre-forms and discharging the pre-forms onto a stretch pin means on a continuous motion stretch blow molding apparatus, the combination comprising:
    a. an oven for operative mounting adjacent a continuous motion stretch blow molding apparatus;
    b. a continuous motion pre-form conveying means having a pre-form loading station and a pre-form discharge station for conveying pre-forms received at said load station longitudinally and rotationally through said oven for reheating the pre-forms, and thence conveying the pre-forms to said discharge station for discharging the pre-forms onto the stretch pin means of a stretch blow molding apparatus;
    c. a pre-form loading means for loading pre-forms onto said pre-form conveying means;
    d. said pre-form conveying means includes means for rotating the pre-forms as they are conveyed through the oven;
    e. said oven includes a pre-form heating zone through which the pre-forms are initially conveyed, and a pre-form conditioning zone for receiving the pre-forms from the heating zone and cooling the pre-forms to a condition for blowing into a final product;
    f. said oven includes a plurality of continuous longitudinal tunnels extending through the heating and conditioning zones; and;
    g. said pre-form conveying means includes a plurality of pre-form carrier chain assemblies for conveying pre-forms through said oven tunnels with continuous longitudinal and rotational motion.

17. A pre-form reheat oven as defined in claim 16, wherein:
    a. each of said pre-form carrier chain assemblies includes means for conveying pre-forms through at least two of said oven tunnels.

18. In a continuous motion pre-form reheat oven for reheating pre-forms and discharging the pre-forms onto a stretch pin means on a continuous motion stretch blow molding apparatus, the combination comprising:
    a. an oven for operative mounting adjacent a continuous motion stretch blow molding apparatus;
    b. a continuous motion pre-form conveying means having a pre-form loading station and a pre-form discharge station for conveying pre-forms received at said load station longitudinally and rotationally through said oven for reheating the pre-forms, and thence coneying the pre-forms to said discharge station for discharging the pre-forms onto the stretch pin means of a stretch blow molding apparatus;
    c. a pre-form loading means for loading pre-forms onto said pre-form conveying means;
    d. said pre-form conveying means includes means for rotating the pre-forms as they are conveyed through the oven;
    e. said oven includes a pre-form heating zone through which the pre-forms are initially conveyed, and a pre-form conditioning zone for receiving the pre-forms from the heating zone and cooling the pre-forms to a condition for blowing into a final product;
    f. at least one chain drive sprocket and at least one chain driven sprocket; and,
    g. at least one continuous conveyor chain having a plurality of pre-form carriers operatively mounted thereon, and being operatively mounted around said drive sprocket and said driven sprocket to provide a lower pre-form portion for conveying pre-forms in said pre-form carriers from the loading station through said oven, and to said discharge station, and to provide an upper return conveying portion for returning said pre-form carriers to said loading station.

19. A pre-form reheat oven as defined in claim 18, wherein said pre-form conveying means includes;
   a. power drive means for rotating said drive sprocket.

20. A pre-form reheat oven as defined in claim 19, wherein:
   a. said power drive means includes a gear drive train for operatively connecting said drive sprocket to the power drive system of said stretch blow molding apparatus.

21. A pre-form reheat oven as defined in claim 19, wherein:
   a. said power drive means includes a drive motor operatively connected by a power drive system to said drive sprocket.

22. A pre-form reheat oven as defined in claim 19, wherein:
   a. said pre-form conveying means includes guide rail means operatively mounted on said lower pre-form conveying portion between said sprockets.

23. A pre-form reheat oven as defined in claim 22, wherein:
   a. said guide rail means includes a cooled guide rail portion in the lower pre-form conveyor portion that extends through said oven.

24. A pre-form reheat oven as defined in claim 23, wherein:
   a. said guide rail means includes a pre-form discharge gap at said discharge station for discharging the pre-forms from the pre-form carriers.

25. A pre-form reheat oven as defined in claim 24, wherein:
   a. said guide rail means includes a movable gate portion operatively mounted at said discharge station for closing said discharge gap to allow the pre-forms to be conveyed over said discharge gap and to a dumpstation.

26. A pre-form reheat oven as defined in claim 25, wherein:
   a. said sprockets are provided with means for engaging the closed ends of the pre-forms for conveying said pre-forms around the sprockets without contacting each other.

27. A pre-form reheat oven as defined in claim 26, wherein:
   a. said means for engaging the closed ends of the pre-forms comprises a cog wheel carried on the sprockets.

28. A pre-form reheat oven as defined in claim 25, wherein:
   a. said movable gate portion is operatively mounted for indicating a pre-form jam condition at the discharge gap.

29. A pre-form reheat oven as defined in claim 25, including:
   a. photodetection means operatively mounted along said lower pre-form conveying portion between the drive sprocket and the movable gate for detecting pre-forms passing over the discharge gap and not discharging at the discharge station.

30. A pre-form reheat oven as defined in claim 24, including:
   a. a discharge finger operatively mounted adjacent said discharge gap for directing pre-forms from the lower pre-form conveying portion downwardly through said discharge gap.

31. a pre-form reheat oven as defined in claim 22, wherein:
   a. said pre-form loading means comprises a loading tube for loading the pre-forms into the pre-form carriers so that the closed ends of the pre-forms are disposed upwardly as the pre-forms are conveyed through the oven and the neck ends of the pre-forms slide on the guide rail means, so that the pre-forms drop out of the pre-form carriers by gravity at said discharge stations.

32. A pre-form reheat oven as defined in claim 31, wherein:
   a. said loading tube is operatively mounted adjacent said driven sprocket.

33. A pre-form reheat oven as defined in claim 31, wherein:
   a. said loading tube is operatively mounted beneath said oven.

34. A pre-form reheat oven as defined in claim 32, wherein:
   a. said pre-form loading means is disposed under said oven and adjacent a movable jam detection gate section in said guide rail means.

35. A pre-form reheat oven as defined in claim 34, wherein:
   a. said movable jam detection gate is movable a first distance by a pre-form jam at said loading tube to clear the jam, and movable a second further distance by a power means to clear the jam.

36. A pre-form reheat oven as defined in claim 35, including:
   a. control means operated by said movable gate section to signal a complete pre-form jam at said loading tube.

37. A pre-form reheat oven as defined in claim 22, wherein:
   a. each of said pre-form carriers includes a rotatable magnetic ring for holding a pre-form vertical and with its closed end upwardly as it passes through the oven and with its neck end in slidable engagement with the guide rail means; and,
   b. a magnet means is operatively disposed along the guide rail means in the lower conveyor portion that extends through said oven for magnetically engaging the rotatable rings for rotating the rings and pre-forms as the pre-forms are moved through the oven.

38. In a continuous motion pre-form reheat oven for reheating pre-forms and discharging the pre-forms onto a stretch pin means on a continuous motion stretch blow molding apparatus, the combination comprising:
   a. an oven for operative mounting adjacent a continuous motion stretch blow molding apparatus;
   b. a continuous motion pre-form conveying means having a pre-form loading station and a pre-form discharge station for conveying pre-forms received at said load station longitudinally and rotationally through said oven for reheating the pre-forms, and thence conveying the pre-forms to said discharge station for discharging the pre-forms onto the stretch pin means of a stretch blow molding apparatus;
   c. a pre-form loading means for loading pre-forms onto said pre-form conveying means;
   d. said pre-form conveying means includes means for rotating the pre-forms as they are conveyed through the oven;
   e. said oven includes a pre-form heating zone through which the pre-forms are initially conveyed, and a pre-form conditioning zone for receiving the preforms from the heating zone and cooling the pre-forms to a condition for blowing into a final product;

f. said oven includes a plurality of longitudinal tunnels extending therethrough;

g. said pre-form conveying means includes a plurality of chain drive sprockets and chain driven sprockets;

h. a continuous conveyor chain having a plurality of pre-form carriers thereon is operatively mounted around each of said chain drive sprockets and a corresponding one of said chain driven sprockets;

i. each of said pre-form carriers includes a rotatable magnetic ring for holding a pre-form vertical and with its closed end upwardly as it passes through the oven; and j. a magnet means is operatively disposed along the conveying path of the magnetic rings as they are conveyed through the oven for magnetically engaging the rotatable rings for rotating the rings and pre-forms as the pre-forms are moved through the oven.

39. A pre-form reheat oven as defined in claim 38, including:

a. oven hoisting means for moving the oven between a lowered normal heating position adjacent the pre-form conveying means and an inoperative raised position over the pre-form conveying means.

40. A pre-form reheat oven as defined in claim 39, wherein:

a. said hoisting means includes means for rollably supporting the oven for moving the oven between said inoperative raised position and a position laterally disposed from the conveying means.

41. A pre-form reheat oven as defined in claim 40, wherein:

a. said pre-form conveying means includes a plurality of guide rail means operatively mounted between said sprockets and extending through said longitudinal oven tunnels.

42. A pre-form reheat oven as defined in claim 41, wherein:

a. each of said guide rail means includes a cooled guide rail portion.

43. A pre-form reheat oven as defined in claim 42, wherein:

a. each of said guide rail means includes a pre-form discharge gap at said discharge station for discharging the pre-forms from the carriers.

44. In a continuous motion pre-form reheat oven for reheating pre-forms and discharging the pre-forms onto a stretch pin means on a continuous motion stretch blow molding apparatus, the combination comprising a. an oven for operative mounting adjacent a continuous motion stretch blow molding apparatus;

b. a continuous motion pre-form conveying means having a pre-form loading station and a pre-form discharge station for conveying pre-forms received at said load station longitudinally and rotationally through said oven for reheating the pre-forms, and thence conveying the pre-forms to said discharge station for discharging the pre-forms onto the stretch pin means of a stretch blow molding apparatus;

c. a pre-form loading means for loading pre-forms onto said pre-form conveying means;

d. said pre-form conveying means includes means for rotating the pre-forms as they are conveyed through the oven;

e. said oven includes a pre-form heating zone through which the pre-forms are initially conveyed, and a pre-form conditioning zone for receiving the pre-forms from the heating zone and cooling the pre-forms to a condition for blowing into a final product;

f. said oven additionally includes at least one continuous longitudinal tunnel extending through the heating and conditioning zones and longitudinally extending cooling means in said conditioning zone on each side of said tunnel for conditioning the bodies of the pre-forms conveyed through the conditioning zone; and g. said pre-form coneying means includes at least one pre-form carrier chain assembly for conveying pre-forms through said oven tunnel with continuous longitudinal and rotational motion.

45. A pre-form reheat oven as defined in claim 44, wherein:

a. said oven includes longitudinally extending heating means in said conditioning zone, on each side of said tunnel, under the cooling means on each side of said tunnel.

46. In a continuous motion pre-form reheat oven for reheating pre-forms and discharging the pre-forms onto a stretch pin means on a continuous motion stretch blow molding apparatus, the combination comprising:

a. an oven for operative mounting adjacent a continuous motion stretch blow molding apparatus;

b. a continuous motion pre-form conveying means having a pre-form loading station and a pre-form discharge station for conveying pre-forms received at said load station longitudinally and rotationally through said oven for reheating the pre-forms, and thence conveying the pre-forms to said discharge station for discharging the pre-forms onto the stretch pin means of a stretch blow molding apparatus;

c. a preform loading means for loading pre-forms onto said pre-form conveying means;

d. said pre-form conveying means includes means for rotating the pre-forms as they are conveyed through the oven and also includes at least one chain drive sprocket and at least one chain driven sprocket;

e. a continuous conveyor chain having a plurality of pre-form carriers thereon is operatively mounted around each of said chain drive sprockets and a corresponding one of said chain driven sprockets;

f. each of said pre-form carriers includes a rotatable magnetic ring for holding a pre-form vertical and with its closed end upwardly as it passes through the oven; and g. a magnet means is operatively disposed along the conveying path of the magnetic rings as they are conveyed through the oven for magnetically engaging the rotatable rings for rotating the rings and pre-forms as the pre-forms are moved through the oven.

* * * * *